US007865395B2

(12) United States Patent
Klug et al.

(10) Patent No.: US 7,865,395 B2
(45) Date of Patent: Jan. 4, 2011

(54) MEDIA CONTENT NOTIFICATION VIA COMMUNICATIONS NETWORK

(75) Inventors: John R. Klug, Evergreen, CO (US); Thad D. Peterson, Atlanta, GA (US)

(73) Assignee: Registrar Systems LLC, Denver, CO (US)

(*) Notice: Subject to any disclaimer, the term of this patent is extended or adjusted under 35 U.S.C. 154(b) by 0 days.

(21) Appl. No.: 10/444,856

(22) Filed: May 22, 2003

(65) Prior Publication Data

US 2003/0195797 A1    Oct. 16, 2003

Related U.S. Application Data

(63) Continuation of application No. 09/407,000, filed on Sep. 28, 1999, now Pat. No. 6,591,245, which is a continuation-in-part of application No. 09/128,915, filed on Aug. 4, 1998, now abandoned, said application No. 09/128,915 is a continuation of application No. 08/595,837, filed on Feb. 2, 1996, now Pat. No. 5,790,785.

(60) Provisional application No. 60/102,115, filed on Sep. 28, 1998, provisional application No. 60/008,736, filed on Dec. 11, 1995.

(51) Int. Cl.
*G06Q 30/00* (2006.01)

(52) U.S. Cl. .................................. 705/14.4; 715/745

(58) Field of Classification Search ..... 705/14.1–14.73, 705/26–27, 44, 64–67; 707/1–7, 100–104, 707/607, 609, 705–706, 781–788; 709/223–232; 726/1–21, 27–31; 715/741–745, 789, 811
See application file for complete search history.

(56) References Cited

U.S. PATENT DOCUMENTS 4,654,482 A    3/1987    DeAngelis (Continued)

FOREIGN PATENT DOCUMENTS

DE    4440419 A1 *    5/1996

(Continued)

OTHER PUBLICATIONS

About Netscape, Netscape, Firefly, and VeriSign Propose Open Prefiling Standard (OPS) to Enable Broad Personalization of Internet Services, (printed May 28, 1997), 3 pages.

(Continued)

*Primary Examiner*—Mary Cheung
(74) *Attorney, Agent, or Firm*—Dorsey & Whitney LLP

(57) ABSTRACT

The notification system identifies media content based on personal preferences of individual users and provides notification of identified media content to the users. In one embodiment, the system (100) includes a number of user nodes (102, 104, and 106) that communicate with a registration site (110) and a notification site (112) via the internet (108). The notification site (112) includes a media content database (120) and a processor (118) running contents election logic. The processor (118) accesses the media content database (120) in order to identify content that may be of interest to particular users of the user nodes (102,104 and 106). In this regard, content for a particular user may be identified by matching interest information obtained from the registration site (110) with the content information of the media content database (120).

35 Claims, 22 Drawing Sheets

U.S. PATENT DOCUMENTS

| | | | |
|---|---|---|---|
| 4,755,940 A | 7/1988 | Brachtl et al. | |
| 4,766,293 A | 8/1988 | Boston | 235/379 |
| 4,774,663 A | 9/1988 | Musmanno et al. | |
| 5,001,628 A | 3/1991 | Johnson et al. | 364/200 |
| 5,235,642 A | 8/1993 | Wobber et al. | 380/25 |
| 5,241,594 A | 8/1993 | Kung | 380/4 |
| 5,263,158 A | 11/1993 | Janis | 395/600 |
| 5,305,195 A | 4/1994 | Murphy | |
| 5,319,542 A | 6/1994 | King, Jr. et al. | |
| 5,347,632 A | 9/1994 | Filepp et al. | |
| 5,375,240 A | 12/1994 | Grundy | |
| 5,383,113 A | 1/1995 | Kight et al. | |
| 5,416,842 A | 5/1995 | Aziz | |
| 5,428,778 A * | 6/1995 | Brookes | 707/5 |
| 5,446,919 A | 8/1995 | Wilkins | |
| 5,452,459 A * | 9/1995 | Drury et al. | 707/3 |
| 5,455,953 A | 10/1995 | Russell | 395/739 |
| 5,469,576 A | 11/1995 | Dauerer et al. | 395/186 |
| 5,481,720 A | 1/1996 | Loucks et al. | 395/700 |
| 5,506,961 A | 4/1996 | Carlson et al. | 395/186 |
| 5,515,490 A | 5/1996 | Buchanan et al. | |
| 5,544,322 A | 8/1996 | Cheng et al. | 395/200.12 |
| 5,572,643 A | 11/1996 | Judson | |
| 5,586,260 A | 12/1996 | Hu | 395/200.2 |
| 5,590,197 A | 12/1996 | Chen et al. | 380/24 |
| 5,592,378 A | 1/1997 | Cameron et al. | |
| 5,592,664 A * | 1/1997 | Starkey | 707/1 |
| 5,604,490 A | 2/1997 | Blakely, III et al. | 340/825.31 |
| 5,604,542 A | 2/1997 | Dedrick | |
| 5,606,507 A | 2/1997 | Kara | |
| 5,611,048 A | 3/1997 | Jacobs et al. | 395/200.09 |
| 5,619,574 A | 4/1997 | Johnson et al. | 380/25 |
| 5,627,886 A * | 5/1997 | Bowman | 379/111 |
| 5,642,515 A | 6/1997 | Jones et al. | 395/727 |
| 5,647,450 A | 7/1997 | Ogawa et al. | |
| 5,657,450 A | 8/1997 | Rao et al. | |
| 5,664,948 A | 9/1997 | Dimitriadis et al. | |
| 5,671,354 A | 9/1997 | Ito et al. | 395/187.01 |
| 5,678,041 A | 10/1997 | Baker et al. | 395/609 |
| 5,682,428 A | 10/1997 | Johnson | 380/23 |
| 5,682,478 A | 10/1997 | Watson et al. | 395/200.4 |
| 5,689,638 A | 11/1997 | Sadovsky | 395/188.01 |
| 5,692,049 A | 11/1997 | Johnson | 380/25 |
| 5,694,595 A | 12/1997 | Jacobs et al. | 395/609 |
| 5,696,824 A | 12/1997 | Walsh | 380/24 |
| 5,696,965 A | 12/1997 | Dedrick | |
| 5,699,528 A | 12/1997 | Hogan | |
| 5,708,780 A | 1/1998 | Levergood et al. | 395/200.12 |
| 5,708,828 A | 1/1998 | Coleman | 395/785 |
| 5,710,884 A | 1/1998 | Dedrick | |
| 5,710,887 A | 1/1998 | Chelliah et al. | |
| 5,712,979 A | 1/1998 | Graber et al. | |
| 5,715,314 A | 2/1998 | Payne et al. | |
| 5,717,923 A | 2/1998 | Dedrick | |
| 5,724,424 A | 3/1998 | Gifford | |
| 5,724,521 A | 3/1998 | Dedrick | |
| 5,724,567 A * | 3/1998 | Rose et al. | 707/2 |
| 5,729,689 A | 3/1998 | Allard et al. | 395/200.58 |
| 5,737,619 A | 4/1998 | Judson | |
| 5,740,252 A | 4/1998 | Minor et al. | |
| 5,740,549 A | 4/1998 | Reilly et al. | |
| 5,752,238 A | 5/1998 | Dedrick | |
| 5,757,920 A | 5/1998 | Misra et al. | 380/25 |
| 5,758,257 A | 5/1998 | Herz et al. | |
| 5,764,890 A | 6/1998 | Glasser et al. | |
| 5,765,152 A | 6/1998 | Erickson | 707/9 |
| 5,768,382 A | 6/1998 | Schneier et al. | |
| 5,768,504 A | 6/1998 | Kells et al. | 395/187.01 |
| 5,768,521 A | 6/1998 | Dedrick | |
| 5,774,551 A | 6/1998 | Wu et al. | 380/25 |
| 5,774,670 A * | 6/1998 | Montulli | 709/227 |
| 5,774,869 A | 6/1998 | Toader | |
| 5,781,894 A | 7/1998 | Petrecca et al. | |
| 5,787,254 A | 7/1998 | Maddalozzo et al. | |
| 5,790,785 A | 8/1998 | Klug et al. | 713/202 |
| 5,794,210 A | 8/1998 | Goldhaber et al. | |
| 5,794,259 A | 8/1998 | Kikinis | |
| 5,796,952 A | 8/1998 | Davis et al. | |
| 5,796,967 A | 8/1998 | Filepp et al. | |
| 5,801,698 A | 9/1998 | Lection et al. | |
| 5,805,815 A | 9/1998 | Hill | |
| 5,809,144 A | 9/1998 | Sirbu et al. | 380/25 |
| 5,809,237 A | 9/1998 | Watts et al. | 395/200.32 |
| 5,809,242 A | 9/1998 | Shaw et al. | |
| 5,812,776 A | 9/1998 | Gifford | |
| 5,812,784 A | 9/1998 | Watson et al. | 395/200.57 |
| 5,813,009 A | 9/1998 | Johnson et al. | 707/100 |
| 5,835,087 A * | 11/1998 | Herz et al. | 715/810 |
| 5,848,397 A | 12/1998 | Marsh et al. | |
| 5,848,399 A | 12/1998 | Burke | |
| 5,848,412 A | 12/1998 | Rowland et al. | 707/9 |
| 5,854,897 A | 12/1998 | Radziewicz et al. | |
| 5,855,007 A | 12/1998 | Jovicic et al. | 705/14 |
| 5,866,889 A | 2/1999 | Weiss et al. | 235/379 |
| 5,880,768 A * | 3/1999 | Lemmons et al. | 725/41 |
| 5,884,312 A | 3/1999 | Dustan et al. | 707/10 |
| 5,890,140 A | 3/1999 | Clark et al. | 705/35 |
| 5,892,917 A | 4/1999 | Myerson | |
| 5,896,530 A | 4/1999 | White | |
| 5,910,987 A | 6/1999 | Ginter et al. | |
| 5,913,040 A | 6/1999 | Rakavy et al. | |
| 5,915,243 A | 6/1999 | Smolen | |
| 5,918,224 A | 6/1999 | Bredenberg | 707/2 |
| 5,933,811 A | 8/1999 | Angles et al. | |
| 5,941,947 A | 8/1999 | Brown et al. | |
| 5,944,794 A | 8/1999 | Okamoto et al. | 709/22 |
| 5,946,664 A | 8/1999 | Ebisawa | |
| 5,948,061 A | 9/1999 | Merriman et al. | |
| 5,966,695 A * | 10/1999 | Melchione et al. | 705/10 |
| 5,974,451 A | 10/1999 | Simmons | |
| 5,983,351 A | 11/1999 | Glogau | 713/201 |
| 5,991,799 A | 11/1999 | Yen et al. | |
| 5,996,007 A | 11/1999 | Klug et al. | |
| 5,999,912 A | 12/1999 | Wodarz et al. | |
| 6,003,076 A | 12/1999 | Maruyama et al. | |
| 6,011,537 A | 1/2000 | Slotznick | |
| 6,016,509 A | 1/2000 | Dedrick | |
| 6,029,195 A | 2/2000 | Herz | 707/10 |
| 6,058,378 A | 5/2000 | Clark et al. | 705/37 |
| 6,058,393 A | 5/2000 | Meier et al. | 707/10 |
| 6,073,105 A | 6/2000 | Sutcliffe et al. | 705/1 |
| 6,094,677 A | 7/2000 | Capek et al. | |
| 6,131,810 A | 10/2000 | Weiss et al. | 235/379 |
| 6,138,162 A | 10/2000 | Pistriotto et al. | |
| 6,148,332 A | 11/2000 | Brewer et al. | |
| 6,151,600 A | 11/2000 | Dedrick | |
| 6,173,287 B1 | 1/2001 | Eberman et al. | |
| 6,185,586 B1 | 2/2001 | Judson | |
| 6,199,106 B1 | 3/2001 | Shaw et al. | |
| 6,223,188 B1 | 4/2001 | Albers et al. | |
| 6,240,555 B1 | 5/2001 | Shoff et al. | |
| 6,247,047 B1 | 6/2001 | Wolff | |
| 6,285,987 B1 | 9/2001 | Roth et al. | |
| 6,308,202 B1 | 10/2001 | Cohn et al. | |
| 6,311,211 B1 | 10/2001 | Shaw et al. | |
| 6,317,789 B1 | 11/2001 | Rakavy et al. | |
| 6,385,592 B1 | 5/2002 | Angles et al. | |
| 6,507,872 B1 * | 1/2003 | Geshwind | 709/236 |
| 6,513,069 B1 | 1/2003 | Abato et al. | |
| 6,591,245 B1 | 7/2003 | Klug et al. | |
| 6,615,251 B1 | 9/2003 | Klug et al. | |
| 6,708,203 B1 | 3/2004 | Makar et al. | |
| 6,769,019 B2 | 7/2004 | Ferguson | |
| 6,792,445 B1 | 9/2004 | Jones et al. | |

| | | | |
|---|---|---|---|
| 6,823,327 B1 | 11/2004 | Klug et al. | |
| 6,892,354 B1 | 5/2005 | Servan-Schreiber et al. | |
| 7,089,224 B1 | 8/2006 | Klug et al. | |
| 7,412,434 B1 | 8/2008 | Klug et al. | |
| 7,529,725 B1 | 5/2009 | Klug et al. | |
| 2004/0010546 A1 | 1/2004 | Klug et al. | |
| 2008/0288478 A1 | 11/2008 | Klug | |
| 2009/0070351 A1 | 3/2009 | Klug | |

FOREIGN PATENT DOCUMENTS

| | | |
|---|---|---|
| EP | 0711090 | 5/1996 |
| JP | 07028724 | 7/1993 |
| WO | WO96/08756 | 3/1996 |

OTHER PUBLICATIONS

Author Unknown, "News from Newshare Corp.; Clickshare Universal-ID, profiling and micro-transaction system enters alpha; personalized "test drives" begin", Business Wire, Oct. 23, 1995.

Author Unknown, "One-bill, universal-password access to Internet information available by subscription of "by click" early next year via Newshare Corp.'s "Clickshare" publishing system; advertisers can track systemwide visits by anonymous user", Business Wire, Sep. 15, 1995.

Author Unknown, "One-bill, universal-password access to Internet information available by subscription of "by click" early next year via Newshare Corp.'s "Clickshare" publishing system; advertisers can track systemwide visits by anonymous user", Business Wire, Sep. 15, 1995.

Author Unknown, "The Checkfree Wallet Enables Secure Internet Purchases", PR Newswire, Apr. 10, 1995.

Baker, Steven, "Satellites and faxes on the Internet", UNIX Review, vol. 11, No. 12, pp. 23-32, Dec. 1993.

Baron et al., "Implementing a Web Shopping Cart", Dr. Dobb's Journal, No. 251, pp. 64-85, 1996.

Buck, S. Peter, "Electronic commerce—would, could and should you use current Internet payment mechanisms?", Internet Research: Electronic Networking Applications and Policy, vol. 6, No. 2/3, pp. 5-18, 1996.

Davison, Andrew, "Coding with HTML Forms", Dr. Dobb's Journal, No. 231, pp. 70-75 and 106-109, Jun. 1995.

Dutt, G. Dinesh, "CGI and the World Wide Web", Dr. Dobb's Journal, No. 244, pp. 42-50 and 92-96, Feb. 1996.

Fickenscher, Lisa, "Discover's Virtual Card Follows Users Around the Web", The American Banker, Feb. 3, 2000.

Hämmäinen et al., "Distributed Form Management", ACM Transactions on Information Systems, vol. 8, No. 1, pp. 50-76, Jan. 1990.

Hill, G. Christian, "Group of Firms Propose Standard for Privacy on Net," The Wall Street Journal, (May 27, 1997), 2 pages.

Kennedy, James, "Opinion-is 'Irritainment' Good for Advertisers?", World Internet Adveritisn Report, http://www.internet.com, Mecklermedia Corp., 4 pages, 1996.

Kerven, David, "HTML 3 How-To", Waite Group Press, Corte Madera, CA, pp. 326-329, 1996.

Pitt, Brad, Internet Pathfinder, E-Mail News Web-Business News, Internet leaders to Offer Privacy Protection, (no date), 2 pages.

Sirbu et al., "NetBill: An Internet Commerce System Optimized for Network-Delivered Services", Digest of Papers—Compcon '95—Technologies for the Information Superhighway, vol. 2, No. 4, Aug. 1995.

Sirbu et al., "NetBill: An Internet Commerce System Optimized for Network-Delivered Services", IEEE Personal Communications, San Francisco, CA, vol. 2, No. 4, Mar. 5-9 1995.

Slater, A.F., "Controlled by the Web", Computer Networks and ISDN Systems, No. 27, pp. 289-295, 1994.

Taylor, Catharine P., "Interstitial Ads Make an Appearance", Interactive Week, Cybermedia Online Contents, Services and Communications, p. 29, May 19, 1997.

Welz, Gary, "A ripening Internet market, secure systems, and digital currency are reshaping global commerce", Internet World, pp. 36-41, Jun. 1995.

World, "Netscape Pitches OPS for Push Delivery," (May 26, 1997), 1 page.

Yamada, Ken, "Tracking a Silent Threat", Computer Reseller News, ISSN: 0893-8377, p. 45, Jun. 19, 1995.

"About I/CODE: A Universal Registration System," Internet Profiles Corporation, http://www.ipro.com.

Mahon, P. V., "Sesame V2 Public Key & Authorisation Extentions to Kerberos," IEEE, (1995), pp. 114-131.

Trostle, Jonathan.T., and Neuman, B. Clifford, "A Flexible Distributed Authorization Protocol," IEEE, (1996), pp. 43-52.

Krantz, Micahel, "Web Feat: Site Auditing." MediaWeek. vol. 5. iss. 34. p. 23. Sep. 11, 1995.

C&WC Lays out Interactive TV Plans, ComputerWire, Inc., Aug. 1998.

NCR & Quadstone Help Banks Improve Service & Reduce Risk by Better Predicting Customer Behavior, M2 Communications, Jun. 1998.

Complaint and Jury Demand, *Registrar Systems LLC vs. Amazon. com*, Target Corporation and Target.com, Case 1:05-cv-02676-MSK, 11 pages, filed Dec. 30, 2005.

Request for Ex Parte Reexamination of U.S. Patent No. 5,823,327, issued Oct. 20, 1998.

Request for Ex Parte Reexamination of U.S. Patent No. 5,790,785, issued Aug. 4, 1998.

Request for Ex Parte Reexamination of U.S. Patent No. 6,823,327, issued Nov. 23, 2004.

Order Granting Request for Ex Parte Reexamination of U.S. Patent No. 5,790,785, issued Aug. 4, 1998. Reexamination U.S. Appl. No. 90/007,961.

Kormann et al., "Risks of the Passport Single Signon Protocol", Bates Nos. AMZ-R0004886-4897, 12 pages, 2000.

Author Unknown, "The Big 3 of Net Surfing", Byte.com, 3 pages, 2005. (Bates Nos. AMZ-R0005489-0005491).

Bond, George, "Gateways to the Internet, America Online, CompuServe, and Prodigy offer Web browsers, FTP, and more, but these services aren't for everyone", BYTE.com, 5 pages, Sep. 1995. (Bates Nos. AMZ-R0005492-0005496).

Berners-Lee et al., "World-Wide Web: The Information Universe", 9 pages, date unknown. (Bates Nos. AMZ-R0005646-0005654).

Borghoff et al., "Distributed Systems: A Comprehensive Survey", Mathematisches Institut und Institut fur Informatik Techn Univ Munchen, 85 pages, Nov. 1998. (Bates Nos. AMZ-R0005655-0005739).

Author Unknown, "E-commerce turns 10", CNET Networks, Inc., CNET News.com, 3 pages, Aug. 11, 2004. Bates Nos. AMZ-R0005740-0005742).

Author Unknown, "E-commerce turns 10", CNET Networks, Inc., CNET News.com, 5 pages, Aug. 11, 2004. (Bates Nos. AMZ-R0005743-0005747).

Freedman, Avi, "Vermont Teddy Bears", Google newsgroup thread, Google Groups, 1 page, Nov. 1, 1994, (Bates No. AMZ-R0005748).

Baxter, Anthony, "hmmm . . . servers producing per-browser customized output", 1 page, Nov. 2, 1994. (Bates No. AMZ-R0005749).

Behlendorf, Brian, "hmmm . . . servers producing per-browser customised output", 1 page, Nov. 2, 1994. (Bates No. AMZ-R0005750).

Marrs, Bill, "How to protect pages (not with passwd file)", Google Groups, 1 page, Dec. 12, 1994. (Bates No. AMZ-R0005751).

Author Unknown, "NetMarket: PGP Help", The NetMarket Company, netmarket.com, 3 pages, 1994. (Bates Nos. AMZ-R0005752-0005754).

Hamer, Christian, "Announce:Condom Country Holiday Features", 1 page, Dec. 14, 1994. (Bates No. AMZ-R0005755).

Mullen et al., "A Simple Computational Market for Network Information Services", 7 pages, date unknown. (Bates Nos. AMZ-R0005756-0005762).

Various Authors, "HTTP-wg Archive by date", Archive of Message Postings, 5,503 pages, Sep. 30, 1994-Jan. 9, 1996. (Bates Nos. AMZ-R005763-R0011265).

Seidman, Robert D., "In, Around and Online, Issue 2.11—Week Ending Mar. 17, 1995", 6 pages, Mar. 18, 1995. (Bates Nos. AMZ-R0011266-0011271).

Baty et al., "InterShop: Enhancing the vendor/customer dialect in electronic shopping", Journal of Management Information Systems: JMIS, vol. 11, No. 4, pp. 9-31, Spring 1995. (Bates Nos. AMZ-R0011272-0011282).

Lapham, Chris, "The Cutting Edge, Your Oasis on the Net", Computer-Mediated Communication Magazine, vol. 2, No. 5, 4 pages, May 1, 1995. (Bates Nos. AMZ-R0011283-0011286).

Townson, Patrick A., "TELECOM Digest", International Telecommunication Union, Genevia, Switzerland, vol. 15, Issue 251, 536 pages, May 23, 1995. (Bates. Nos. AMZ-R0011287-0011822).

Hauser et al., "Generic Extensions of WWW Browsers", IBM Research Division, Zurich Switzerland, 6 pages, Jun. 23, 1995. (Bates Nos. AMZ-R0011823-0011828).

Gifford et al., "Payment Switches for Open Networks", USENIX Workshop on Electronic Commerce, New York, New York, 8 pages, Jul. 1995. (Bates Nos. AMZ-R0011829-0011836).

Dedrick, Rick, "A Consumption Model for Targeted Electronic Advertising", IEEE Multimedia, pp. 41-49, Summer 1995. (Bates Nos. AMZ-R0011837-0011845).

Wetherall et al., "Active Pages: Intelligent Nodes on the World Wide Web", MIT Laboratory for Computer Science, 8 pages, Mar. 31, 1994. (Bates Nos. AMZ-R0011846-00118453).

Author Unknown, "The Compuserve Commitment to Electronic Shopping", CompuServe Magazine, 2 pages, May 1994. (Bates Nos. AMZ-R0011854-0011855).

Author Unknown, "info Highway, News of the Internet", InfoHighway Ltd., Essex, UK vol. 1, No. 2, pp. 1-16, Jun. 20, 1994. (Bates Nos. AMZ-R0011856-0011871).

Hirai, Eiji, "Re: Noteworthy on the internet yet?", Google, 2 pages, Jul. 15, 1994. (Bates No. AMZ-R0011872-0011873).

Kohn, Daniel, "Noteworthy Music Compact Discs on the net & Web (mail-order catalog)", Google Groups, 1 page, Jul. 21, 1994. (Bates No. AMZ-R0011874).

Birmingham, Mark, "800-The-Rose" Flowers on the Net & Web (online flower ordering), Google Groups, 1 page, Jul. 22, 1994. (Bates No. AMZ-R0011875).

Kohn, Daniel, "Will Noteworthy take international orders for CDs", Google Groups, 1 page, Jul. 27, 1994. (Bates No. AMZ-R0011876).

Haskin, Guy, "Announce: International Shipping for Noteworthy Music on the Internet", Google Groups, 1 page, May 8, 1994. (Bates No. AMZ-R0011877).

Leach, Harold, "MIT Enterprise Forum—workshop on marketing for entrepreneurs", Google Groups, 1 page, Aug. 17, 1994. (Bates No. AMZ-R0011878).

Haskin, Guy, "Announce: Fringe Science Books Available on the Internet", Google Groups, 1 page, Sep. 5, 1994. (Bates No. AMZ-R00118879).

Haskin, Guy, "Announce: Wines, Fringe Science and Big Band on WWW", Google Groups, 1 page, Sep. 5, 1994. (Bates No. AMZ-R00118880).

Orr, Douglas B. et al., "Strange Bedfellows: Issues in Object Naming Under Unix", University of Utah, 5 pages, date unknown. (Bates Nos. AMZ-R0011881-0011885).

Hamer, Christian, "Announce:Condom Country On-Line", 1 page, Sep. 26, 1994. (Bates No. AMZ-R0011886).

Hamer, Christian, "Announce:Condom Country On-Line", 1 page, Sep. 26, 1994. (Bates No. AMZ-R0011887).

Hamer, Christian, "Announce:Condom Country On-Line", 1 page, Sep. 26, 1994. (Bates No. AMZ-R0011888).

Hamer, Christian, "Announce:Condom Country On-Line", 1 page, Sep. 26, 1994. (Bates No. AMZ-R0011889).

Various Authors, "Electronic Proceedings of the Second World Wide Web Conference '94: Mosaic and the Web", Archive of Message Postings, 1,677 pages, Oct. 20, 1994. (Bates Nos. AMZ-R0011890-0013566).

Maurer et al., "J.USC—The Next Generation in Electronic Journal Publishing", Graz University of Technology, Austria, pp. 117-26m date unknown. (Bates Nos. AMZ-R0013567-0013576).

Tait, Carl Downing, "A File System for Mobile Computing", Columbia University, 130 pages, 1993. (Bates Nos. AMZ-R0013577-706).

Azadok, E., "HLFSD: Delivering Email to Your $Home", Columbia University, pp. 1-15, date unknown. (Bates Nos. AMZ-R0013707-0013721).

Zhou, Songnian, "UTOPIA: A Load Sharing Facility for Large, Heterogeneous Distributed Computer Systems", Computer Systems Research Institute, pp. 1-36, Apr. 1992. (Bates Nos. AMZ-R0013722-0013758).

Abbey, Jonathan, "The Group Administration Shell and the GASH Network Computing Environment", LISA, pp. 911-924, Sep. 19-24, 1994. (Bates Nos. AMZ-R0013759-0013772).

Dedrick, Rick, "Interactive Electronic Advertising", IEEE, pp. 55-66, date unknown. (Bates Nos. AMZ-R0013773-0013784).

Author Unknown, "First Virtual's Information Warehouse", 15 pages, date unknown. (Bates Nos. AMZ-R0013785-0013799).

Lih et al., "PGMAKE: A Portable Distributed Make System", Columbia University, pp. 1-5, date unknown. (Bates Nos. AMZ-R0013800-0013804).

Hanna, Sherman, "Section 3. The Economics of Information", The Ohio State University, 7 pages, 1994. (Bates Nos. AMZ-R0013805-0073811).

Author Unknown, Advertisement: "Pathfinder, from Time Warner", 1 page, Nov. 28-Dec. 4, 1994. (Bates No. AMZ-R0013812).

Tierney, Mark, "A world of information at your fingertips", Broadcom Eircann Research Ltd., 9 pages, date unknown. (Bates Nos. AMZ-R0013813-0013821).

Maurer, H., "Hyper-G: Advancing the Ideas of World-Wide-Web", Institute for Information Processing and Supported New Media, Graz. University of Technology, Graz/Austria, 3 pages, Mar. 1994. (Bates Nos. AMZ-R0013822-0013824).

Dannenberg et al., "A Butler Process for Resource Sharing on Spice Machines", ACM Transactions on Office Information Systems, vol. 3, No. 3, pp. 234-252, Jul. 1985. (Bates Nos. AMZ-R0013825-0013843).

Peterson, Larry L., "A Yellow-Pages Service for a Local-Area Network", ACM, pp. 235-242, 1988. (Bates Nos. AMZ-R0013844-0013851).

Hess, David K., "A Unix Network Protocol Security Study: Network Information Service", Texas A&M University, 5 pages, date unknown. (Bates Nos. AMZ-R0013852-0013856).

Welch, Brent Ballinger, "Naming, State Management, and User-Level Extensions in the Sprite Distributed File System", Source Unknown, 201 pages, 1990. (Bates Nos. AMZ-R0013857-R0014057).

Baker et al., "Measurements of a Distributed File System", Electrical Engineering and Computer Sciences, University of California, pp. 1-15, Jul. 25, 1991. (Bates Nos. AMZ-R0014058-0014072).

McManis et al., "Solaris ONC, Network Information Service Plus (NIS+), A White Paper", SunSoft, Inc., 25 pages, 1991. (Bates Nos. AMZ-R0014073-0014097).

Schwartz et al., "A Comparison of Internet Resource Discovery Approaches", Computing Systems, vol. 5, No. 4, pp. 1-16, Aug. 1992. (Bates Nos. AMZ-R0014098-0014114).

Schonwalder, "Administration of large distributed UNIX LANs with BONES", Institute for Operating Systems and Computer Networks, 7 pages, date unknown. (Bates Nos. AMZ-R0014115-0014121).

Andrews et al., "On Second Generation Hypermedia Systems", pp. 127-133 and 245-247, date unknown. (Bates Nos. AMZ-R0014122-001431).

Lantz, Keith A., "Towards a Universal Directory System", AMC, pp. 250-260, 1985. (Bates Nos. AMZ-R0014132-001142).

Sandberg et al., "Design and Implementation of the Sun Network filesystem", Sun Microsystems, 12 pages, Summer 1985. (Bates Nos. AMZ-R0014143-0014154).

Dawson, Frank, "Electronic Business Card Specification, A Contribution from Apple, AT&T, IBM, Siemens Rolm, and Counterpoint Systems", Draft 5, 32 pages, Jan. 10, 1996. (Bates Nos. AMZ-R0014155-0014186).

Author Unknown, E-mail to Frank Dawson, 4 pages, Oct. 30, 1995. (Bates Nos. AMZ-R0014187-0014190).

Dawson, Frank, "Electronic Business Card Specification, A Contribution from Apple, AT&T, IBM, Siemens Rolm, and Counterpoint Systems", Draft Specification, 29 pages, Dec. 4, 1995. (Bates Nos. AMZ-R0014191-0014219).

Dawson, Frank, "Electronic Business Card (vCard) Specification", Draft Final Specification, 51 pages, Feb. 16, 1996. (Bates Nos. AMZ-R0014220-0014270).

Alden et al., "vCard, The Electronic Business Card, Version 2.0", *versit* Consortium Specification, 32 pages, Apr. 29, 1996. (Bates Nos. AMZ-R0014271-0014307).

Alden et al., "vCard, The Electronic Business Card, Version 2.1", 32 pages, Sep. 18, 1996. Bates Nos. AMZ-R0014308-0014339).

Author Unknown, "Build a Web Site, The Programmer's Guide to Creating, Building, and Maintaining a Web Presence", Prima Online, 2 pages, 1995. (Bates Nos. AMZ-R0014340-0014341).

Wang, Wallace, "CompuServe for Dummies, A Reference for the Rest of Us!", IDG Books, 2 pages, 1994. (Bates Nos. AMZ-R0014342-0014343).

Bowen et al., "How to get the most out of Compuserve", The Bantam On-Line Services Library, 2 pages, 1989. (Bates Nos. AMZ-R0014344-0014345).

Tatters, Wes, "Navigating the Internet with CompuServe", Sams.net Publishing, 2 pages, 1995. (Bates Nos. AMZ-R0014346-0014347).

Author Unknown, "Prodigy Made Easy", Second Edition, Osborne McGraw-Hill, 2 pages, 1993. (Bates Nos. AMZ-R0014348-0014349).

Viescas, John L., "The Official Guide to the Prodigy Service", Microsoft Press, 2 pages, 1991. (Bates Nos. AMZ-R0014350-0014351).

Author Unknown, "Using Compuserve", Que Corporation, 2 pages, 1994. (Bates Nos. AMZ-R0014352-0014353).

Author Unknown, "Using Mosaic", Que Corporation, 2 pages, 1994. (Bates Nos. AMZ-R0014354-5).

Author Unknown, "Condom Country", The Condom Country Homepage, 43 pages, date unknown. (Bates Nos. AMZ-R0014356-00143598).

Author Unknown, "Condom Country", pages from the Condom Country web site, 59 pages, date unknown. (Bates Nos. AMZ-R0014399-00143457).

McCandlish, Stanton, "EduPage note on CyberCash "digital purse" e-money rollout", Google, 1 page, Sep. 14, 1994. (Bates No. AMZ-R0014458).

Millison, Doug, Web Posting on Google, 10 pages, Apr. 11, 1995. (Bates Nos. AMZ-R0014459-0014468).

Melton, William N., "Management", cybercash.com, 3 pages, date unknown. (Bates Nos. AMZ-R0014469-0014471).

Author Unknown, "Financial Services Whitepaper", cybercash.com, 13 pages, date unknown. (Bates Nos. AMZ-R0014472-0014484).

Author Unknown, "CyberCash Benefits", cybercash.com, 2 pages, date unknown. (Bates Nos. AMZ-R0014485-0014486).

Author Unknown, "Merchant Benefits", cybercash.com, 3 pages, date unknown. (Bates Nos. AMZ-R0014487-0014489) .

Author Unknown, "Merchant Services Whitepaper", cybercash.com, 12 pages, date unknown. (Bates Nos. AMZ-R0014490-0014501).

Author Unknown, "CyberCash Overview", cybercash.com, 2 pages, date unknown. (Bates Nos. AMZ-R0014502-0014503).

Author Unknown, "CyberCash, Inc. Privacy Code", cybercash.com, 2 pages, date unknown. (Bates Nos. AMZ-R0014504-0014505).

Eastlake et al., "CyberCash Credit Card Protocol Version 0.8", 58 pages, Oct. 31, 1995. (Bates Nos. AMZ-R0014506-0014563).

Author Unknown, "Getting Started at CyberCash Merchant: Part 2", cybercash.com, 14 pages, date unknown. (Bates Nos. AMZ-R0014564-0014577).

Author Unknown, "Getting Started at CyberCash Merchant: Part 1", cybercash.com, 17 pages, date unknown. (Bates Nos. AMZ-R0014578-0014594).

Author Unknown, "Getting the CyberCash Wallet", cybercash.com, 3 pages, date unknown. (Bates Nos. AMZ-R0014595-0014597).

Author Unknown, "The Six Steps in a Secure Internet Credit Card Payment", cybercash.com, 2 pages, date unknown. (Bates Nos. AMZ-R0014598-0014599).

Author Unknown, "What the Media is Saying . . . ", cybercash.com, 13 pages, date unknown. (Bates Nos. AMZ-R0014600-0014612).

Poler, Ariel, "Improving WWW Marketing through User Information and Non-Intrusive Communications", Internet Profiles Corporation, 3 pages, date unknown. (Bates Nos. AMZ-R0014613-0014615).

Poler, Ariel, Web Posting on Google, 1 page, Nov. 15, 1994. (Bates No. AMZ-R0014616).

Author Unknown, "About I/PRO", ipro.com, 5 pages, date unknown. (Bates Nos. AMZ-R0014617-0014621).

Author Unknown, "Notice", I/PRO, 42 pages, Mar. 1995. (Bates Nos. AMZ-R0014622-0014663).

Author Unknown, "PR Newswire Website Directory", PR Newswire, 11 pages, Apr. 17, 1996-2002. (Bates Nos. AMZ-R0014664-0014674).

Wolfe, Michael, Web Posting on Google, 1 page, Apr. 6, 1995. (Bates No. AMZ-R0014675).

Author Unknown, "Software tracks Web demographics", PC Week, vol. 12, Issue 14, 1 page, Apr. 10, 1995. (Bates No. AMZ-R0014676).

Millison, Doug, Web Posting on Google, 8 pages, Apr. 11, 1995. (Bates Nos. AMZ-R0014677-0014684).

Author Unknown, "I/PRO meters Web advertising exposure", Seybold Report on Desktop Publishing, vol. 9, No. 9, 3 pages, 1996. (Bates Nos. AMZ-R0014685-0014687).

Author Unknown, "US firm to track true cost of Internet use", Publishing Technology Review, vol. 2, Issue 6, 2 pages, May 1, 1995. (Bates Nos. AMZ-R0014688-0014689).

Author Unknown, "Market research firms target Web traffic data", PC Week, vol. 12, Issue 21, 2 pages, May 29, 1995. (Bates Nos. AMZ-R0014690-0014691).

Author Unknown, "Articles", google.com, 5 pages, Jun. 20, 1995. (Bates Nos. AMZ-R0014692-0014696).

Author Unknown, "Compuserve to Track Users During Internet Hunt", Media Daily, vol. 3, Issue 119, 2 pages, Jun. 20, 1995. (Bates Nos. AMZ-R0014697-0015698).

Author Unknown, "News Products", SunWorld Online, 13 pages, Jul. 1995. (Bates Nos. AMZ-R0014699-0014711).

Kennedy et al., "Making Money Online", SunWorld, 17 pages, Sep. 1995. (Bates Nos. AMZ-R0014712-0014728).

Author Unknown, "The Medium is the Measure", ADWEEK Eastern Addition, 5 pages, Sep. 25, 1995. (Bates Nos. AMZ-R0014729-0014733).

Dawson, Keith, "TBTF for Oct. 1, 1995: Web-site registration and privacy", 4 pages, Oct. 1, 1995. (Bates Nos. AMZ-R0014734-0014737).

Romney, Jason, "Jason Romney's Business on the Internet keynote address", 14 pages, Oct. 10, 1995. (Bates Nos. AMZ-R0014738-0014751).

Brown et al., "Privacy and the NII: Safeguarding Telecommunications-Related Personal Information", 48 pages, Oct. 1995. (Bates Nos. AMZ-R0014752-0014799).

Author Unknown, "I/PRO to test audits of websites for BPA members", Business Publisher, vol. 10, Issue 7, 2 pages, Oct. 31, 1995. (Bates Nos. AMZ-R0014800-0014801).

Author Unknown, "I/PRO and Genesis Team for Website Measurement", Newsbytes PM, 2 pages, Jan. 30, 1996. (Bates Nos. AMZ-R0014802-0014803).

Author Unknown, "Interactive Advertising", Report on Electronic Commerce, vol. 3, Issue 5, 2 pages, Mar. 5, 1996. (Bates Nos. AMZ-R0014804-0014805).

Author Unknown, "Your webpage: get what you pay for", Forbes, vol. 157, Issue 7, 5 pages, Apr. 8, 1996. (Bates Nos. AMZ-R0014806-0014810).

Creedy, Steve, "Counting Heads on the Web Internet Sites Want Visitors to Register So They Can Customize Content", Pittsburgh Post Gazette, 2 pages, May 12, 1996. (Bates Nos. AMZ-R0014811-0014812).

Author Unknown, "Online", Report on Electronic Commerce, vol. 3, Issue 11, 4 pages, May 28, 1996. (Bates Nos. AMZ-R0014813-0014816).

Author Unknown, "I/Pro Seeks New Registration System, Shelves I/Code", Media Daily, vol. 4, Issue 5, 2 pages, Nov. 8, 1996. (Bates Nos. AMZ-R0014817-0014818).

Author Unknown, "Recent I/Pro Announcements", I/Pro, 2 pages, Jun. 23, 1997. (Bates Nos. AMZ-R0014819-0014820).

Author Unknown, "I/Audit for Ad Networks", Nielson, 3 pages, date unknown. (Bates Nos. AMZ-R0014821-0014823).

Author Unknown, "I/Audit TopLine", Nielson, 2 pages, date unknown. (Bates Nos. AMZ-R0014824-0014825).

Author Unknown, "Comparative Analysis. Report: McNet, Inc.—Nielson I/PRO Web Averages", Nielson, 1 page, date unknown. (Bates No. AMZ-R0014826).
Author Unknown, "Comparative Analysis Report: McNet, Inc.—Average Pages Per Visit", Nielson, 1 page, date unknown. (Bates No. AMZ-R0014827).
Author Unknown, "AdResults", Nielson, 1 page, date unknown. (Bates No. AMZ-R0014828).
Author Unknown, "I/Audit", Nielson, 5 pages, date unknown. (Bates Nos. AMZ-R0014829-0014833).
Author Unknown, "Comparative Analysis Report: McNet, Inc.—Depth and Duration Visit", Nielson, 1 page, date unknown. (Bates No. AMZ-R0014834).
Author Unknown, "Comparative Analysis Report: McNet, Inc.—% of Traffic of U.S. Origin", Nielson, 1 page, date unknown. (Bates No. AMZ-R0014835).
Author Unknown, "Comparative Analysis Report: McNet, Inc.—Percent of Total Traffic by Non-U.S. Country of Origin", Nielson, 1 page, date unknown. (Bates No. AMZ-R0014836).
Author Unknown, "Comparative Analysis Report: McNet, Inc.—Percent of Traffic by U.S. Hierarchy", Nielson, 1 page, date unknown. (Bates No. AMZ-R0014837).
Author Unknown, "Comparative Analysis Report: McNet, Inc.—Percentage Change in Average Daily Visits", Nielson, 1 page, date unknown. (Bates No. AMZ-R0014838).
Author Unknown, "Comparative Analysis Report: McNet, Inc.—Average Visit Length", Nielson, 1 page, date unknown. (Bates No. AMZ-R0014839).
Author Unknown, "Branch Mall", 1 page, date unknown. (Bates No. AMZ-R0014840).
Author Unknown, "CommerceNet", 1 page, date unknown. (Bates No. AMZ-R0014841).
Author Unknown, "Directories", 1 page, date unknown. (Bates No. AMZ-R0014842).
Author Unknown, "Order Confirmation", 1 page, date unknown. (Bates No. AMZ-R0014843).
Author Unknown, "Internet Shopping Network", 1 page, date unknown. (Bates No. AMZ-R0014846).
Author Unknown, "Internet Shopping Network", 1 page, date unknown. (Bates No. AMZ-R0014847).
Author Unknown, "Welcome to OpenMarket", 1 page, date unknown. (Bates No: AMZ-R0014851).
Author Unknown, "Videos", 2 pages, date unknown. (Bates Nos. AMZ-R0015852-0014853).
Author Unknown, "NetMarket Storefront Development Agreement", 2 pages, Mar. 9, 1995. (Bates Nos. AMZ-R0014854-0014865).
Author Unknown, "NetMarket Storefront Development Agreement", 13 pages, Apr. 18, 1995. (Bates Nos. AMZ-R0014866-0014878).
Author Unknown, "Table of Contents", 6 pages, date unknown. (Bates Nos. AMZ-R0014879-0014884).
Kohn, Daniel M., Letter to Rick Flynn, 2 pages, Apr. 4, 1995. (Bates Nos. AMZ-R0014885-0014886).
Kohn, Daniel M., Letter to Mr. Rick Flynn, 2 pages, Apr. 5, 1995. (Bates Nos. AMZ-R0014887-0014888).
Author Unknown, "NetMarket Storefront Development Agreement", 6 pages, Feb. 22, 1995. (Bates Nos. AMZ-R0014889-0014904).
Author Unknown, "NetMarket Storefront Development Agreement", 16 pages, Feb. 22, 1995. (Bates Nos. AMZ-R0014905-0014920).
Author Unknown, "Land's End on the Internet", 5 pages, date unknown. (Bates Nos. AMZ-R0014921-0014925).
Author Unknown, "Letter of Intent Between Lands' End, Inc. and The NetMarket Company", 3 pages, Jan. 12, 1995. (Bates Nos. AMZ-R0014926-0014928).
Author Unknown, "Letter of Intent Between Lands' End, Inc. and the NetMarket Company", 3 pages, Jan. 17, 1995. (Bates Nos. AMZ-R0014929-0014931).
Author Unknown, "Contract for the MIT Electronic Catalog Design and "Lab" Phases", 12 pages, Apr. 11, 1995. (Bates Nos. AMZ-R0014932-0014943.
Author Unknown, "Contract for the MIT Electronic Catalog", 11 pages, Apr. 11, 1995. (Bates Nos. AMZ-R0014944-0014954).
Author Unknown, "Contract for the MIT Electronic Catalog Design and "Lab" Phases", 12 pages, Apr. 20, 1995. (Bates Nos. AMZ-R0014955-0014966).
Author Unknown, "The MIT Electronic Catalog", 4 pages, date unknown. (Bates Nos. AMZ-R0014967-0014970).
Author Unknown, "Letter of Intent Between Newbury Comics, Inc. and The NetMarket Company", 3 pages, Jan. 25, 1995. (Bates Nos. AMZ-R0014971-0014973).
Author Unknown, "Letter of Intent Between Newbury Comics, Inc. and The NetMarket Company", 3 pages, Jan. 16, 1995. (Bates Nos. AMZ-R0014974-0014976).
Author Unknown, "Letter of Intent Between Newbury Comics, Inc. and The NetMarket Company", 3 pages, Feb. 6, 1995. (Bates Nos. AMZ-R0014977-0014979).
Author Unknown, "Letter of Intent Between Newbury Comics, Inc. and The NetMarket Company", 3 pages, Jan. 30, 1995. (Bates Nos. AMZ-R0014981-0014983).
Author Unknown, "Agreement", 9 pages, Feb. 6, 1995. (Bates Nos. AMZ-R0014984-0014992).
Author Unknown, "Agreement", 10 pages, Feb. 6, 1995. (Bates Nos. AMZ-R0014993-0015002).
Author Unknown, "Agreement", 12 pages, Feb. 14, 1995. (Bates Nos. AMZ-R0015003-0015014).
Author Unknown, "NetMarket Storefront Development Agreement", 13 pages, Feb. 15, 1995. (Bates Nos. AMZ-R0015015-0015027).
Author Unknown, "NetMarket Storefront Development Agreement", 13 pages, Feb. 16, 1995. (Bates Nos. AMZ-R0015028-0015040).
Author Unknown, "NetMarket Storefront Development Agreement", 13 pages, Feb. 16, 1995. (Bates Nos. AMZ-R0015041-0015053).
Author Unknown, "NetMarket Storefront Development Agreement [Template]", 13 pages, Feb. 20, 1995. (Bates Nos. AMZ-R0015054-0015066).
Author Unknown, Agreement between NFO Research, Inc. and The NetMarket Company, 8 pages, May 4, 1995. (Bates Nos. AMZ-R0015067-0015074).
Author Unknown, "Sales Agency Agreement", 14 pages, Jun. 1, 1994. (Bates Nos. AMZ-R0015075-0015088).
Author Unknown, "Merchant Agreement", 14 pages, 1994. (Bates Nos. AMZ-R0015089-0015102).
Author Unknown, "CUC-centric versus non-CUC work", 2 pages, date unknown. (Bates Nos. AMZ-R0015103-0015104).
Harai, Eiji, Letter to Mr. Willie Doyle, 2 pages, Jan. 31, 1994. (Bates Nos. AMZ-R0015105-0015106).
Author Unknown, Spreadsheet, 2 pages, date unknown. (Bates Nos. AMZ-R0015107-0015108).
Lee, Roger, Memo to Craig Adams, 1 page date unknown. (Bates No. AMZ-R0015109).
Author Unknown, "Suggested inserts to be added to Section 5", 2 pages, date unknown. (Bates Nos. AMZ-R0015110-0015111).
Author Unknown, "Sales Agency Agreement", 13 pages, Feb. 9, 1994. (Bates Nos. AMZ-R0015112-0015124).
Author Unknown, "Sales Agency Agreement", 13 pages, Mar. 25, 1994. (Bates Nos. AMZ-R0015125-0015137).
Author Unknown, "Sales Agency Agreement", 13 pages, Mar. 29, 1994. (Bates Nos. AMZ-R0015138-0015150).
Author Unknown, Spreadsheet, 6 pages, date unknown. (Bates Nos. AMZ-R0015151-0015156).
Rog., Letter to Dan, 1 page, date unknown. (Bates No. AMZ-R0015157).
Author Unknown, "NCSA Mosaic: Document View—The NetMarket Company", 1 page, date unknown. (Bates No. AMZ-R0015158).
Author Unknown, "NCSA Mosaic: Document View—Noteworthy Music Compact Disk Catalog", 1 page, date unknown. (Bates No. AMZ-R0015159).
Author Unknown, "NCSA Mosaic: Document View—About Noteworthy Music", 1 page, date unknown. (Bates No. AMZ-R0015160).
Author Unknown, "NCSA Mosaic: Document View—Noteworthy Music: Popular Titles", 1 page, date unknown. (Bates No. AMZ-R0015161).
Author Unknown, "NCSA Mosaic: Document View—Police", 1 page, date unknown. (Bates No. AMZ-R0015162).

Author Unknown, "NCSA Mosaic: Document View—Noteworthy Music: Shopping List", 1 page, date unknown. (Bates No. AMZ-R0015163).
Lee, Roger, Letter to Mr. Don Soto, 2 pages, Jun. 12, 1994. (Bates Nos. AMZ-R0015164-0015165).
Author Unknown, "Sales Agency Agreement", 13 pages, Feb. 9, 1994. (Bates Nos. AMZ-R0015166-0015178).
Author Unknown, "Sales Agency Agreement", 13 pages, Feb. 9, 1994. (Bates Nos. AMZ-R0015179-0015191).
Author Unknown, "Sales Agency Agreement", 14 pages, Jun. 1, 1994. (Bates Nos. AMZ-R0015192-0015205).
Author Unknown, "Executive Summary", 14 pages, date unknown. (Bates Nos. AMZ-R0015206-0015219).
Lee, Roger, Letter to Mr. Craig Adams, 2 pages, Jan. 17, 1994. (Bates Nos. AMZ-R0015220-0015221).
Lee, Roger, Letter to Mr. Craig Adams, 2 pages, Jan. 17, 1994. (Bates Nos. AMZ-R0015222-0015223).
Author Unknown, "Executive Summary", 8 pages, date unknown. (Bates Nos. AMZR0015224-0015231).
Lee, Roger, Letter to Mr. Craig Adams, 2 pages, Jan. 17, 1994. (Bates Nos. AMZ-R0015232-0015233).
Author Unknown, "Executive Summary", 14 pages, date unknown. (Bates Nos. AMZ-R0015234-0015247).
Lee, Roger, Fax to Peter Pellam, 1 page, date unknown. (Bates No. AMZ-R0015248).
Lee, Roger, Memo to Annagret Burtchy, 2 pages, date unknown. (Bates Nos. AMZ-R0015249-0015250).
Haskin, Guy H. T., Fax to Peter Gauvin, 2 pages, Aug. 11, 1994. (Bates Nos. AMZ-R0015255-0015256).
Kohn, Daniel M., Letter to Rod Larmee, 1 page, Aug. 16, 1994. (Bates No. AMZ-R0015257).
Lee, Roger, Letter to Ms. Michelle Johnson, 1 page, Aug. 9, 1994. (Bates No. AMZ-R0015258).
Author Unknown, Letter to Mr. Dave Wallace, 3 pages, date unknown. (Bates Nos. AMZ-R0015259-0015261).
Lee, Roger, Letter to Mr. Dave Wallace, 4 pages, Feb. 17, 1994. (Bates Nos. AMZ-R0015262-0015265).
Lee, Roger, Letter to Mr. Dave Wallace, 3 pages, Feb. 21, 1994. (Bates Nos. AMZ-R0015266-0015268).
Lee, Roger, Letter to Mr. Dave Wallace, 3 pages, Feb. 21, 1994. (Bates Nos. AMZ-R0015269-0015271).
Lee, Roger, Letter to Mr. Dave Wallace, 3 pages, Feb. 21, 1994. (Bates Nos. AMZ-R0015272-0015274).
Lee, Roger, Letter to Mr. Steve Young, 1 page, Aug. 9, 1994. (Bates No. AMZ-R0015275).
Lee, Roger, Letter to Mrs. Carol J. Loomis, 4 pages, Mar. 21, 1994. (Bates Nos. AMZ-R0015276-0015279).
Lee, Roger, Letter to Mrs. Carol J. Loomis, 4 pages, Mar. 31, 1994. (Bates Nos. AMZ-R0015280-0015283).
Lee, Roger, Letter to Mrs. Carol J. Loomis, 2 pages, Mar. 31, 1994. (Bates Nos. AMZ-R0015284-0015285).
Kohn, Daniel M., Letter to Peter Lewis, 4 pages, Aug. 3, 1994. (Bates Nos. AMZ-R0015286-0015289).
Haskin, Guy H. T., Fax to Michael Rozansky, 1 page, Jul. 25, 1994. (Bates No. AMZ-R0015290).
Haskin, Guy H. T., Letter to Jerry Byrd, 4 pages, May 17, 1994. (Bates Nos. AMZ-R0015291-0015294).
Haskin, Guy H. T., Letter to Christopher King, 4 pages, May 18, 1994. (Bates Nos. AMZ-R0015295-0015298).
Haskin, Guy H. T., Letter.To Bill Frischling, 3 pages, Jun. 2, 1994. (Bates Nos. AMZ-R0015299-0015301).
Kohn, Daniel M., Letter to Tim Cossairt, 3 pages, Apr. 19, 2006. (Bates Nos. AMZ-R0015302-0015304).
oak.cc.swarthmore.edu, E-mail regarding Apollo Brochure Questions, 5 pages, Jul. 24, 1993. (Bates Nos. AMZ-R0015305-0015309).
Kohn, Daniel, Letter and Brochure to Tim Cossairt, 6 pages, Jul. 27, 1993. (Bates Nos. AMZ-R0015310-0015315).
Kohn, Daniel, Letter and Brochure to Tim Cossairt, 6 pages, Sep. 6, 1993. (Bates Nos. AMZ-RR0015316-0015321).
Author Unknown, Spreadsheet of Cost Analysis Project, 2 pages, date unknown. (Bates Nos. AMZ-R0015322-0015323).
Kohn et al., "The Daedalus Project: A Prospectus", 12 pages, date unknown. (Bates Nos. AMZ-R0015324-0015335.
Author Unknown, "The Daedalus Project: A Prospectus", 10 pages, date unknown. (Bates Nos. AMZ-R0015336-0015345).
Author Unknown, Spreadsheet, 4 pages, date unknown. (Bates Nos. 0015346-0015349).
Author Unknown, "PC Travel on the Internet:", 5 pages, Jul. 5, 1994. (Bates Nos. AMZ-R0015352-0015356).
Kohn, Daniel M., Letter to David Lea, 2 pages, Jul. 27, 1994. (Bates Nos. AMZ-R0015357-0015358).
Author Unknown, "PC Travel and NetMarket", 3 pages, Jul. 11, 1994. (Bates Nos. AMZ-R0015359-0015361).
Author Unknown, "PC Travel and NetMarket", 4 pages, Jul. 13, 1994. (Bates Nos. AMZ-R0015362-0015365).
Kohn, Daniel M., Letter to David Lea, 1 page, Jul. 13, 1994. (Bates No. AMZ-R0015366).
Kohn, Daniel M., Letter to Mr. Ron Verbruggen, 2 pages, Jul. 14, 1994. (Bates Nos. AMZ-R0015367-0015368).
Author Unknown, "Agenda—Nov. 21, 1994", 2 pages, Nov. 21, 1994. (Bates Nos. AMZ-R0015371-0015374).
Author Unknown, "Frequently Asked Questions", 2 pages, date unknown. (Bates Nos. AMZ-R0015375-0015376).
Author Unknown, "Marketing Strategies for the NetMarket Company (Draft)", 3 pages, date unknown. (Bates Nos. AMZ-R0015377-00153791.
Author Unknown, "The NetMarketCompany", 6 pages, date unknown. (Bates Nos. AMZ-R0015380-0015385).
Author Unknown, "Introduction", 6 pages, date unknown. (Bates Nos. AMZ-R0015386-0015391).
Lee, Roger, Memo to Mr. Greg, 2 pages, Apr. 13, 1994. (Bates Nos. Amz-R0015392-0015393).
Lee, Roger, Letter to Mr. Greg Feigenbaum, 2 pages, Sep. 16, 1994. (Bates Nos. AMZ-R0015394-0015395).
Author Unknown, Letter to Mr. Greg Feigenbaum, 1 page, date unknown. (Bates No. AMZ-R0015396).
Author Unknown, "Sales Agency Agreement", 13 pages, Mar. 15, 1994. (Bates Nos. AMZ-R0015397-0015409).
Author Unknown, Spreadsheet of the NetMarket Company, 1 page, date unknown. (Bates No. AMZ-R0015410).
Lee, Roger, Letter to Ms. Lynn Feigenbaum, 1 page, Jul. 14, 1994. (Bates No. AMZ-R0015411).
Author Unknown, "Sales Agency Agreement", 13 pages, Feb. 9, 1994. (Bates Nos. AMZ-R0015412-0015424).
Author Unknown, "Eastman Kodak Company", 15 pages, Jan. 1994. (Bates Nos. AMZ-R0015425-0015439).
Kohn, Daniel M., Letter to Gordon Cook, 1 page, Feb. 15, 1995. (Bates No. AMZ-R0015440).
Author Unknown, "CUC International Acquires NetMarket Company, A Leader in Bringing Commerce to the Internet", Stamford, Connecticut, 2 pages, Nov. 15, 1994. (Bates Nos. AMZ-R0015441-0015442).
Author Unknown, "CUC International Acquires NetMarket Company, A Leader in Bringing Commerce to the Internet", Stamford, Connecticut, 2 pages, Nov. 15, 1994. (Bates Nos. AMZ-R0015443-0015444).
Kohn et al., "NetMarket Implements the First Automatic Encryption of Commercial Transactions on the Internet", Nashua New Hampshire, 3 pages, Aug. 11, 1994. (Bates Nos. AMZ-R0015447-0015449).
Kohn et al., "NetMarket Implements the First Automatic Encryption of Commercial Transactions on the Internet", Nashua New Hampshire, 3 pages, Aug. 11, 1994. (Bates Nos. AMZ-R0015450-0015452).
Author Unknown, Spreadsheet, 1 page, date unknown. (Bates No. AMZ-R0015453).
Author Unknown, Spreadsheet of Actual Revenue, 2 pages, date unknown. (Bates Nos. AMZ-R0015454-0015455).
Author Unknown, Spreadsheet, 2 pages, date unknown. (Bates Nos. AMZ-R0015456-0015457).
Author Unknown, Spreadsheet, 2 pages, date unknown. (Bates Nos. AMZ-R0015458-0015459).
Author Unknown, Spreadsheet of NetMarket Budget, 2 pages, Fiscal Year 1995. (Bates Nos. AMZ-R0015460-0015461).
Author Unknown, Spreadsheet of NetMarket Budget, 4 pages, Fiscal Year 1995. (Bates Nos. AMZ-R0015462-0015465).

Author Unknown, Spreadsheet of NetMarket Budget, 4 pages, Fiscal Year 1995. (Bates Nos. AMZ-R0015466-0015469).
Author Unknown, Spreadsheet of NetMarket Payroll, 1 page, Fiscal Year 1995. (Bates No. AMZ-R0015470).
Author Unknown, Spreadsheet, 2 pages, date unknown. (Bates Nos. AMZ-R0015471-0015472).
Author Unknown, Spreadsheet, 2 pages, date unknown. (Bates Nos. AMZ-R0015473-0015474).
Author Unknown, Spreadsheet, 8 pages, date unknown. (Bates Nos. AMZ-R0015475-0015482).
Author Unknown, Spreadsheet, 2 pages, date unknown. (Bates Nos. AMZ-R0015483-0015484).
Author Unknown, Spreadsheet, 2 pages, date unknown. (Bates Nos. AMZ-R0015485-0015486).
Author Unknown, Spreadsheet, 8 pages, date unknown. (Bates Nos. AMZ-R0015487-0015494).
Author Unknown, Spreadsheet, 2 pages, date unknown. (Bates Nos. AMZ-R0015495-0015496).
Author Unknown, Spreadsheet, 2 pages, date unknown. (Bates Nos. AMZ-R0015497-0015498).
Author Unknown, Spreadsheet, 2 pages, date unknown. (Bates Nos. AMZ-R0015499-0015500).
Author Unknown, Spreadsheet, 2 pages, date unknown. (Bates Nos. AMZ-R0015501-0015502).
Author Unknown, Spreadsheet, 2 pages, date unknown. (Bates Nos. AMZ-R0015503-0015504).
Author Unknown, Spreadsheet, 2 pages, date unknown. (Bates Nos. AMZ-R0015505-0015506).
Author Unknown, Spreadsheet, 1 page, date unknown. (Bates No. AMZ-R0015507).
Author Unknown, Spreadsheet if Phone Bill, 1 page, date unknown. (Bates No. AMZ-R0015508).
Kohn, Daniel M., Letter to Augustus Warren, 1 page, Nov. 17, 1994. (Bates No. AMZ-R0015509).
Kohn, Daniel M., Letter to Augustus Warren, 1 page, Nov. 17, 1994. (Bates No. AMZ-R0015510).
Kohn, Daniel M., Letter to Hal Pomeranz, 1 page, Nov. 14, 1994. (Bates No. AMZ-R0015511).
Author Unknown, "Original Agreement", 1 page, date unknown. (Bates No. AMZ-R0015512).
Author Unknown, "Original Agreement", 1 page, date unknown. (Bates No. AMZ-R0015513).
Kohn, Daniel M., Letter to Hal Pomeranz, 2 pages, Nov. 14, 1994. (Bates Nos. AMZ-R0015514-0015515).
Kohn, Daniel M., Letter to Jason Bluming, 1 page, Dec. 8, 1994. (Bates No. AMZ-R0015516).
Kohn, Daniel M., Letter to Jason Bluming, 1 page, Dec. 14, 1994. (Bates No. AMZ-R0015517).
Kohn, Daniel M., Letter to Josh Smith, 1 page, Nov. 17, 1994. (Bates No. AMZ-R0015518).
Kohn, Daniel M., Letter to Josh Smith, 1 page, Nov. 17, 1994. (Bates No. AMZ-R0015519).
Kohn, Daniel M., Letter to Kit Buckley, 1 page, Nov. 30, 1994. (Bates No. AMZ-R0015520).
Kohn, Daniel M., Letter to Kit Buckley, 1 page, Nov. 30, 1994. (Bates No. AMZ-R0015521).
Kohn, Daniel M., Letter to Libby Curtis, 1 page, Nov. 17, 1994. (Bates No. AMZ-R0015522).
Kohn, Daniel M., Letter to Libby Curtis, 1 page, Nov. 17, 1994. (Bates No. AMZ-R0015523).
Ki Lee, Roger, Letter to Misha Davidson, 1 page, Apr. 19, 1995. (Bates No. AMZ-R001524).
Kohn, Daniel M., Letter to Nathan Shnidman, 1 page, Feb. 14, 1995. (Bates No. AMZ-R0015525).
Author Unknown, Spreadsheet of Salaries, 4 pages, date unknown. (Bates Nos. AMZ-R0015526-0015529).
Author Unknown, List of Employees, 1 page, date unknown. (Bates No. AMZ-R0015530).
Kohn, Daniel M., Letter to Rebecca Russell, 1 page, Mar. 30, 1995. (Bates No. AMZ-R0015531).
Kohn, Daniel M., Letter to Rebecca Russell, 1 page, Apr. 14, 1995. (Bates No. AMZ-R0015532).
Kohn, Daniel M., Letter to Rich Salz, 1 page, Feb. 21, 1995. (Bates No. AMZ-R0015533).
Kohn, Daniel M., Letter to Sean Hogarty, 1 page, Jan. 11, 1995. (Bates No. AMZ-R0015534).
Kohn, Daniel M., Letter to Will Porteous, 1 page, Jan. 9, 1995. (Bates No. AMZ-R0015535).
Kehoe, Brendan, E-mail to dan@netmarket.com, 14 pages, Feb. 28, 1995. (Bates Nos. AMZ-R0015536-0015549).
Kohn, Daniel M., Letter to Mr. Mark Joseph Birmingham, 1 page, Apr. 12, 1994. (Bates No. AMZ-R0015550).
Lee, Roger, Letter to Libby, 3 pages, Sep. 6, 1994. (Bates Nos. AMZ-R0015551-0015553).
Lee, Roger, Letter to Gus, 3 pages, Sep. 6, 1994. (Bates Nos. AMZ-R0015554-0015556).
Lee, Roger, Letter to Gus, 3 pages, Sep. 6, 1994. (Bates Nos. AMZ-R0015557-0015559).
Lee, Roger, Letter to Josh, 3 pages, Sep. 6, 1994. (Bates Nos. AMZ-R0015560-0015562).
Lee, Roger, Letter to Josh, 3 pages, Sep. 6, 1994. (Bates Nos. AMZ-R0015563-0015565).
Author Unknown, Letter to Mr. Stuart McMillan, 2 pages, Aug. 26, 1994. (Bates Nos. AMZ-R0015566-0015567).
Author Unknown, "Wanted Immediately", 1 page, date unknown. (Bates No. AMZ-R0015568).
Kohn, Daniel M., Letter to Brendan Kehoe, 1 page, Aug. 25, 1994. (Bates No. AMZ-R0015569).
Kohn, Daniel M., Resume of Daniel M. Kohn, 2 pages, date unknown. (Bates Nos. AMZ-R0015570-0015571).
Hirai, Eiji, Resume of Eiji Hirai, 2 pages, date unknown. (Bates Nos. AMZ-R0015572-0015573).
Lee, Robert H., Resume of Robert H. Lee, 2 pages, date unknown. (Bates Nos. AMZ-R0015574-0015575).
Author Unknown, "%!PS-Adobe-2.0", 18 pages, Mar. 10, 1994. (Bates Nos. AMZ-R0015576-0015593).
Author Unknown, Spreadsheet, 4 pages, date unknown. (Bates Nos. AMZ-R015594-0015597).
Author Unknown, Spreadsheet, 2 pages, date unknown. (Bates Nos. AMZ-R015598-0015599).
Author Unknown, Spreadsheet, 1 page, date unknown. (Bates No. AMZ-R015600).
Lee, Roger, Letter to Mr. Richard J. Fernandes, 1 page, Apr. 19, 2006. (Bates No. AMZ-R0015601).
Lee, Roger, Letter to Mr. Richard J. Fernandes, 1 page, Aug. 16, 1995. (Bates No. AMZ-R0015602).
Lee, Roger, Letter to Mr. Richard J. Fernandes, 2 pages, Aug. 23, 1995. (Bates Nos. AMZ-R0015603-0015604).
Roger, Letter to Mr. Rick Fernandes, 2 pages, Aug. 25, 1995. (Bates Nos. AMZ-R0015605-0015606).
Author Unknown, "Daniel M. Kohn is the founder of the NetMarket Company, a hi-tech start-up providing innovative Internet-based solutions to commercial retail, business-to-business, and content provider organizations seeking to expand the scope of their business to the global information infrastructure", 1 page, date unknown. (Bates No. AMZ-R0015607).
Kohn, Daniel, "So you want to build your own Web site?", The NetMarket Company, 1 page, date unknown. (Bates No. AMZ-R0015608).
Author Unknown, "Selling Over the Internet: Designing Complete Solutions for Secure Transactions", 1 page, date unknown. (Bates No. AMZ-R0015609).
Kohn, Daniel M., Fax to Kelly Silver, 1 page, Apr. 19, 2006. (Bates Nos. AMZ-R0015610).
Kohn, Daniel, "Security Implications of Doing Business on the Internet", 2 pages, date unknown. (Bates Nos. AMZ-R0015611-0015612).
Kohn, Daniel M., Fax to Liz Sherlock, 1 page, Apr. 19, 2006. (Bates No. AMZ-R0015613).
Kohn, Daniel M., Fax to Liz Sherlock, 1 page, Apr. 19, 2006. (Bates No. AMZ-R0015614).
Kohn, Daniel M., Letter to Elizabeth Sherlock, 1 page Mar. 1, 1995. (Bates No. AMZ-R0015615).

Author Unknown, "Selling Over the Internet: Accepting Financial Transactions Securely", 2 pages, date unknown. (Bates Nos. AMZ-R0015616-0015617).
Author Unknown, "Intro: one person's view, both theory and practice", 2 pages, date unknown. (Bates Nos. AMZ-R0015618-0015619).
Kohn, Dan, Memo to Eugene Clark, 2 pages, date unknown. (Bates Nos. AMZ-R0015620-0015621).
Author Unknown, Letter to John, 1 page, date unknown. (Bates No. AMZ-R0015622).
Kohn, Dan, Memo to Walter Forbes, 1 page, date unknown. (Bates No. AMZ-R0015623).
Author Unknown, "NetMarket Business Review", 2 pages, Mar. 31, 1995. (Bates Nos. AMZ-R0015624-0015625).
Kohn, Daniel M., Fax to Sandra Morgan, 1 page, Apr. 19, 2006. (Bates No. AMZ-R0015626).
Author Unknown, "Agenda for CUC/NetMarket Meeting", 3 pages, Oct. 27, 1994. (Bates Nos. AMZ-R0015627-0015629).
Lee, Roger, Letter to Mr. Richard J. Fernandes, 1 page, Sep. 16, 1994. (Bates No. AMZ-R0015630).
Author Unknown, "CUC on the Internet", 2 pages, date unknown. (Bates Nos. AMZ-R0015631-0015632).
Author Unknown, Letter to Mr. Rick Fernandes, 1 page, date unknown. (Bates No. AMZ-R0015633).
Lee, Roger, Memo to Chris McLeod, 1 page, date unknown. (Bates No. AMZ-R0015634).
Author Unknown, "Introduction", 1 page, date unknown. (Bates No. AMZ-R0015635).
Kohn, Daniel M., Letter to Ellen Alexander, 2 pages, Mar. 10, 1995. (Bates Nos. AMZ-R015636-0015637).
Author Unknown, "NetMarket—NaBANCO Agreement", 2 pages, Mar. 27, 1995. (Bates Nos. AMZ-R0015638-0015639).
Author Unknown, "NetMarket—NaBANCO Agreement", 2 pages, Apr. 3, 1995. (Bates Nos. AMZ-R0015640-0015641).
Author Unknown, "Prodigy and NetMarket: A Proposal", 2 pages, May 9, 1995. (Bates Nos. AMZ-R0015642-0015643).
Kohn, Daniel M., Letter to Al Vezza, 2 pages, Feb. 14, 1995. (Bates Nos. AMZ-R015644-0015645).
Kohn, Daniel M., Letter to Dr. Al Vezza, 1 page, Feb. 23, 1995. (Bates No. AMZ-R0015646).
Kohn, Daniel M., Letter to Jeff Gershowitz, 1 page, Jan. 29, 1995. (Bates No. AMZ-R0015647).
Kohn, Dan, "David-Although this document started out as an overview, it has become an in-depth analysis of how to do the technical implementation of the digital cash side of the NetCard", 10 pages, date unknown. (Bates Nos. AMZ-R015648-0015657).
Author Unknown, "PPP Directions", 2 pages, Date Unknown. (Bates Nos. AMZ-R0015658-0015659).
Author Unknown, "NetMarket Stats—Jan. 1995", 5 pages, Jan. 1995. (Bates Nos. AMZ-R015660-0015664).
Author Unknown, "Hits 103994", 3 pages, date unknown. (Bates Nos. AMZ-R015665-0015667).
Author Unknown, "Hits 123204", 4 pages, date unknown. (Bates Nos. AMZ-R015668-0015671).
Author Unknown, "Hits 133476", 4 pages, date unknown. (Bates Nos. AMZ-R015672-0015675).
Author Unknown, "Hits 127599", 4 pages, date unknown. (Bates Nos. AMZ-R015676-0015679).
Author Unknown, "Hits 87762", 4 pages, date unknown. (Bates Nos. AMZ-R015680-0015683).
Author Unknown, "Every client relationship is different, and a lot of that difference depends on the unique character of the NetMarket employee who develops the relationship", 7 pages, date unknown. (Bates Nos. AMZ-R0015684-0015690).
Author Unknown, "Marketing Strategies for the NetMarket Company (Draft)", 6 pages, date unknown. (Bates Nos. AMZ-R0015700-0015705).
Author Unknown, "CGI Configuration", http://hoohoo.ncsa.uiuc.edu/docs/tutorials/cgi.html, 2 pages, Sep. 27, 1995. (Bates Nos. AMZ-R0015706-0015707).
Author Unknown, "NCSA Imagemap Tutorial", http://hoohoo.ncsa.uiuc.edu/docs/tutorials/imagemapping.html, 6 pages, Nov. 5, 1995. (Bates Nos. AMZ-R0015708-0015713).
Author Unknown, "NCSA Server Side Includes (SSI)", http://hoohoo.ncsa.uiuc.edu/docs/tutorials/includes.html, 4 pages, Dec. 5, 1995. (Bates Nos. AMZ-R0015714-0015718).
Author Unknown, "Installation Instructions", http://hoohoo.ncsa.uiuc.edu/docs/setup/instillation.html, 3 pages, Oct. 30, 1995. (Bates Nos. AMZ-R0015718-0015720).
Author Unknown, "Making your setup more secure", http://hoohoo.ncsa.uiuc.edu/docs/tutorials/security.html, 2 pages, Sep. 11, 1995. (Bates Nos. AMZ-R0015721-0015722).
Author Unknown, "Mosaic User Authentication Tutorial", http://hoohoo.ncsa.uiuc.edu/docs/tutorials/user.html, 7 pages, Sep. 27, 1995. (Bates Nos. AMZ-R0015723-0015729).
Author Unknown, "What is multihome/Virtualhost support", http://hoohoo.ncsa.uiuc.edu/docs/tutorials/VirtualHost.html, 3 pages, Oct. 20, 1995. (Bates Nos. AMZ-R0015730-0015732).
Author Unknown, "Note: Bugs are mentioned in the version they are found in", 2 pages, date unknown. (Bates Nos. AMZ-R0015741-0015742).
Author Unknown, "Changes for 1.5.2a", 5 pages, date unknown. (Bates Nos. AMZ-R0015743-0015747).
Author Unknown, "The official NCSA HTTPd copyright statement follows", University of Illinois, 2 pages, 1995. (Bates Nos. AMZ-R0015748-0015749).
Author Unknown, "We like to give credit where due", 3 pages, date unknown. (Bates Nos. AMZ-R0015750-0015752).
Author Unknown, This FastCGI application library source and object code (the "Software") and its documentation (the "Documentation") are copyrighted by Open Market, Inc. ("Open Market")., 1 page, date unknown. (Bates No. AMZ-R0015753).
Author Unknown, "### NCSA HTTPd 1.5", 2 pages, date unknown. (Bates Nos. AMZ-R0015754-0015755).
Author Unknown, "NCSA HTTPd Server 1.5.2", University of Illinois, 2 pages, 1995. (Bates Nos. AMZ-R0015756-0015757).
Author Unknown, "The information in this was the information in the Readme for the FCGI patch from Openmarket, and may not necessarily apply to this version of the server", 1 page, date unknown. (Bates No. AMZ-R015758).
Author Unknown, "NCSA HTTPd Server 1.5.2", University of Illinois, 2 pages, 1995. (Bates Nos. AMZ-R0015759-0015760).
Author Unknown, "#!/bin/sh", 1 page, date unknown. (Bates No. AMZ-R015761).
Author Unknown, "Calendar", 1 page, date unknown. (Bates No. AMZ-R0015762).
Author Unknown, "#!/bin/sh", 1 page, date unknown. (Bates No. AMZ-R015763).
Author Unknown, "#!/bin/sh", 1 page, date unknown. (Bates No. AMZ-R015764).
Author Unknown, "Finger Gateway", 1 page, date unknown. (Bates No. AMZ-R0015765).
Author Unknown, "#!/bin/sh", 1 page, date unknown. (Bates No. AMZ-R015766).
Author Unknown, "#!/usr/local/bin/perl", 7 pages, Oct. 17, 1995. (Bates Nos. AMZ-R0015767-0015773).
Author Unknown, "#!/usr/local/bin/perl", 2 pages, date unknown. (Bates Nos. AMZ-R0015774-0015775).
Author Unknown, "#!/bin/sh", 1 page, date unknown. (Bates No. AMZ-R015776).
Author Unknown, "#!/bin/sh", 1 page, date unknown. (Bates No. AMZ-R015778).
Author Unknown, "#!/usr/local/bin/tclsh", 1 page, date unknown. (Bates No. AMZ-R0015779).
Author Unknown, "#!/bin/sh", 1 page, date unknown. (Bates No. AMZ-R0015780).
Author Unknown, "#!/bin/sh", 1 page, date unknown. (Bates No. AMZ-R0015781).
Author Unknown, "#!/usr/local/bin/perl", 1 page, date unknown. (Bates No. AMZ-R0015782).
Author Unknown, "# For gcc", 2 pages, date unknown. (Bates Nos. AMZ-R0015783-0015784).
Author Unknown, "NCSA HTTPd (comments, questions to httpd@ncsa.uiuc.edu)", 1 page, date unknown. (Bates No. AMZ-R0015785).

Author Unknown, "NCSA HTTPd (comments, questions to httpd@ncsa.uiuc.edu)", 5 pages, date unknown. (Bates Nos. AMZ-R0015786-0015790).
Author Unknown, "# With this document, you define the name space that users see of your http", 1 page, date unknown. (Bates No. 0015791).
Author Unknown, "This is a comment", 1 page, date unknown. (Bates No. AMZ-R0015792).
Author Unknown, "NCSA HTTPd (comments, questions to httpd@ncsa.uiuc.edu)", 2 pages, date unknown. (Bates Nos. AMZ-R0015793-0015794).
Author Unknown, "1.5.2a", 1 page, date unknown. (Bates No. AMZ-R0015821).
Author Unknown, "The following is NCSA HTTPd treatment of HTTP headers", 2 pages, date unknown. (Bates Nos. AMZ-R0015822-0015823).
Author Unknown, .TH httpd 1m "Oct. 1995", 1 page, date unknown. (Bates No. AMZ-R0015824).
Author Unknown, "child_main", 4 pages, date unknown. (Bates Nos. AMZ-R0015825-0015828).
Author Unknown, "# NCSA HTTPd 1.5", 6 pages, date unknown. (Bates Nos. AMZ-R0015829-0015834).
Author Unknown, "The format for change-psswd", 2 pages, date unknown. (Bates Nos. AMZ-R0015835-0015836).
Author Unknown, "## NCSA HTTPd", 3 pages, date unknown. (Bates Nos. AMZ-R0015837-0015839).
Author Unknown, "NCSA HTTPd Server 1.5", Board of Trustees, University of Illinois, http://hoohoo.ncsa.uiuc.edu/, 1 page, 1995. (Bates No. AMZ-R0015840).
Author Unknown, "NCSA HTTPd change passwd", 2 pages, date unknown. (Bates Nos. AMZ-R0015841-0015842).
Author Unknown, "#1/bin/sh", 1 page, date unknown. (Bates No. AMZ-R0015843).
Author Unknown, "#1/bin/sh", 1 page, date unknown. (Bates No. AMZ-R0015844).
Author Unknown, "#1/bin/sh", 1 page, date unknown. (Bates No. AMZ-R0015845).
Author Unknown, "#1/bin/sh", 1 page, date unknown. Bates No. AMZ-R0015846).
Various Authors, "WWW Talk 1991 Archives", Archive of Message Postings, 84 pages, Oct. 28, 1991. (Bates Nos. AMZ-R0015876-0015959).
Various Authors, "WWW Talk 1992 Archives", Archive of Message Postings, 1,133 pages, Jan. 9, 1992. (Bates Nos. AMZ-R0015960-0017092).
Various Authors, "WWW Talk Apr.-Jun. 1993 Archives", Archive of Message Postings, 1,449 pages, Mar. 31, 1993. (Bates Nos. AMZ-R0017093-0018541).
Various Authors, "WWW Talk Jul.-Oct. 1993 Archives", Archive of Message Postings, 2,234 pages, Jun. 30, 1993. (Bates Nos. AMZ-R0018542-0020775).
Various Authors, "WWW Talk Jan.-Mar. 94", Archive of Message Postings, 2,561 pages, Jan. 1, 1994. (Bates Nos. AMZ-R0022765-0022764).
Various Authors, 'WWW Talk Oct. 1993-Present, Archive of Message Postings, 1,989 pages, Sep. 30, 1993. (Bates Nos. AMZ-R0022765-0025325).
Various Authors, "WWW Talk Apr.-Jun. 1994", Archive of Message Postings, 3,044 pages, Apr. 1, 1994. (Bates Nos. AMZ-R0025326-0028369).
Various Authors, "WWW Talk Jul. 1994-Sep. 1994 by thread", Archive of Message Postings, 2,427 pages, Jul. 1, 1994-Sep. 30, 1994. (Bates Nos. AMZ-R0028370-0030796).
Various Authors, "WWW Talk Oct.-Dec. 1994 by thread", Archive of Message Postings, 2,419 pages, Oct. 1, 1994-Jan. 17, 1995. (Bates Nos. AMZ-R0030797-0033215).
Various Authors, "WWW Talk Jul. 1995-present by thread", Archive, of Message Postings, 600 pages, Jul. 3, 1995-Aug. 2, 1995. (Bates Nos. AMZ-R0033215-0033815).
Author Unknown, E-mail regarding eCard, 1 page, Jun. 26, 1996. (Bates No. AMZ-R0033816).
Author Unknown, E-mail regarding eCard, 1 page, Jun. 14, 1994. (Bates No. AMZ-R0033817).
internet!bmmail.com!usib5ssz, E-mail regarding Four11, 2 pages, Oct. 12, 1995. (Bates Nos. AMZ-R0033818-0033819).
internet!bmmail.com!usib5ssz, E-mail regarding Four11, 5 pages, Oct. 13, 1995. (Bates Nos. AMZ-R0033820-0033824).
internet!bmmail.com!usib5rgt, E-mail regarding InterOp PDI Messages, 4 pages, Sep. 20, 1995. (Bates Nos. AMZ-R0033825-0033828).
Dawson, Frank, E-mail regarding Vcard spec of Mar. 1996?, 1 page, Sep. 9, 2004. (Bates No. AMZ-R0033829).
ralden@alden.attnmail.com, E-mail regarding part 2 HTML for Comdex, 4 pages, Oct. 30, 1995. (Bates Nos. AMZ-R0033830-0033833).
Frederking, Rick, E-mail regarding Vcard spec of Mar. 1996?, 2 pages, Aug. 31, 2004. (Bates Nos. AMZ-R0033834-0033835).
Author Unknown, E-mail regarding eCard, 1 page, Jun. 2, 1994. (Bates No. AMZ-R0033844).
Author Unknown, E-mail regarding eCard, 1 page, Jun. 2, 1994. (Bates No. AMZ-R0033845).
Author Unknown, E-mail regarding eCard, 2 pages, May 31, 1994. (Bates Nos. AMZ-R0033846-0033847).
Yesil, Magdalena, "Creating the Virtual Store", John Wiley & Sons, Inc., 2 pages, 1997. (Bates Nos. AMZ-R0036848-0036849).
Wang, Wallace, "CompuServe for Dummies, A Reference for the Rest of Us!", IDG Books, 3 pages, 1994. (Bates Nos. AMZ-R0036850-0036852).
Tatters, Wes, "Navigating the Internet with CompuServe", Sams.net Publishing, 3 pages, 1995. (Bates Nos. AMZ-R0036853-0036855).
Davis, Steve, "CompuServe Information Manager for Windows", CompuServe Incorporated, 3 pages, 1994. (Bates Nos. AMZ-R0036856-0036858).
Zheng et al., "Networks for Computer Scientists and Engineers", Oxford University Press, 3 pages, 2002. (Bates Nos. AMZ-R0036859-0036861).
Dougherty et al., "The Mosaic Handbook", O'Reilly & Associates, Inc., 3 pages, 1994. (Bates Nos. AMZ-R0036862-0036864).
Halsall, Fred, "Data Communications, Computer Networks and Open Systems", Addison-Wesley Publishing Co., Inc., 3 pages, 1992. (Bates Nos. AMZ-R003865-003867).
Wiggins, Richard W., "The Internet for Everyone", R. R. Donnelly & Sons, Inc., 3 pages, 1994. (Bates Nos. AMZ-R0036868-0036870).
Wynkoop, Stephen, "Running a Perfect Web Site", Que Corporation, 3 pages, 1996. (Bates Nos. AMZ-R0036871-0036873).
Quarterman, John S., "The Matrix", Butterworth-Heinemann, 3 pages, 1997. (Bates Nos. AMZ-R0036874-0036876).
Eckel, George, "Building a Unix Internet Server", New Riders Publishing, 4 pages, 1995. (Bates Nos. AMZ-R0036877-0036880).
Stein, Lincoln D., "How to Set Up and Maintain a World Wide Web Site", Corporate & Professional Publishing Group, 4 pages, 1995. (Bates Nos. AMZ-R0036881-0036884).
Liu et al., "Managing Internet Information Services", O'Reilly & Associates, Inc., 3 pages, 1994. (Bates Nos. AMZ-R0036885-0036887).
Tanenbaum, Andrew S., "Computer Networks", Prentice-Hall, Inc., 3 pages, 1989. (Bates Nos. AMZ-R0036888-0036890).
Tanenbaum, Andrew S., "Computer Networks", Prentice-Hall, Inc., 3 pages, 1996. (Bates Nos. AMZ-R0036891-0036893).
Tittel et al., "World Wide Web Programming with HTML & CGI", IDG Books Worldwide, Inc., 3 pages, 1995. Bates Nos. AMZ-R0036894-0036896).
Powell et al., "Atlas to the World Wide Web", Ziff-Davis Press, 3 pages, 1995. (Bates Nos. AMZ-R0036897-0036899).
Author Unknown, "IBM Dictionary of Computing", International Business Machines Corporation, 3 pages, 1994. (Bates Nos. AMZ-R0036900-0036902).
Author Unknown, "Dictionary of Computing", Oxford University Press, 4 pages, 1990. (Bates Nos. AMZ-R0036903-0036906).
Author Unknown, "Computer Dictionary", Microsoft Press, 3 pages, 1994. (Bates Nos. AMZ-R0036907-0036909).
Gunton, Tony, "A Dictionary of Information Technology and Computer Science", Penguin Books Limited, 3 pages, 1993. (Bates Nos. AMZ-R0036910-0036912).
Cronin, Mary J., "Doing Business on the Internet", Van Nostrand Reinhold, 3 pages, 1995. (Bates Nos. AMZ-R0036913-0036915).

Vaughan-Nichols et al., "Inside the World Wide Web", New Riders Publishing, 3 pages, 1995. (Bates Nos. AMZ-R0036916-0036918).
Eager et al., "Using the World Wide Web and Mosaic", Que Corporation, 3 pages, 1995. (Bates Nos. AMZ-R0036919-0036921).
Comer, Douglas E., Internetworking with TCP/IP, vol. 1, Prentice-Hall, Inc., 3 pages, 1991. (Bates Nos. AMZ-R0036922-0036924).
Author Unknown, "Computer Dictionary", Microsoft Press, 3 pages, 1991. (Bates Nos. AMZ-R0036925-0036927).
Stallings, William, "Data and Computer Communications", Macmillan Publishing Company, 3 pages, 1988. (Bates Nos. AMZ-R0036928-0036930).
Author Unknown, "The American Heritage Dictionary", Dell Publishing, 2 pages, 1992. (Bates Nos. AMZ-R0036931-0036932).
Author Unknown, "Webster's Third New International Dictionary", Merriam-Webster, Inc., 2 pages, 1993. (Bates Nos., AMZ-R0036933-0036934).
Hanna et al., "Section 3. The Economics of Information", The Ohio State University, 7 pages, 1994. (Bates Nos. AMZ-R0036935-0036941).
Andrews et al., "Soaring through hyperspace: A snapshot of Hyper-G and its Harmony client", Proc. of Eurographics Symposium and Workshop Multimedia: Multimedia/Hypemedia in Open Distributed Environments, Graz, Austria, 10 pages, Jun. 1994. (Bates Nos. AMZ-R0036942-0036951).
Author Unknown, "AIIM", Applied Image, Inc., 193 pages, date unknown. (Bates Nos. AMZ-R0036952-0037144).
Cavanagh, Luke, "Charting a New Course: Time Retires Pathfinder in Favor of Vertical Theme Portals", The Seybold Report on Internet Publishing, vol. 3, No. 10, pp. 3-5, date unknown. (Bates Nos. AMZ-R0037145-0037147).
About Netscape, Netscape, Firefly, and VeriSign Propose Open Prefiling Standard (OPS) to Enable Broad Personalization of Internet Services, (printed May 28, 1997), 3 pages.
Author Unknown, "News from Newshare Corp.; Clickshare Universal-ID, profiling and micro-transaction system enters alpha; personalized "test drives" begin", Business Wire, Oct. 23, 1995.
Author Unknown, "One-bill, universal-password access to Internet information available by subscription of "by click" early next year via Newshare Corp.'s "Clickshare" publishing system; advertisers can track systemwide visits by anonymous user", Business Wire, Sep. 15, 1995.
Author Unknown, "The Checkfree Wallet Enables Secure Internet Purchases", PR Newswire, Apr. 10, 1995.
Kennedy, James, "Opinion-Is 'Irritainment' Good for Advertisers?", World Internet Adveritisn Report, http://www.internet.com, Mecklermedia Corp., 4 pages, 1996.
Kerven, David, "HTML 3 How-To", Waite Group Press, Corte Madera, CA, pp. 326-329, 1996.
Pitt, Brad, Internet Pathfinder, E-Mail News Web-Business News, Internet leaders to Offer Privacy Protection, (no date), 2 pages.
Sirbu et al., "NetBill: An Internet Commerce System Optimized for Network-Delivered Services", Digest of Papers—Compcon '95—Technologies for the Information Superhighway, vol. 2, No. 4, Aug. 1995.
Sirbu et al., "NetBill: An Internet Commerce System Optimized for Network-Delivered Services", IEEE Personal Communications, San Francisco, CA, vol. 2, No. 4, Mar. 5-9, 1995.
Slater, A.F., "Controlled by the Web", Computer Networks and ISDN Systems, No. 27, pp. 289-295, 1994.
Taylor, Catharine P., "Interstitial Ads Make an Appearance", Interactive Week, Cybermedia Online Contents, Services and Communications, p. 29, May 19, 1997.
Welz, Gary, "A ripening Internet market, secure systems, and digital currency are reshaping global commerce", Internet World, pp. 36-41, Jun. 1995.
World, "Netscape Pitches OPS for Push Delivery," (May 26, 1997), 1 page.
Yamada, Ken, "Tracking a Silent Threat", Computer Reseller News, ISSN: 0893-8377, p. 45, Jun. 19, 1995.
Author Unknown, "Webster's New World Dictionary of Computer Terms", 4th Edition, 2 pages, 1992. (Bates Nos. AMZ-R0037218-0037219).
Ellsworth et al., "The Internet Business Book", 2 pages, 1994. (Bates Nos. AMZ-R0037220-0037221).
Author Unknown, "getstats 1.2", 1 page, Apr. 16, 1994. (Bates Nos. AMZ-R0037222).
Author Unknown, "Overridden by -C, -N, -G, -A, and -O options", 85 pages, date unknown. (Bates Nos. AMZ-R0037223-0037307).
Behlendorf, Brian, "statform 1.0", 7 pages, Apr. 15, 1994. (Bates Nos. AMZ-R0037308-0037314).
Author Unknown, "Getstats Form Interface", 3 pages, date unknown. (Bates Nos. AMZ-R0037315-0037317).
Author Unknown, "Loggins Control in W3C httpd", 3 pages, Jul. 1995. (Bates Nos. AMZ-R0037318-0037320).
Author Unknown, "Internet", Wikipedia, 11 pages, date unknown. (Bates Nos. AMZ-R0037321-0037331).
Author Unknown, "Dark internet", Wikipedia, 2 pages, date unknown. (Bates Nos. AMZ-R0037332-0037333).
Author Unknown, "Demographics", Wikipedia, 4 pages, date unknown. (Bates Nos. AMZ-R0037334-0037337).
Author Unknown, "Internetworking", Wikipedia, 1 page, date unknown. (Bates No. AMZ-R0037338).
Hoffman et al., "Commercial Scenarios for the Web: Opportunities and Challenges", http://www.ascusc.org/jcmc/vol1/issue3/hoffman.html, 21 pages, Aug. 30, 2000. (Bates Nos. AMZ-R0037358-0037378).
Author Unknown, "Hypertext Terms", 2 pages, 1992. (Bates No. AMZ-R0037379- 0037380).
Lavoie et al., "Web Characterization Terminology & Definitions Sheet", W3C, 10 pages, May 24, 1999. (Bates Nos. AMZ-R0037381-0037390).
Author Unknown, "In, Around and Online—Issue 5, Week Ending Oct. 7, 1994", 5 pages, Oct. 7, 1994. (Bates Nos. AMZ-R0037391-0037395).
Hamer, Christian, "Google Groups: rec.food.cooking", 1 pages, Jan. 5, 1995. (Bates No. AMZ-R0037396).
Hamer, Christian, "Google Groups: biz.comp.services", 1 page, Oct. 25, 1994. (Bates No. AMZ-R0037397).
Minor et al., File History of U.S. Patent No. 5,740,252, Issued Apr. 14, 1998. (Bates Nos. AMZ-R0037409-0037496).
Author Unknown, "U.S. Census Bureau", 3 pages, Dec. 16, 1996. (Bates Nos. AMZ-R0037515-0037517).
Author Unknown, "U.S. Export Restricted Software Download FAQ", 4 pages, Mar. 14, 1997. (Bates Nos. AMZ-R0037518-0037521).
Freedman, Alan, "The Computer Glossary", Sixth Edition, 3 pages, 1993. (Bates Nos. AMZ-R0037522-0037524).
Johnson, Ned, "Navigating the Internet with Prodigy", 3 pages, 1995. (Bates Nos. AMZ-R0037525-0037527).
Author Unknown, "getstats.c, version 1.2", Getstats Documentation, 11 pages, May 18, 1994. (Bates Nos. AMZ-R0037528-0037538).
Order Granting Request for Ex Parte Reexamination of U.S. Patent No. 6,823,327, issued Nov. 23, 2004, Reexamination U.S. Appl. No. 90/007,962, 12 pages.
Reexamination U.S. Appl. No. 95/000,212 filed Jan. 5, 2007, submitted on CD-ROM.
Author Unknown, Business Wire, "CompuServe Selects I/PRO—Internet Profiles Corporation—to Provide User Registration and Measurement Capabilities for the World's First $1 Million Internet Scavenger Hunt," published Jun. 20, 2995, 2 pages.
Author Unknown, CompuServe, "CompuServe Internet Hunt," CompuServe Magazine, Aug. 1995, p. 56, 1 page.
Author Unknown, CompuServe, "The CompuServe $1,000,000 Internet Hunt 1995 Official Contest Rules," CompuServe Magazine, Oct. 1995, p. 48, 2 pages.
Author Unknown, web pages describing the I/CODE Universal Registration System, published by Internet Profiles Corporation, www.ipro.com, Aug. 29, 1995, 4 pages.
Author Unknown, Market Research Firms Target Web Traffic Data, PC Week, May 29, 1995, 2 pages.
Author Unknown, Internet Profiles Corporation Business Plan, Mar. 1995, 39 pages.
Hall, D., et al., Build a Website: The Programmer's Guide to Creating, Building and Maintaining a Web Presence, First Edition, Apr. 1995, submitted on CD-ROM.

Pathfinder Source Code, 1385 computer files representing the source code for a software application called Pathfinder, submitted on CD-ROM.

Order Granting Request for Inter Partes Reexamination, mailed Mar. 21, 2007, U.S. Appl. No. 95/000,212, 30 pages.

Office Action in Inter Partes Reexamination, mailed May 21, 2007, U.S. Appl. No. 95/000,212, 16 pages.

Response by Patent Owner to Office Action in Inter Partes Reexamination, dated Aug. 29, 2007, 31 pages.

Research Firms Strive for Web Tracking that Counts New Tracking Systems Promise Individual Consumer Portraits, Interactive Marketing News, v2, n13, Jun. 13, 1995.

Office Action in Ex Parte Reexamination U.S. Appl. No. 90/007,961, mailed Oct. 22, 2007, 13 pages.

Response by Patent Owner to Office Action in Ex Partes Reexamination U.S. Appl. No. 90/007,961, dated Dec. 21, 2007, 20 pages.

Office Action in Ex Parte Reexamination U.S. Appl. No. 90/007,962, mailed Nov. 5, 2007, 38 pages.

Response by Patent Owner to Office Action in Ex Partes Reexamination U.S. Appl. No. 90/007,962, dated Jan. 7, 2008, 20 pages.

Final Office Action in Ex Parte Reexamination U.S. Appl. No. 90/007,962, dated Sep. 25, 2008, 40 pages.

Office Action in Inter Partes Reexamination, U.S. Appl. No. 95/000,212, mailed Oct. 21, 2008, 93 pages.

Office action in Ex Parte Reexamination U.S. Appl. No. 90/007,961, mailed Dec. 19, 2008, 43 pages.

* cited by examiner

US 7,865,395 B2

MEDIA CONTENT NOTIFICATION VIA COMMUNICATIONS NETWORK

CROSS REFERENCES TO RELATED APPLICATION INFORMATION

This application is a continuation of U.S. patent application Ser. No. 09/407,000, filed on Sep. 28, 1999 (the '000 application), allowed, which claims priority to U.S. provisional patent application Ser. No. 60/102,115, filed on Sep. 28, 1998 (the '115 application). The '000 application and the '115 application are both hereby incorporated by reference as though fully set forth herein. The '000 application is also a continuation-in-part to U.S. application Ser. No. 09/128,915, filed on Aug. 4, 1998 the '915 application), which is a continuation of U.S. patent application Ser. No. 08/595,837, filed on Feb. 2, 1996, which application issued as U.S. Pat. No. 5,790,785 on Aug. 4, 1998 (the '785 patent), which is a nonprovisional of U.S. Provisional Patent Application Ser. No. 60/008,736, filed on Dec. 11, 1995 (the '736 application). The '915 application, '785 patent, and '736 application are hereby incorporated by reference as though fully set forth herein.

FIELD OF THE INVENTION

The present invention relates in general to media content notification and, in particular, to a method and apparatus for identifying content of potential interest to a given network user based on user information specific to the user and using a communication network to provide notification to the user regarding the identified media content.

BACKGROUND OF THE INVENTION

In recent years, the types and quantity of media content available to consumers has expanded dramatically. Not too long ago, the media content available to many consumers at a given time might have included live performances or athletic events at perhaps a few venues, audio programming delivered via several radio stations and television programming delivered via a few channels. Today, live performances and athletic events have been increased in many areas and many choices are available via radio and television. In the latter regard, it is no longer uncommon to have access to hundreds of television channels. In addition, the internet increasingly competes for the attention of consumers with seemingly unlimited content options.

Without question, this explosion in media content has been driven, to some extent, by consumer demand and consumers have benefited greatly from the increased entertainment and other information opportunities. However, the shear quantity of choices has also created some frustration. In particular, many consumers now find it difficult and unacceptably time consuming to keep track of the available choices and conventional guides are sometimes of little assistance. For example, conventional TV guides have been expanded in many cases to cover the many choices available via cable or a satellite dish. However, such guides can be difficult to use, especially when they attempt to cover cable choices that vary from area to area or when they attempt to cover all programming for hundreds of channels.

As a result, some consumers have been reduced to so-called "channel surfing" in an attempt to manually survey the available options or have effectively given up on the idea of identifying the most interesting available option by adopting the habit of regularly returning to only a small number of channels. Even if one could become proficient in using conventional television guides and devoted the time necessary to select from all available options, only one medium would be mastered and the challenge of keeping track of other media would remain.

SUMMARY OF THE INVENTION

The present invention is directed to a method and apparatus for identifying media content based on personal preferences and providing notification thereof, for example, via a communications network such as a telephone network or the Internet. The invention helps network users to keep track of the many media content options available and, therefore, to enjoy and more fully utilize the available media.

In accordance with one aspect of the present invention, content notifications are provided based on the interests of a particular network user. The corresponding method includes the steps of obtaining interest information relating to the interests of a particular consumer, identifying media content based on the interest information, generating notification information pertaining to the identified media content, and using a communications network to transmit the notification information to the network user. In this manner, the notifications can be tailored to the user's interests so as to reduce the incidence of notifications that are not of interest and also so as to reduce the incidence of missed notifications that would have been of interest to the network user.

Preferably, the interest information is obtained by voluntary participation of the user. For example, the user may provide information relative to the demographics, psychographics, product interests, programming interests and lifestyle of the user upon registering to participate in the content notification program. Such information may have already been made available by the user at a separate registration site. Alternatively, information regarding the user may be obtained based on a monitored history of television network usage, Internet usage, or other information that may be derived by monitoring the user. Additionally, stored interest information may be continuously or periodically updated based on a learning process implemented by intelligent code based on television network or Internet usage patterns or the like. Such interest information can be employed to tailor the media content notifications to the user's likely interests, thereby enhancing the value of Me notification program.

The interest information may include any of various types of information that are preferably provided or determined at least in part by the user. Examples include: user contact information such as a name, billing or residence address, URL, or phone number; financial information such as a credit card number or bank account number; service or product information useful in shopping for or purchasing airline tickets, hotel rooms, books, music, clothing, etc.; personal interest information for identifying programming of likely interest to the user; personal records such as medical records and investment information (e.g., purchases, when purchased, prices, ticker symbols, numbers of shares, etc.); and other demographic or personal information. The notification information may be transmitted to the user via e-mail, wireless or wire-line telephone network, Web TV, or other communications network.

According to another aspect of the present invention, a user may register to receive media content notifications from time to time. For example, the user may elect to receive program notifications on a regular or periodic basis or upon the occurrence of certain trigger events. In this manner, the user may receive media content notifications on a daily, weekly or other basis. Additionally, the user may register to be notified upon the occurrence of certain events such as the announcement of a concert or other performance date, the release of a sound recording or other product, or other types of announcements. In this manner, the user can exercise control over the amount of frequency of notifications.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION OF THE INVENTION

In the following description, the invention is set forth in the context of an Internet-based system for providing media content notifications via e-mail. However, it will be appreciated that program notifications may be provided in accordance with the present invention via other types of communications networks such as Web TV, data networks other than the Internet, wireless or wire-line telephone networks and other public or private networks.

Figure 1:
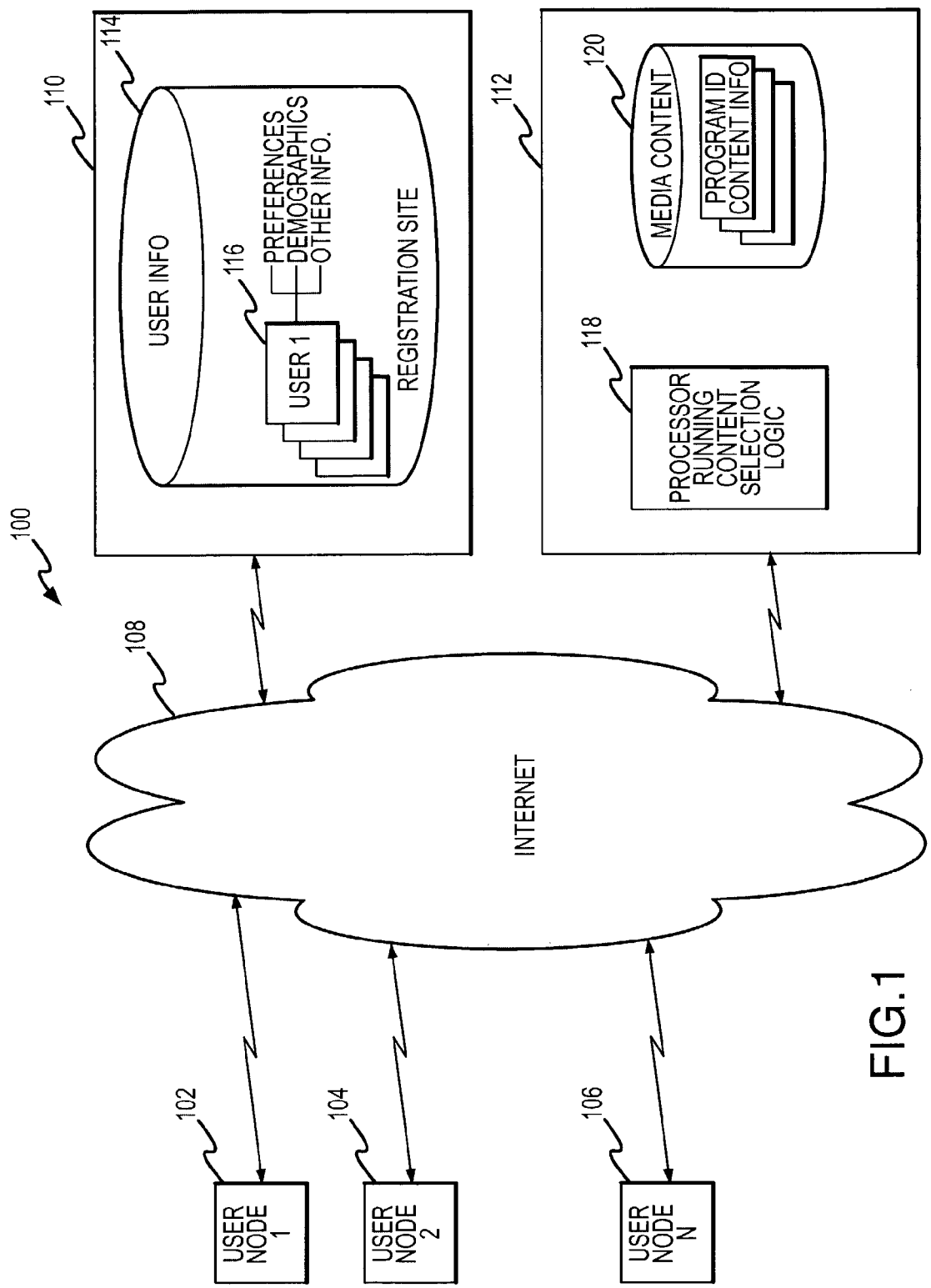
FIG. 1 is a schematic diagram illustrating a communications network in which the present invention may be implemented.

Referring to FIG. 1, a content notification system in accordance with the present invention is generally identified by the reference numeral 100. The system 100 includes a number of user nodes 102, 104 and 106 that communicate with a registration site 110 and a notification site 112 via the Internet 108. Although the registration site 110 and notification site 112 are illustrated as being independent World Wide Web sites in FIG. 1, it will be appreciated that the functionality of the sites 10 and 112 may be combined or may be fully or partially implemented by logic resident at the user nodes 102, 104 and 106. In addition, although only three user nodes are illustrated, it will be understood that substantially any number of user nodes may be serviced in accordance with the present invention.

In the illustrated embodiment, the user nodes 102, 104 and 106 are illustrated as being data terminals that are accessible via the Internet 108. Such user nodes 102, 104 and 106 may be embodied as desktop or laptop computers, wireless or wire-line telephones incorporating data network terminals, televisions incorporating data network terminals or any other internet compatible devices. The user nodes 102, 104 and 106 are capable of receiving media content notifications via e-mail. Although not shown, such content notifications could alternatively be transmitted to a user via a telephone, a pager or other communications-network device or via fax or regular mail.

The registration site 110 includes a user information database 114 storing files 116 containing information for various network users. Such information may be useful in identifying media content of potential interest to the various network users, and may include program preferences entered by the users, demographic information entered by the user or derived from other sources, and other information. Such a registration site is described in detail in U.S. Pat. No. 5,790,785 and co-pending U.S. patent application Ser. No. 09/128,915, both of which are incorporated herein by reference.

The notification site 112 includes a media content database 120 and a processor 118 running content selection logic. The media content database includes files of information regarding media content. For example, in the case of a television program, each file may include a program title or other identifier, scheduling information, and content information. The program identification information may include, for example, in the case of a television program, the title of the program, the series title, and/or an episode identifier. The scheduling information may include the time or times at which the program is to be aired and the duration of the program. The content information may include information regarding the content of the program provided by the content provider or otherwise. For example, the content provider may provide information identifying the subject matter of the program, the target demographics of the program, representative advertisers of the program or other information that may be useful in identifying network users likely to be interested in the program. Alternatively, such content information may be derived based on the title of the program, current or past advertisers of the program or other information. Similar types of content information may be provided for other types of media.

The processor 118 accesses the media content database 120 in order to identify content that may be of interest to particular users of the user nodes 102, 104 and 106. In this regard, content for a particular user may be identified by matching interest information obtained from the registration site 110 with the content information of the media content database 120.

Figure 2:
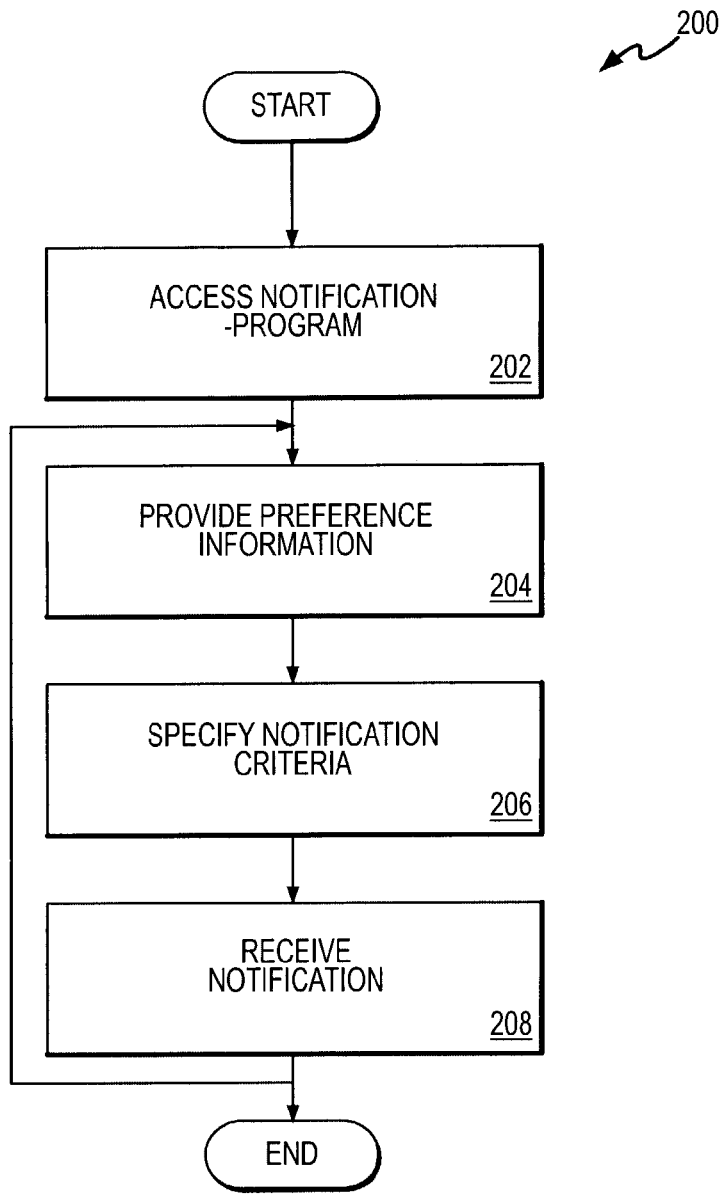
FIG. 2 is a flow chart illustrating a process for utilizing the notification program of the present invention.

FIG. 2 is a flow chart of a process 200 that may be implemented by a user of the notification program. The illustrated process 200 is initiated by accessing (202) the notification program. In this regard, the notification program may be executed at a notification site as illustrated in FIG. 1. Thus a notification program may be accessed by establishing a link with the URL associated with the notification site. Alternatively, the notification program may be executed in part or in whole at the user node. For example, the notification program may be downloaded from the notification site or may otherwise be loaded onto the user node via a disk or other medium.

Once the notification program is accessed, the user may provide (204) preference information for use by the notification program. Preferably, as illustrated, the preference information is voluntarily provided by the user. The preference information may be provided by filling out a questionnaire presented by the notification program. For example, the questionnaire may prompt the user to enter information identifying programs, authors, artists, or other content information of interest to the user. In addition, the user may be prompted to enter information regarding hobbies, periodical subscriptions and other subjects of interest to the user. The user may also be prompted to enter demographic information that may be useful in identifying media content of interest. Alternatively, the user may provide preference information by referring the notification program to information stored at the registration site. It will be appreciated that such information stored at the registration site may be available for a variety of purposes other than use by the notification program.

The user may also be prompted to specify (206) notification criteria. Such notification criteria may including notification scheduling information. For example, a user may indicate that he wishes to receive content notifications on a daily, weekly or other basis. Or, the user may specify an interest in receiving notifications based on certain triggering events such as concert or other event announcements, releases of sound recordings, publications or the like, or other scheduled or unscheduled events.

Once such information is provided to the notification program, the user will receive (208) notifications of media content of potential interest to the user. Such notifications may be received via e-mail, phone calls, via regular mail or by any other suitable mechanism. In addition to the content notification information, the user may be guided to related content, such as web sites or other media portals related to an event or artist(s) related chat sessions, etc. Such notifications may be provided in connection with personalized versions of portals such as "MyYahoo," "MyLycos" or the like.

Figure 3:
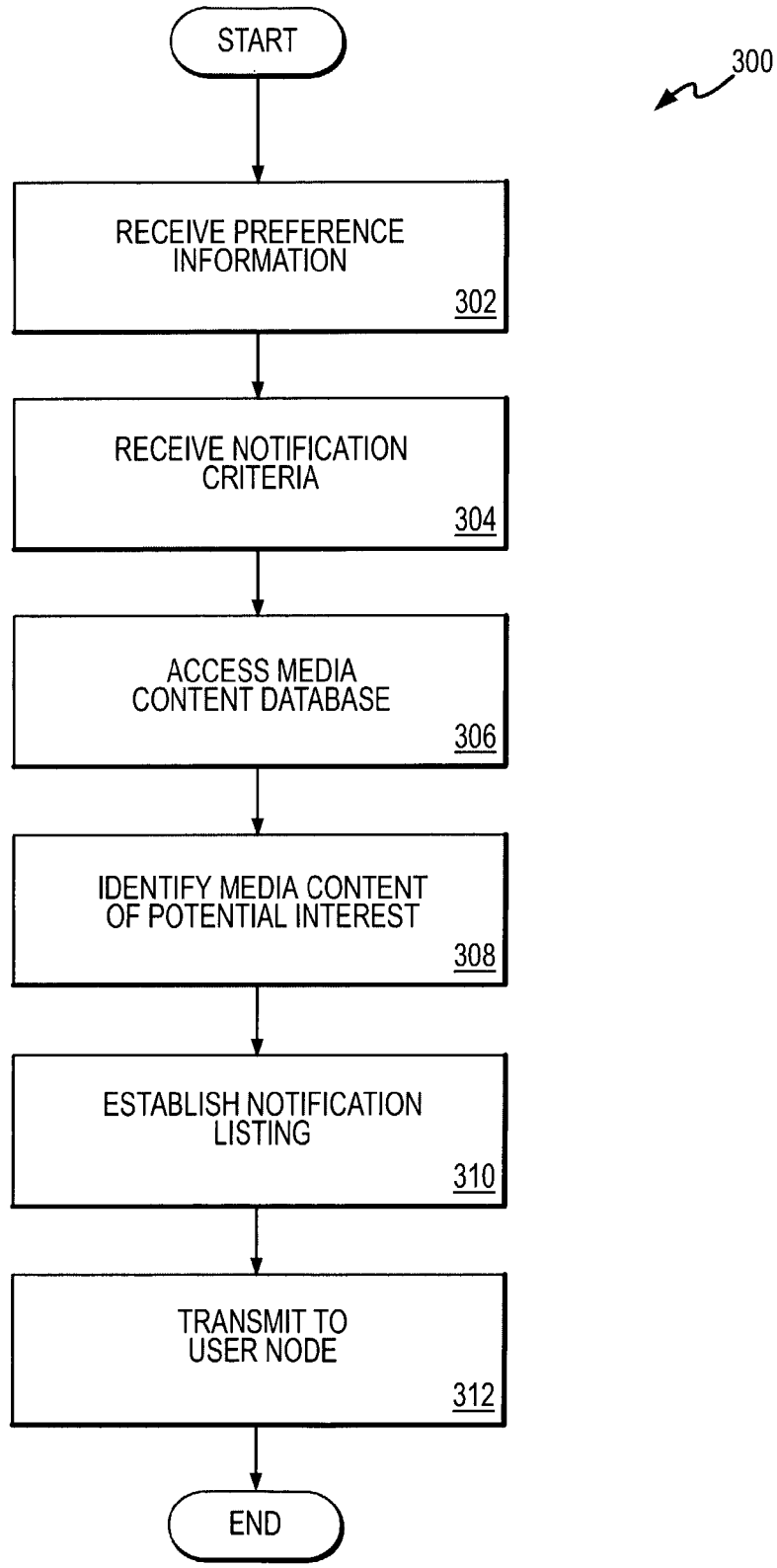
FIG. 3 is a flow chart illustrating a process implemented by the notification program of the present invention.

Referring to FIG. 3, a process 300 implemented by the notification program is illustrated. The illustrated process 300 is initiated by receiving (302) preference information and receiving (304) notification criteria information as discussed above. Based on this received information, the program accesses (306) the media content database so as to identify (308) media content of potential interest to each subscribing user. The media content may be identified by iteratively comparing the content files to the preference information, by utilizing the links of a relational database or through other appropriate means.

Based on the identified content, the program then establishes (310) a notification listing. This listing may be presented in the form of an e-mail, an audio recording, a hard copy listing or other medium as appropriate. The listing is then transmitted (312) to the user. Such transmission may be electronic, by facsimile, via hard copy or in any other suitable form.

Many revenue models may be established in connection with the media notification program. Users may pay a subscription fee for using the program. Content providers may also pay fees in order to be included in the program. In addition, revenues may be generated by placement of advertisements at the notification site or pushing advertisements to users in connection with notifications or otherwise. Such advertisements may also be selected based on information specific to the user. For example, a user who has asked to be notified of golfing programs on television may receive advertisements for golf equipment, golf vacations and the like. The notification program may provide the user an option to receive or not receive such advertisements.

Figure 4:
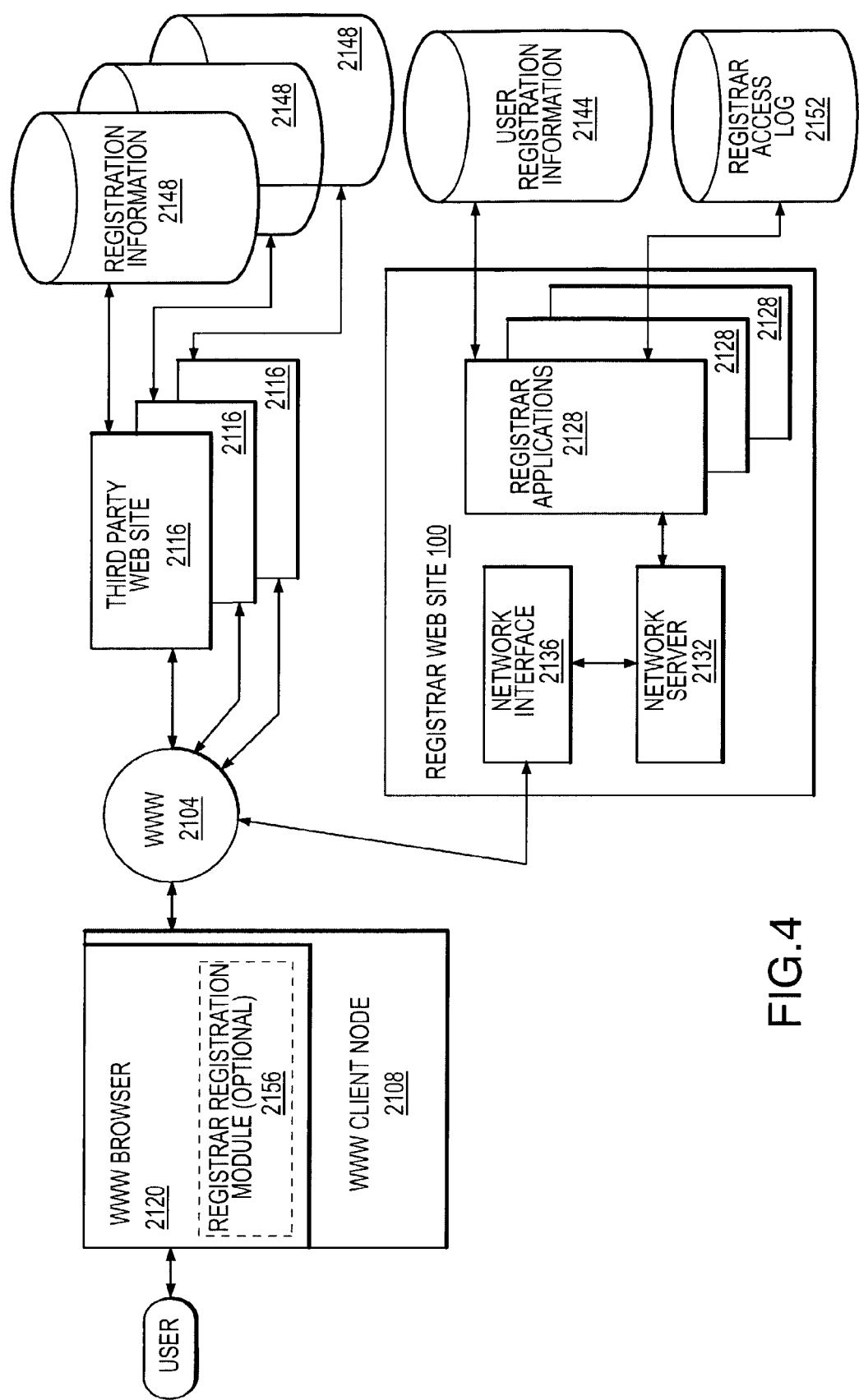
FIG. 4 is a block diagram of the web site registration information processing system of the present invention, wherein this system is shown in the context of its connections to various nodes of the World Wide Web.

As described above, the system 100 may include a registration site as described in detail in U.S. Pat. No. 5,790,785. FIG. 4 is a block diagram of such a web site registration information processing system of the present invention, (hereinafter also denoted by the name "registrar") wherein this system is shown in the context of its connections to various nodes of the World Wide Web (WWW). In a first embodiment, a web site, denoted the registrar web site 2100, provided by the present invention, is connected to the World Wide Web 2104 for communicating with both World Wide Web client nodes such as WWW client node 2108, and with other web sites such as third party web site 2116, wherein the registrar web site 2100 facilitates the registration of a user at a WWW client node 2108 when this user desires to register at the third party web site 2116. In this first embodiment, the user accesses the World Wide Web 2104 through a WWW browser 2120 on a WWW client node 2108 wherein, to use the registration facilities of the registrar web site 2100 for registering the user at a one or more third party web sites 2116, the user must in some manner request explicit access to the registrar web site 2100 for registering his/her registration information to the registrar web site 2100. Additionally, in this first embodiment of the present invention, the WWW client node 2108 need not have executable program modules designed specifically for interfacing with the registrar web site 2100. That is, substantially any conventional World Wide Web browser may be used as the WWW browser 2120.

Thus, the first embodiment of the present invention may be described as follows. In order for a user to register at one or more third party web sites 2116, the user at a WWW client node 2108 accesses the World Wide Web 2104 and in a first scenario explicitly navigates through the World Wide Web 2104 to the registrar web site 2100 wherein a registrar web site 2100 home page is communicated back to the user's WWW browser 2120. As one skilled in the art will appreciate, program modules 2128 (hereinafter denoted "registrar applications") output, to a World Wide Web network server 2132, information in, for example, a hypertext markup language (HTML) related to capabilities of the registrar web site 2100 in assisting the user in registering at third party web sites 2116. Such outputs from registrar applications 2128, are subsequently transmitted, via the network server 2132 and the network interface 2136, to the user's WWW browser 2120 in the hypertext transfer protocol (HTTP), as one skilled in the art will appreciate. Thus, upon presentation of the registrar web site 2100 home page on the user's WWW client node 2108, the user subsequently may request to provide registration information to the registrar web site 2100 so that he/she can have this information at the registrar web site 2100 automatically transferred to a third party web site 2116 when the user is requested to register at such a third party web site. Subsequently, after the user's request to supply registration information is transmitted to the registrar web site 2100 (via World Wide Web 2104, network interface 2136 and network server 2132), the registrar applications 2128 receive the request and output to the user's WWW browser 2120 one or more "web pages" having fill-out forms to be presented to the user via the WWW browser 2120. Thus, upon submittal of the filled out forms by the user to the registrar web site 2100 (more precisely, the registrar applications 2128), the user's registration information is stored in the user registration information database 2144.

Following the above registration procedure at the registrar web site 2100, the user may then substantially automatically register at various third party web sites 2116 that are affiliated with the registrar web site 2100 in that an agreement has been reached between each such third party web site 2116 and the registrar web site 2120 for transmitting a user's registration information to the third party web site 2116 when, for example, the user requests such transmittal. Thus, assuming the user accesses the third party web site 2116 and, for example, the home page for the third party web site 2116 includes a form field allowing the user to specify that the user's registration information is stored and accessible at the registrar web site 2100, then the user can submit a response, via the World Wide Web 2104, to the third party web site 2116 indicating that the user's registration information should be obtained from the registrar web site 2100. Thus, the third party web site 2116 requests and receives the user's registration information from the registrar web site 2100 and stores the user's registration information in registration information database 2148 directly accessible by the third party web site 2116. Additionally note that when the registrar web site 2100 receives a request from the third party web site 2116 for user registration information, a registrar application 2128 records the request for the user's registration information in a registrar access log data base 2152. Thus, the registrar web site 2100 maintains a log of the third party web sites requesting registration information. Further, such third party web sites 2116 may periodically provide the registrar web site 2100 with information related to the frequency that users registered at the registrar web site 2100 have accessed the third party web sites 2116. Therefore, by also storing this information, for example, in the registrar access log 2152, the registrar web site 2100 is able to determine the frequency and type of access of third party web sites 2116 by users.

In a second method of using the first embodiment of the present invention, instead of the user explicitly navigating the World Wide Web 2104 to the registrar web site 2100 for providing registration information, the user may instead access a third party web site 2116 wherein the home page or registration page for the third party web site includes input fields allowing the user to request that the registrar web site 2100 automatically be accessed so that the user can enter web site registration information at the registrar web site 2100 and subsequently use the registration information provided to the registrar web site 2100 for automatically registering at the third party web site 2116 (as well as other third party web sites that may be subsequently requested). That is, the newly entered registration information is transferred to the third party web site 2116 by entering into a registrar specific portion of the registration form for the third party web site 2116 a registrar user identification and optionally a password for requesting that the third party web site access the registrar web site 2100 to obtain the user's registration information. Thus, the user's registration information automatically is communicated to the third party web site 2116 without the user explicitly having to navigate the World Wide Web 2104 and access the registrar web site 2100 to register his/her web site registration information.

Note that alternative embodiments are within the scope of the present invention, wherein program modules for the present invention are distributed so that there is an executable module provided on the user's WWW client node 2108 for communication with the registrar web site 2100 as well as with third party web sites 2116 that accept registration information from the present invention. In one embodiment of such a distributed architecture for the present invention, a registrar registration module 2156 is integrated into the user's WWW browser 2120 for gathering the user's web site registration information and communicating with the registrar web site 2100 as well as cooperating third party web sites 2116 at which the user desires to register. Such a registration module 2156 may provide the user with easier access to his/her registration information since the information resides locally on the user's WWW client node 2108 in a persistent nonvolatile storage. Further, the registrar registration module 2156 may be activated for entering or updating user registration information without the user necessarily being connected to the World Wide Web 2104. Moreover, by integrating the registrar registration module 2156 into the user's WWW browser 2120, the user is presented with an integrated set of functions for registering and accessing third party web sites 2116.

Thus, in such distributed architectures, after the user has entered registration information into the registrar registration module 2156, this module will substantially automatically contact the registrar web site 2100 (via the World Wide Web 2104) and thereby communicate the user's registration information to the registrar web site 2100 so that, for example, the user's registration information may be reliably stored in case there are failures at the user's WWW client node 2108. Thus, to access a third party web site 2116 that cooperates with the registrar for registering the user, once the user has made contact through the World Wide Web 2104 with such a third party web site 2116, the user transfers his/her registration information from the registration module 2156 to the third party web site. Further note that in the registration process of the present embodiment, whenever the user registers at a third party web site 2116, the registrar web site 2100 is provided, by (for example) the module 2156, with information related to the registration so that the user also has a off-site backup copy of all registrations at third party web sites residing at the registrar web site 2100.

Note that other distributed architectures for the present invention are also contemplated wherein the registrar registration module 2156 on the user's WWW client node 2108 is not integrated with the user's WWW browser 2120. In such an embodiment, the user may be faced with a different user interaction technique for the module 2156 than that of the WWW browser 2120. However, the user is provided with added flexibility in choosing a WWW browser 2120 and/or using his/her existing browser 2120 which may not contain as part of the browser the registrar registration module 2156.

Figure 5A:
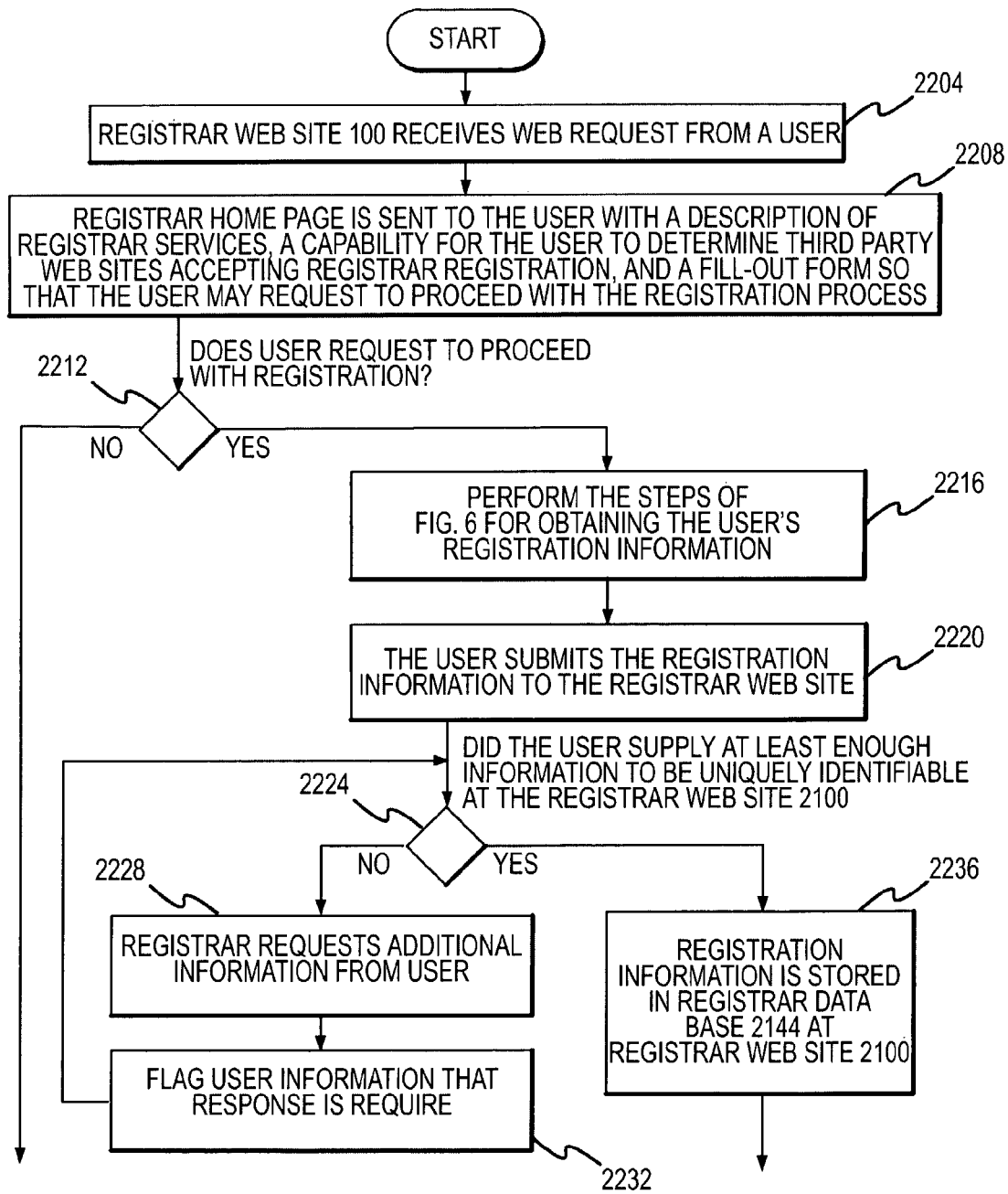
FIGS. 5A and 5B provide a flowchart for describing the steps performed when a user of the World Wide Web explicitly contacts the registrar web site 2100 of the present invention for supplying registration information to be used in registering at third party web sites 2116.
Figure 5B:
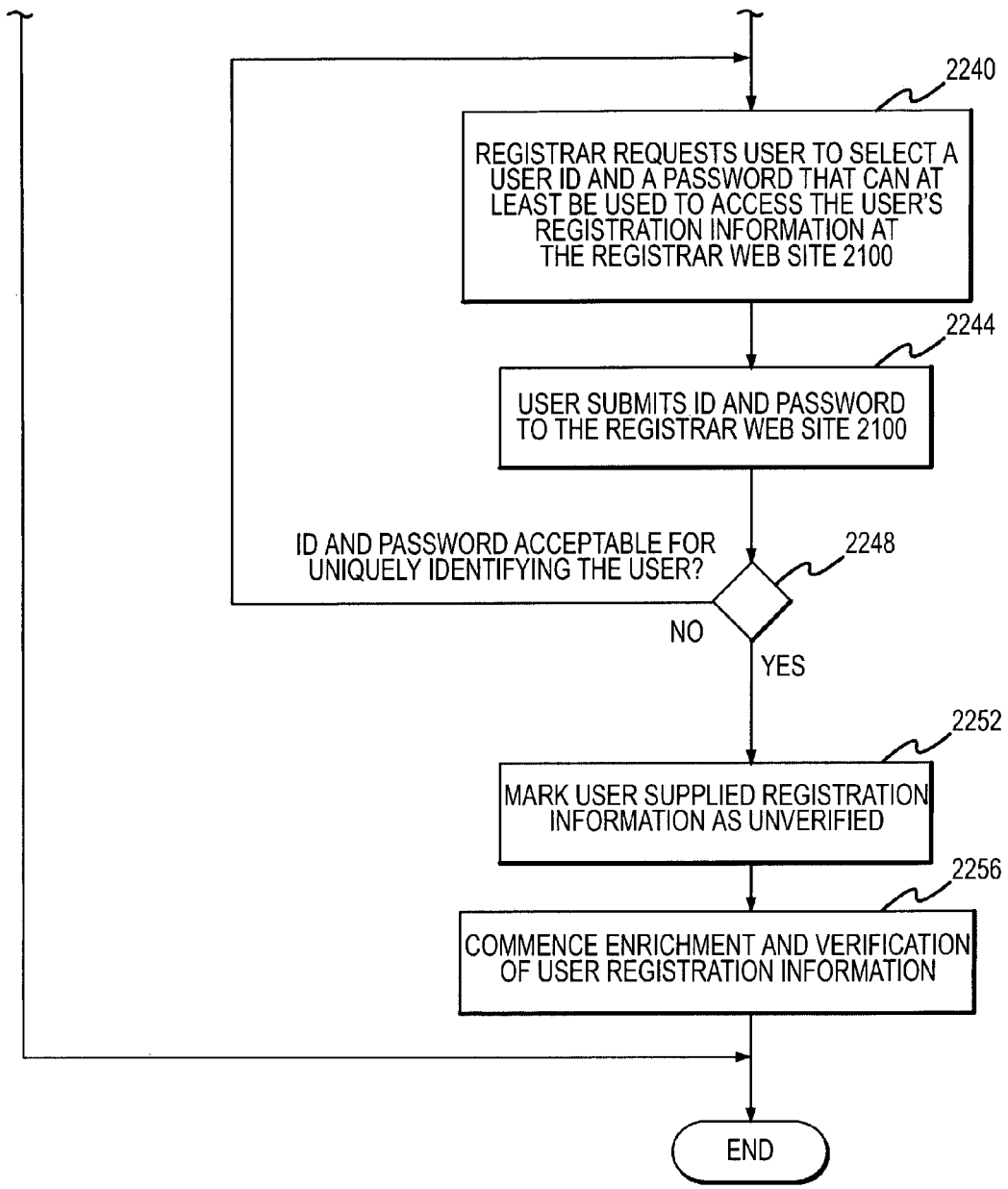
Figure 6:
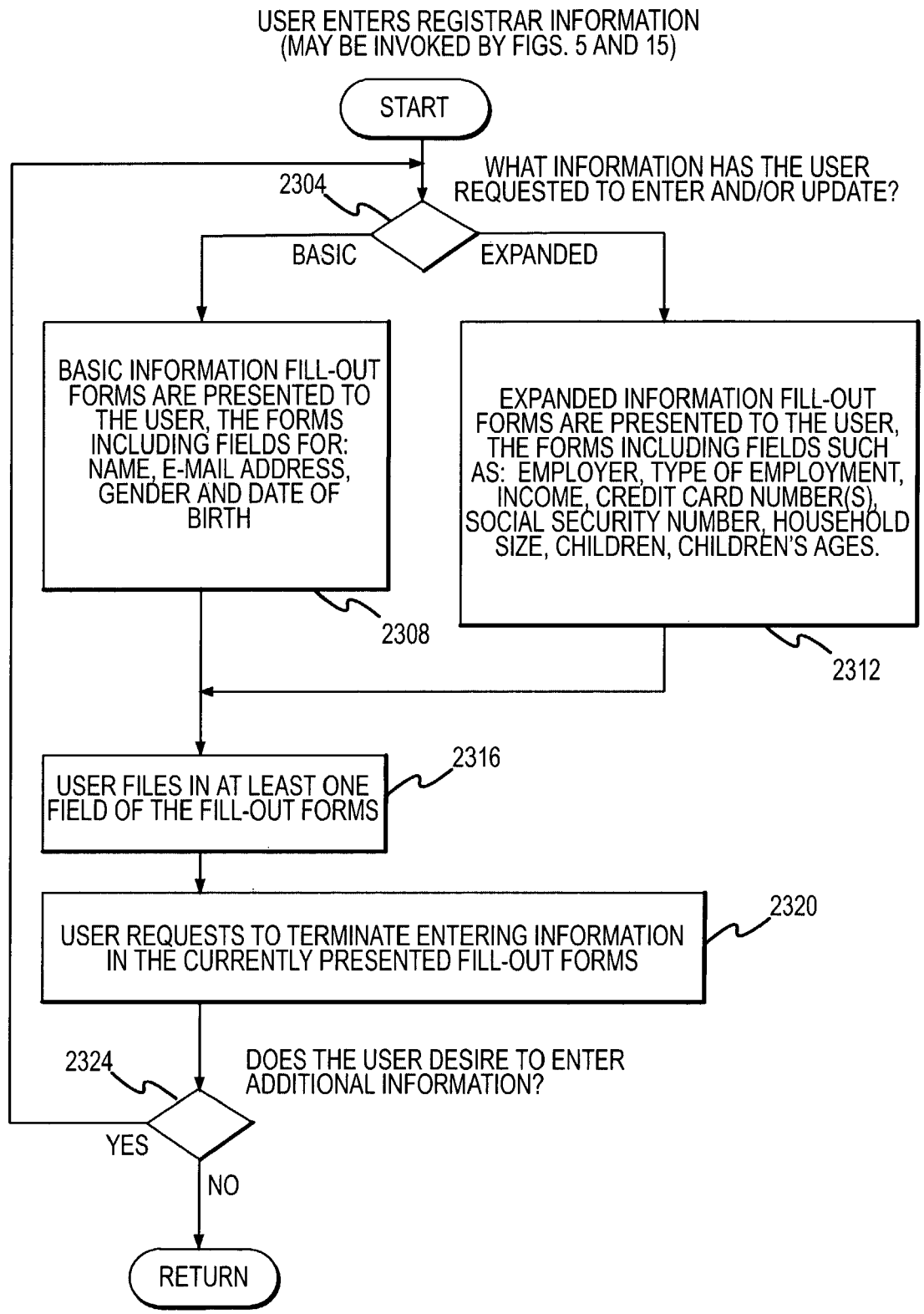
FIG. 6 is a flowchart presenting the steps a user of the World Wide Web performs when entering web site registration information into fill-out forms that are to be submitted to the registrar web site 2100 of the present invention.

In FIGS. 5A and 5B, a flowchart is presented describing the steps performed when the user explicitly navigates the World Wide Web 2104 to contact the registrar web site 2100 for supplying registration information. Accordingly, assuming the user contacts the registrar web site 2100, in step 2204 the web site 2100 receives the user's request for information. Subsequently, in step 2208 the registrar web site 2100 responds with a home page describing the registrar services, a selection or browsing capability for reviewing third party web sites 2116 accepting registrar registrations, and a fill-out form so that the user may request to proceed, if desired, with entering registration information at the registrar web site 2100. In step 2212 the user determines whether to proceed with the registration process or not. Assuming the user elects to proceed, the request to proceed is transferred back to the registrar web site 2100 wherein a registrar application 2128 examines the response and outputs a fill-out form that is transmitted back to the user's WWW browser 2120 so that the user may enter his/her registration information and submit it to the registrar web site 2100. Thus, in step 2216 the steps of the flowchart of FIG. 6 are performed by the user when entering information into the registration fill-out form provided by the registrar web site 2100. Subsequently, in step 2220 the user initiates the transfer of his/her registration information to the registrar web site 2100. Note that the submittal of the registration information may be performed by a conventional electronic transfer through the World Wide Web 2104 using any one of various internet protocols or, alternatively, other techniques for transferring the information to the registrar web site 2100 are also contemplated. For example, the user may fax a printed copy of a completed registration form to the registrar web site 2100 at which point the information may be manually input into the user registration information database 2144. In step 2224, upon receiving the user's registration information, one or more registrar applications 2128 review the user's registration information for determining whether there is enough information supplied to at least uniquely identify the user. If not, then in steps 2228 and 2232 a registrar application(s) 2128 requests additional information from the user and flags the user's information currently stored in the user registration information database 2144 indicating that a user response is required to further process the user's information. As an aside, note that other feedback loops to the user are contemplated that are related to the loop of steps 2224 through 2232. For example, it may be the case that the user has supplied sufficient information to be uniquely identifiable at the registrar web site 2100, but the user has supplied insufficient information for the registrar web site 2100 to supply adequate information to most third party web sites 2116 that utilize registrar registration capabilities. Thus, a similar feedback loop to loop 2224 through 2232 may be provided for requesting that the user supply additional information so that a substantial number of third party web sites 2116 cooperative with registrar will allow the user to register at them using only the information supplied by the registrar web site 2100.

Referring again to step 2224, if a determination is made that sufficient registration information has been received at the registrar web site 2100, the user's registration information is stored in the user registration information database 2144 (step 2236) and subsequently a registrar application 2128 outputs a request to the user to select a user ID and password that can be at least used to access the user's registration information at the registrar web site 2100 (step 2240). Assuming, as in step 2244, that the user submits a user ID and a password to the registrar web site 2100, then in step 2248 a determination is made by the present invention (more particularly, a registrar application 2128) as to whether the user supplied ID and password is acceptable for uniquely identifying the user. If not, then steps 2240 through 2248 are repeated until an appropriate user ID and password are entered by the user. Thus, assuming that an acceptable user ID and password are provided, in step 2252 the registration information supplied by the user is marked as unverified since there has been no independent confirmation that the user supplied information is accurate. Subsequently, in step 2256 a registrar application 2128 commences to enrich the user's supplied registration information with publicly available information related to the user and, to the degree possible (i.e., conforming with internet etiquette, privacy concerns of users, and public policy), to verify the user's registration information. Note that by comparing the user supplied information with information about the user from other sources, a determination can be made as to the accuracy of the user supplied information. Thus, whenever an item of the user supplied information is independently verified, then that item is unmarked. Alternatively, if discrepancies arise between the user-supplied information and other publicly available information about the user, then the user may be alerted to these discrepancies and requested to confirm his/her initial responses.

Referring now briefly to FIG. 6, this flowchart presents the steps a user performs when entering web site registration information into the fill-out forms to be submitted to registrar. Accordingly, in step 2304 the user determines whether to supply basic information (i.e., requested by a substantial number of third party web sites 2116) as described in step 2308 or to supply expanded information (i.e., more extensive information about the user so that, for example, registrar has sufficient user information to register the user at substantially all cooperating third party web sites 2116). Note that at least in one embodiment, the basic information supplied in step 2308 (i.e., the user's name, e-mail address, gender and date of birth) is also requested in the forms for expanded information in step 2312. Thus, upon filling in at least one field from the fill-out forms (step 2316) presented in either step 2308 or 2312 the present invention field checks the user's input for syntactically appropriate responses. Subsequently, in step 2320, the user inputs a request to terminate entering information in the presently presented fill-out form(s) and in step 2324 the user determines whether to enter additional information in either the basic registration information fill-out forms or the expanded information fill-out forms. If the user indicates that he/she desires to enter further registration information, then step 2304 is again performed. Alternatively, the flowchart returns to the invoking program (flowchart) with the user supplied registration information.

Figure 7A:
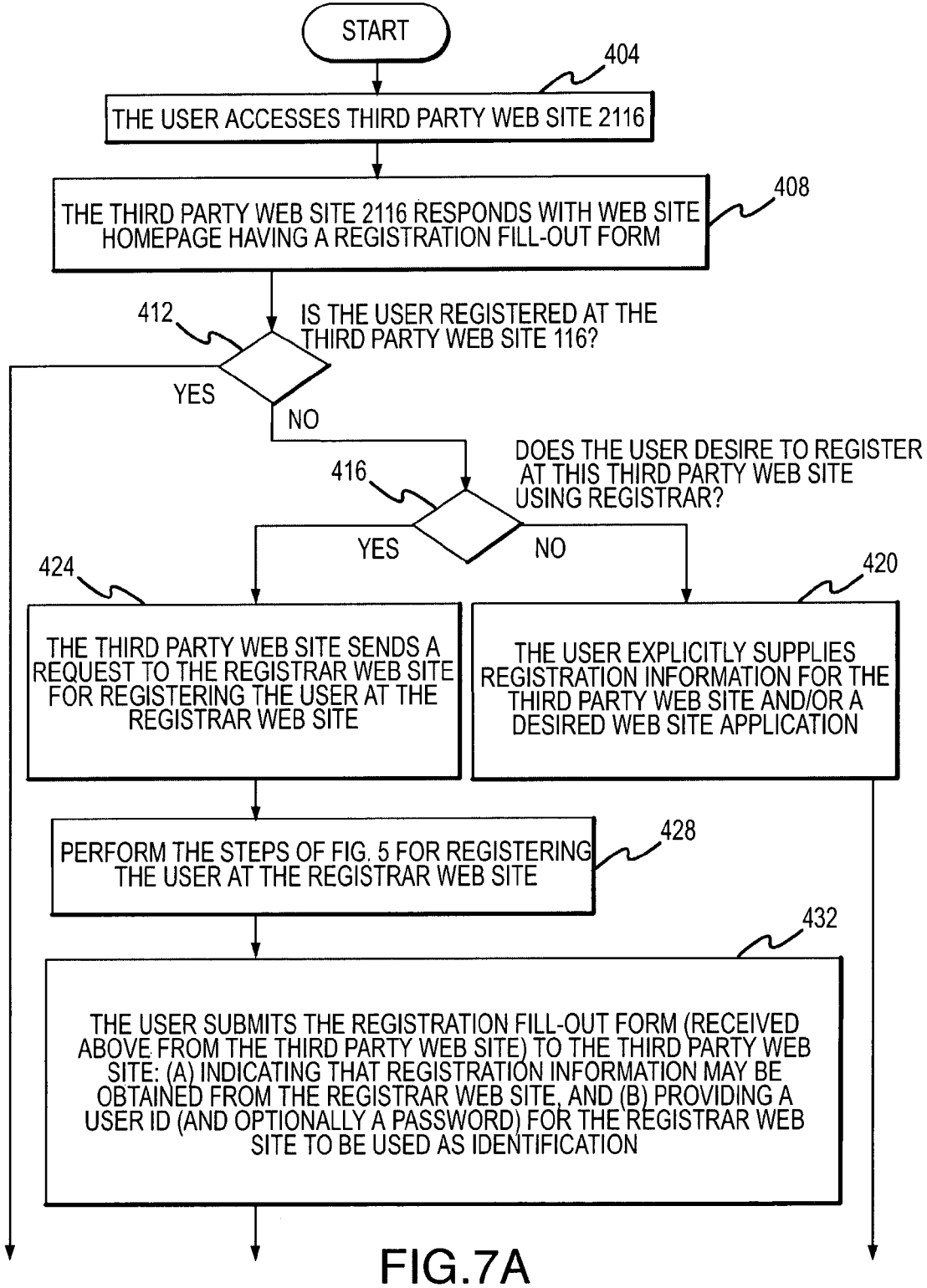
FIGS. 7A and 7B present a flowchart for the steps performed when a user of the World Wide Web accesses a third party web site 2116, cooperating with the present invention, and in the process of registering at the third party web site the user is automatically put in contact with the registrar web site 2100 of the present invention so that registration information may be provided to the present invention for registering the user at the present third party web site as well as other third party web sites that the user may subsequently request.
Figure 7B:
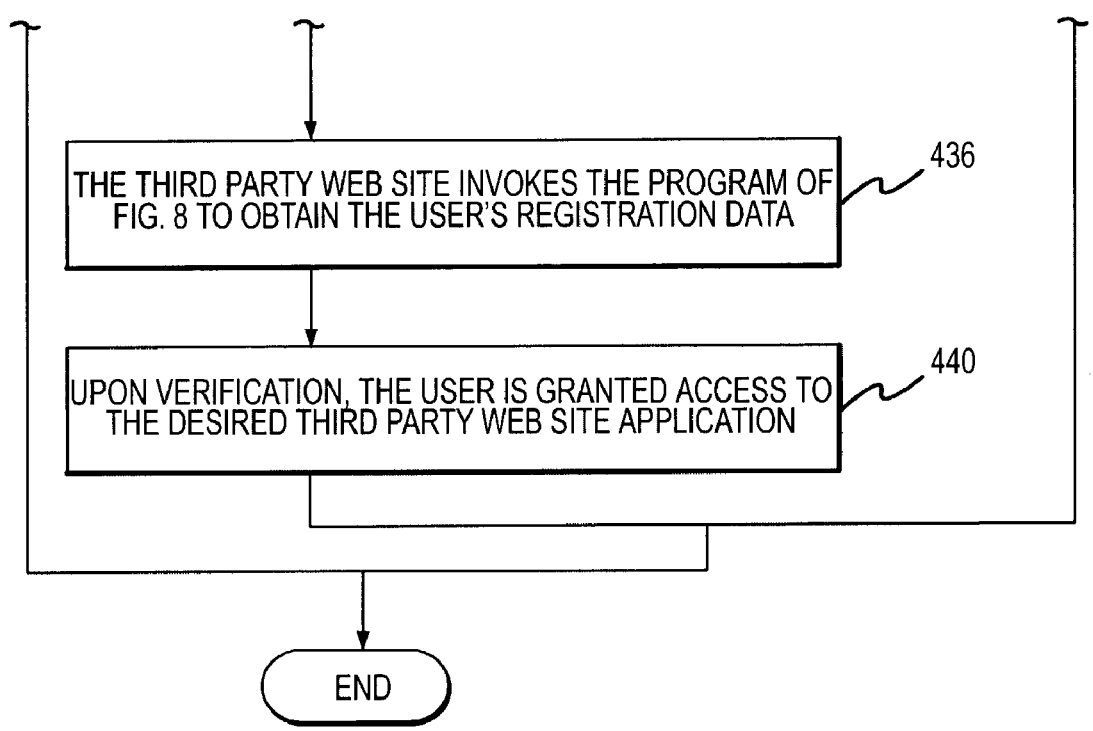

FIGS. 7A and 7B present a flowchart for the steps performed when the user accesses a present third party web site 2116 cooperating with registrar, and in the process of registering at the third party web site the user is automatically put in contact with the registrar web site 2100 so that registration information may be provided to registrar for registering the user at the present third party web site as well as other third party web sites that the user may request. Accordingly, assuming the user uses a WWW browser 2120 to access a third party web site 2116 as in step 404, the third party web site responds with a web site home page (step 408) typically having a registration fill-out form into which the user is requested to enter registration information. Note that the user may or may not be registered at this third party web site. Thus, if the user is registered, then he/she may only need to enter a user ID and optionally a password in order to gain access to a desired application at the third party web site. Further note that for different third party web sites 2116, the user's identification (and optionally a password) may be different due to constraints on user ID (and password) syntax being different at different third party web sites. Further, such user IDs at different web sites may be different because a user ID requested by the user may already have been assigned to another user.

Subsequently, once the third party web site 2116 has received a response from the user, a determination is made as to whether the user is registered at the web site (step 412). If the user is registered, then no further processing related to the present invention is required. Alternatively, if the user is not registered at the third party web site, then a response is transferred from the third party web site 2116 through the World Wide Web 2104 to the user's WWW browser 2120 providing the user with the fill-out forms in which the user is requested to enter information for registering at the third party web site. Note that if the third party web site 2116 is configured to accept user registration information from the present invention, then at least one fill-out form related to registering at the third party web site 2116 will request information related to registering the user by using the present invention. In particular, the third party web site 2116 may present the user with a fill-out form requesting the user to enter a user ID and optionally a password for the present invention (i.e., registrar) if the user is registered at the registrar web site 2100. Additionally, the presented fill-out forms may request the user to indicate whether he/she prefers to register at the third party web site 2116 by using registrar. Thus, assuming the user desires to register at the third party web site 2116, a determination is made as to whether the user wishes to register using the present invention or register at the third party web site without using the present invention (step 416). If the user chooses to not use the present invention for registering at the third party web site 2116, then the user explicitly supplies registration information for the present third party web site (step 420). Alternatively, if the user chooses to use registrar to register, then once the present third party web site 2116 receives a response from the user indicating the choice to use registrar to register, in step 424, the present third party web site sends a request to the registrar web site 2100 for registering the user at the registrar web site 2100. Subsequently, in step 428 the steps of FIGS. 5A and 5B are performed for registering the user at the registrar web site 2100. Subsequently, after registering at the registrar web site 2100, in step 432, the user is automatically placed in contact with the present third party web site so that he/she submits a registration fill-out form to this third party web site 2116: (a) indicating that the user's registration information may be obtained from the registrar web site 2100; and (b) providing a user ID (and optionally a password) for the registrar web site 2100 to be used as identification at the present third party web site. Following this, in step 436 the third party web site 2116 invokes the program corresponding to FIG. 8 to obtain the user's registration data from the registrar web site 2100. Lastly, upon verification by the third party web site 2116 of the user's registration data, the user is granted access to the desired third party web site and/or application (step 440).

Figure 8:
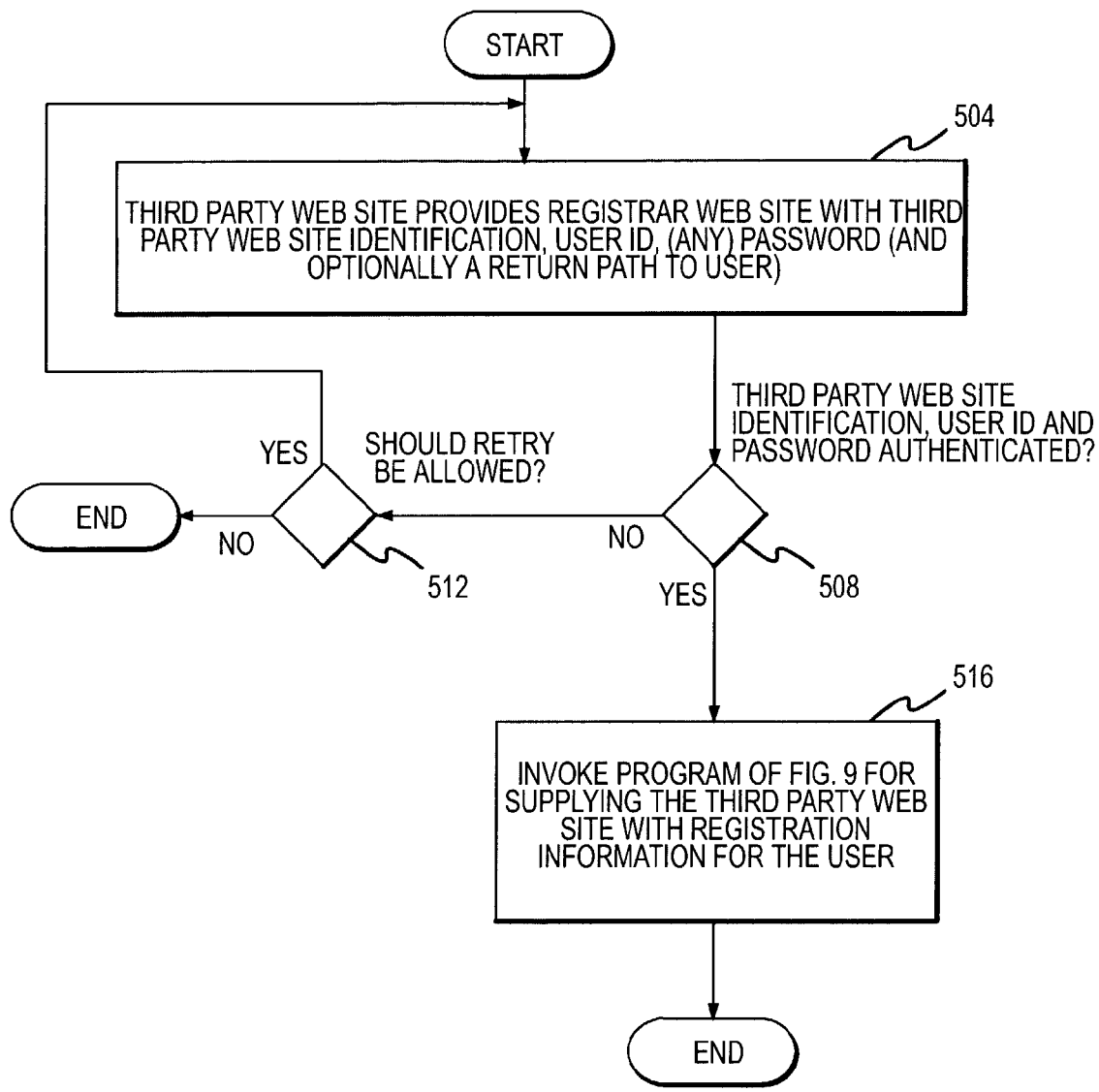
FIG. 8 is a flowchart of the steps performed by the present invention when transferring user registration information from the registrar web site 2100 to a third party web site 2116 to which the user has requested to register.

In FIG. 8, a flowchart is presented of the registration data transmission process from the registrar web site 2100 to a third party web site 2116. Accordingly, in step 504 the third party web site 2116 provides the registrar web site 2100 with identification of the third party web site, the user's registrar user ID and (any) registrar password. Further, in some instances, as will be described below, the third party web site 2116 also supplies the registrar web site 2100 with a return path to the user through the World Wide Web 2104. Following this, in step 508, a determination is made by the registrar web site 2100 as to whether the third party web site supplied information can be authenticated. If not all third party web site information is authenticated, then step 512 is encountered wherein a determination is made as to whether to request that the third party web site to resend the information of step 504. Note that such a determination may be made in one embodiment depending upon whether the third party web site identification is authenticated. That is, if the third party web site identification is authenticated, then a retry may be allowed. Otherwise, no retry may be allowed. Alternatively, referring again to step 508, if all information transmitted from the third party web site 2116 is authenticated at the registrar web site 2100, then step 516 is encountered. In this step, the program represented by FIG. 9 is performed for supplying the third party web site 2116 with registration information related to the user from the user registration information database 2144.

Figure 9A:
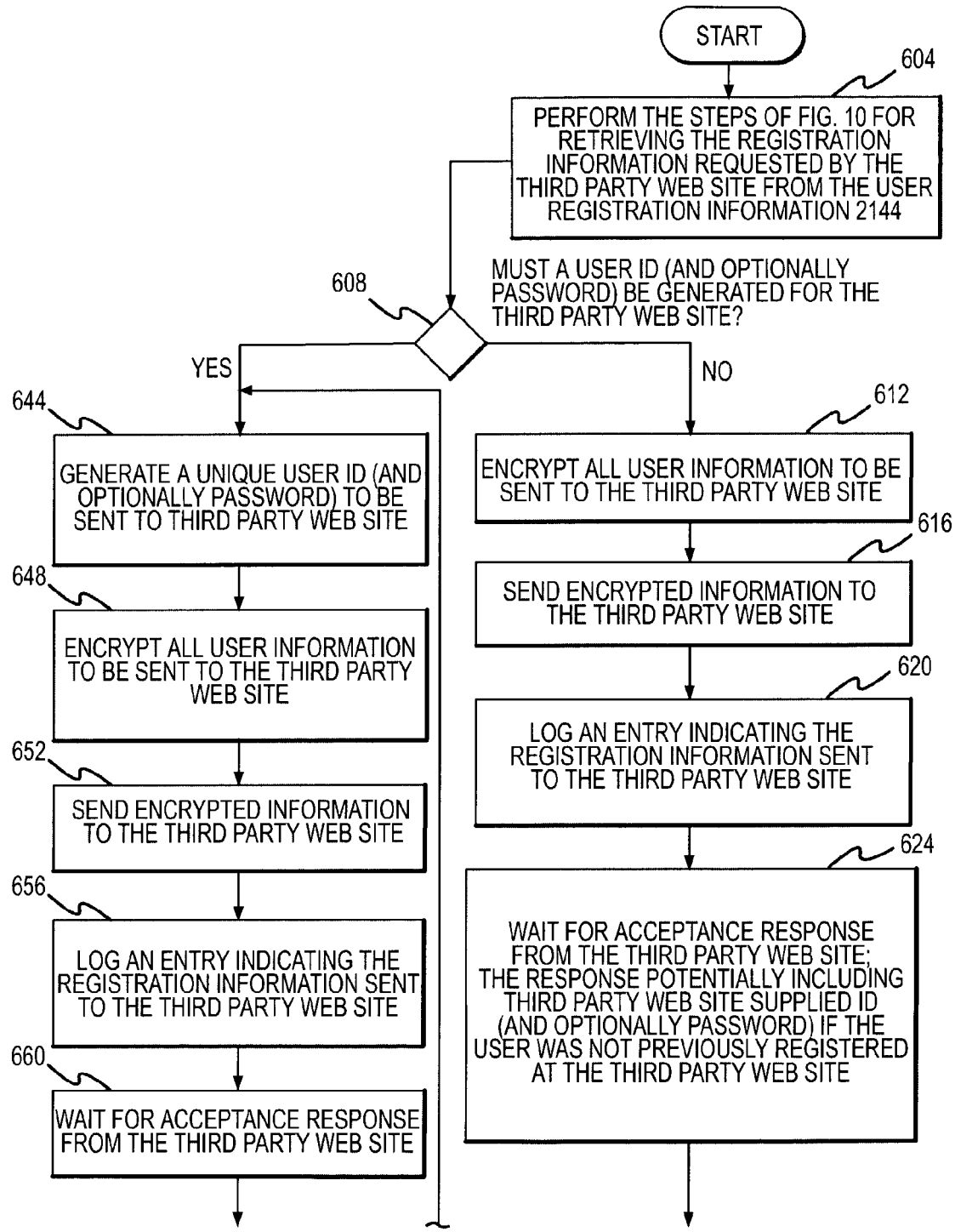
FIGS. 9A and 9B provide a flowchart of the steps performed when supplying a third party web site 2116 with registration information from the registrar web site 2100, assuming that the third party web site has requested such information and that the request has been authenticated at the registrar web site 2100.
Figure 9B:
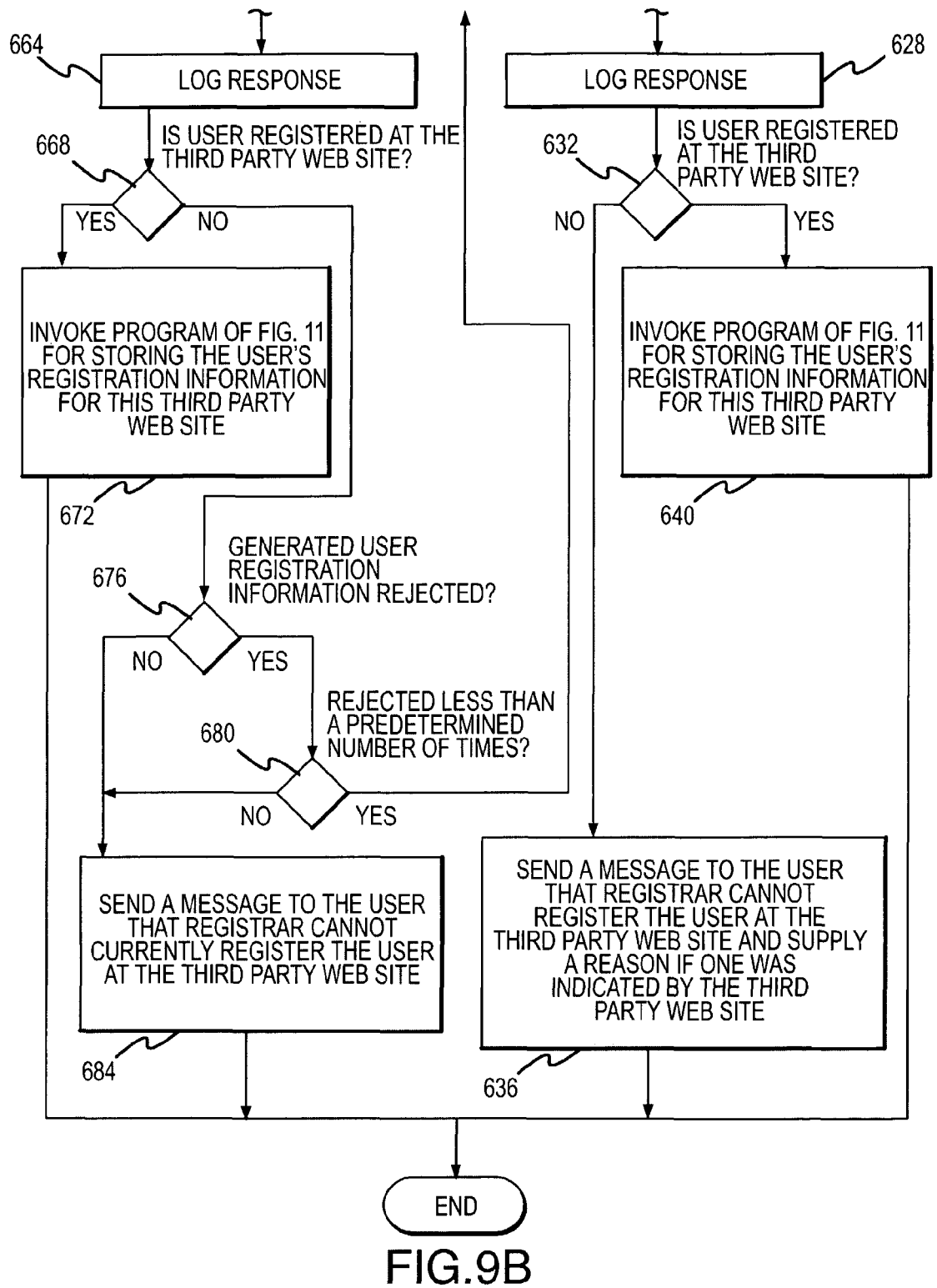

Referring now to FIGS. 9A and 9B, the flowchart presented here provides the steps for supplying a present third party web site 2116 with registration information from the registrar web site 2100, assuming that the present third party web site 2116 has requested such information and that the request has been authenticated at the registrar web site 2100. Accordingly, in step 604 the registrar web site 2100 or, more precisely, a registrar application 2128 performs the steps of FIG. 10 for retrieving the user registration information requested by the present third party web site 2116 from the user registration information database 2144. Note that a third party web site 2116 may request various categories of information from the registrar web site 2100 related to the user. In particular, a third party web site may request: (a) basic information as discussed in step 2308 of FIG. 6; (b) expanded information as discussed in step 2312 of FIG. 6; (c) custom information, wherein selected fields from the basic and expanded information are provided; and (d) proprietary information wherein one or more additional user related information items may be provided wherein these items have been obtained by the registrar web site 2100 by, for example, enriching and verifying the registration information obtained from the user as in step 2256 of FIG. 5B.

Following step 604, step 608 is encountered wherein a registration application 2128 determines whether the present third party web site 2116 requesting user information (for a user attempting to register at this third party web site) requires that a user ID (and optionally password) be generated specifically for this third party web site. That is, the third party web site 2116 may require a user ID and/or password that conforms with a format peculiar to the third party web site 2116. Note that to perform the step 608, in at least one embodiment of the present invention, information related to the requirements of the present third party web site 2116 are stored at the registrar web site 2100. In particular, the registrar web site 2100 may store a user information request template for each third coordinating party web site 2116 having access to user information at the registrar web site 2100 such that a registrar application 2128 (upon identifying a particular third party web site 2116) may access a related user information request template for determining what information may be required by this third party web site.

If a user ID and optionally password need not be generated specifically for the requesting third party web site 2116, then in step 612 the user information requested by the third party web site 2116 is encrypted and in step 616 the encrypted information is sent to the third party web site. Following this, in step 620 a registrar application 2128 logs an entry or a record in the registrar access log database 2152 indicating that registration information for the user has been transmitted to the present third party web site 2116. Subsequently, in step 624 a registrar application 2128 (or, more precisely, an instantiation thereof) waits for an acceptance response from the present third party web site 2116 to which the encrypted user information was sent. Note that the response from the present third party web site may include a third party web site specific user ID (and optionally password) if the user was not previously registered at this third party web site. That is, the third party web site may automatically generate at least a user ID if the user was not previously registered at the web site. Alternatively, it may be the case that the present third party web site uses the user's registrar registration user ID and password for registering the user at the third party web site 2116. Note that in at least one embodiment for registration processing at a third party web site 2116, the use of the registrar user ID does not create ambiguity in the identity of users registering at the third party web site. For example, a user seeking access to a cooperating third party web site may be required to indicate that his/her user ID and/or password is a registrar generated user ID (and/or password) so that the third party web site can process the entered user identification differently from that of users who have registered without using the present invention. Subsequently, when an acceptance response from the requesting third party web site 2116 is provided to the registrar web site 2100 (or, more precisely, a registrar application 2128), this response is logged in the registrar access log database 2152 in step 628. Following this latter step, in step 632, a determination is made as to whether the response from the present third party web site 2116 indicates that the user is now registered at this third party web site. If no such indication is provided, then in step 636 a message is sent to the user at the user's WWW client node 2108 that registrar cannot register the user at the present third party web site to which the user has requested registration and access. Further, the registrar application 2128 performing step 636 may also supply the user with a reason as to why the user cannot register through registrar at the present party web site if such a reason was indicated by this third party web site when the response of step 624 was received.

Figure 11:
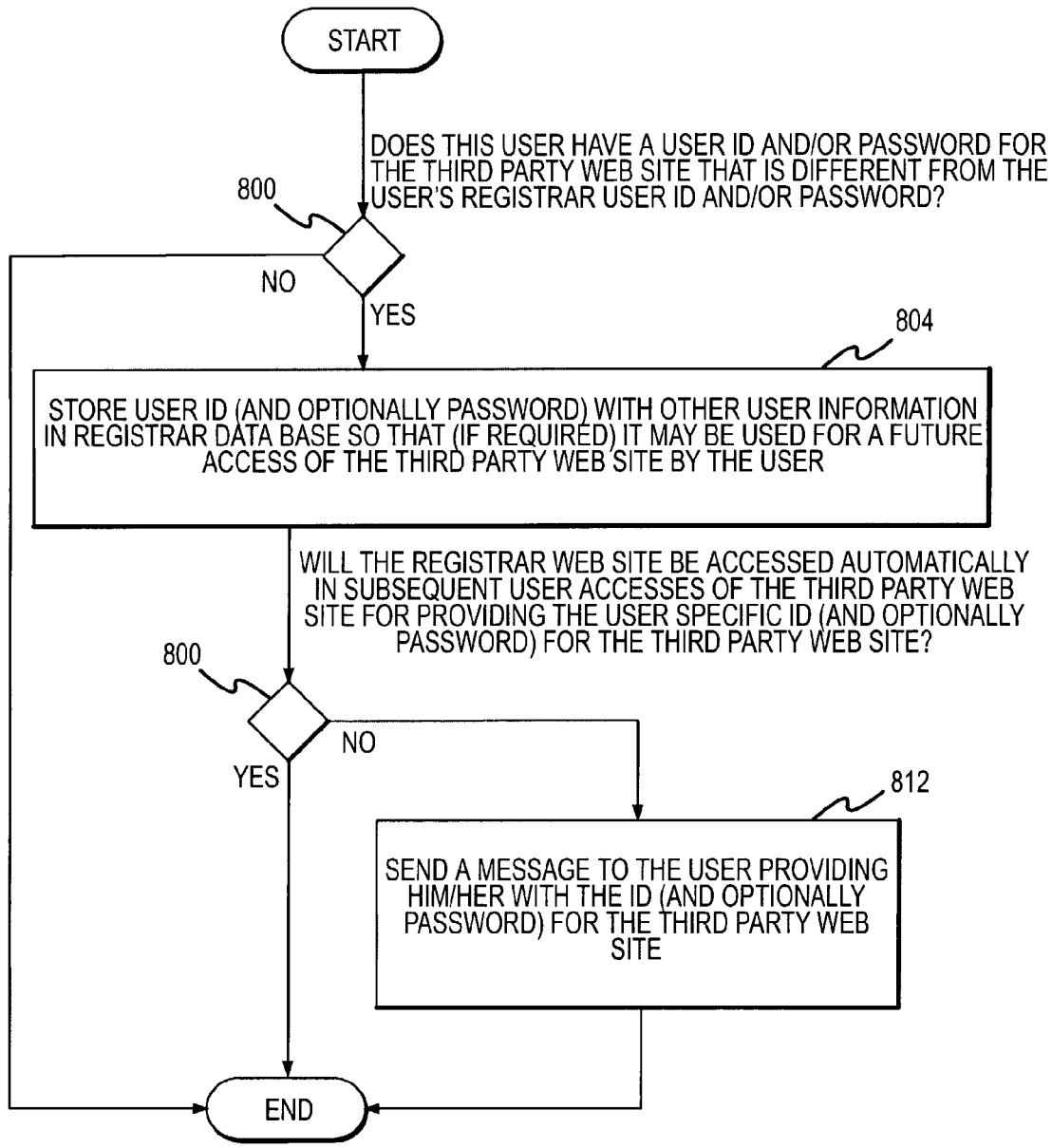
FIG. 11 presents a flowchart of the steps performed when storing in the user registration information database 2144 a user's ID (and optionally password) relating to a third party web site 2116 to which the user is registered via using the present invention.

Alternatively, if in step 632 it is determined that the user is registered at the present third party web site, then in step 640 the program corresponding to the flowchart of FIG. 11 is performed for storing at least the user's ID (and optionally password) for the present third party web site at the registrar web site 2100 (more precisely, in the user registration information database 2144) as will be discussed hereinbelow.

Referring again to step 608 of FIG. 9A, if a registrar application 2128 is required to generate a user ID (and optionally password) for the third party web site 2116, then step 644 is next performed wherein a registrar application 2128 generates a user ID (and optionally password) to be transmitted to the third party web site 2116. Subsequently, the sequence of steps 648 through 668 are performed. Note that this sequence of steps is substantially the same sequence of steps as steps 612 through 632. However, the response from the present third party web site logged in step 664 may include an indication as to whether the user generated by the registrar application 2128 is acceptable to the present third party web site 2116.

Accordingly, continuing the discussion of FIGS. 9A and 9B from step 668, if the response from the present third party web site 2116 indicates that the user is registered at the desired third party web site, then step 672 is performed wherein the program corresponding to the flowchart of FIG. 11 is again used to store the user's ID (and optionally password) for the present third party web site in the user registration information database 2144 (as in step 640). Alternatively, if in step 668 it is determined that the user is not registered at the present third party web site 2116, then in step 676 a determination is made as to whether the generated user registration information (i.e., user ID and optionally password) step 644 has been rejected by the present third party web site. If so, then in step 680 a determination is made as to whether this rejection has occurred less than a predetermined number of times (i.e., the sequence of steps 644 through 668 have been iteratively performed less than a predetermined number of times in attempting to register the user at the present third party web site). If the results of the test in step 680 is affirmative, then step 644 is again encountered for generating alternative user registration information for the present third party web site. Note that it is an aspect of the present invention that, at least in one embodiment, such generations produce user IDs that are meaningful to the user and/or are related to other web site registration user IDs for the user. Thus, in one embodiment of the present invention, the step 644 uses the user's registrar user ID as a "seed" from which to generate a user ID acceptable to the present third party web site 2116. Moreover, note that the generation process of step 644 may use various heuristics and third party web site constraints to generate acceptable user IDs.

Alternately, if the negative branch from step 676 is followed, then the third party web site 2116 may have rejected registering the user for any of a number of reasons that may not be able to be alleviated in a timely fashion so that the user can be registered at this third party web site in a short amount of time. Accordingly, step 684 is encountered wherein a message is transmitted to the user's WWW client node 2108 indicating that registrar cannot currently register the user at the requested third party web site 2116. Further, note that if in step 680 it is determined that too many attempts have been made to generate acceptable registration information for the third party web site, then step 684 is also encountered.

The flowchart of FIGS. 9A and 9B is representative of the processing variations within the scope of the present invention for supplying a third party web site with registration information. For instance, those skilled in the art will appreciate that steps 624 and 660 may have a timer associated with them whereby if there is no response from the third party web site within a predetermined time period, then a default response is provided by a registrar application 2128 so that one of the steps 684 or 636 is performed as part of the processing when such a timer expires and subsequent steps in the flowchart are performed. Additionally, other steps may be inserted, for example, on the negative branch from step 676 wherein these additional steps attempt to address other anomalies indicated in the acceptance response received in step 660. For example, if the third party web site 2116 requests additional user information than what was provided in step 648, then if this additional information is in the user registration information database 2144 and the user has indicated that it is permissible to disseminate this information, then the additional information may be transmitted to the present third party web site 2116. Also, in such a case, the transmittal of this additional information is recorded in the registrar access log database 2152.

Figure 10:
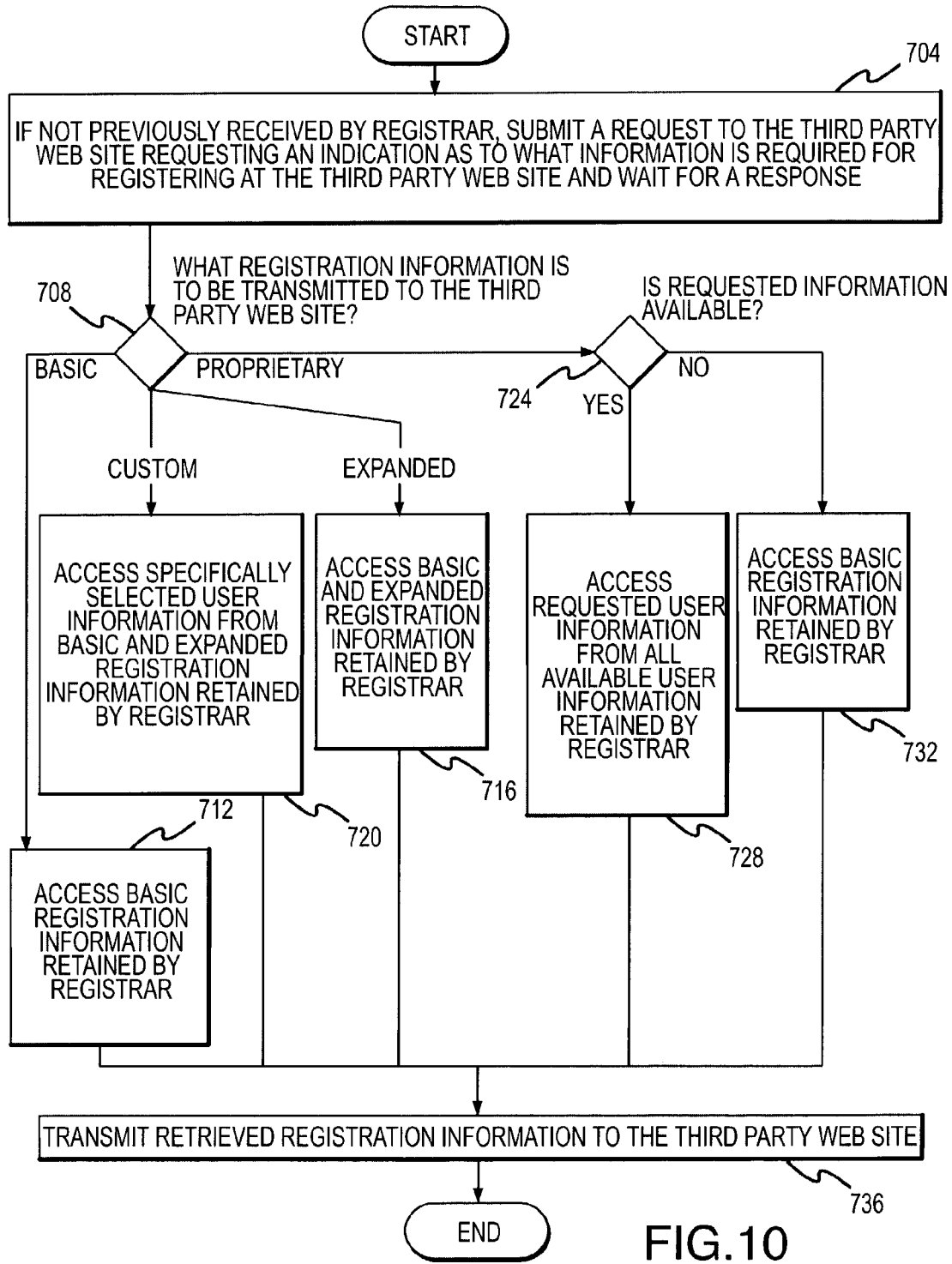
FIG. 10 presents a flowchart of the steps performed by the present invention when supplying a third party web site 2116 with user registration information from the user registration information database 2144.

Referring now to FIG. 10, wherein the flowchart for a program is provided for supplying, from the user registration information database 2144, a requesting third party web site 2116 with registration information related to a particular user. Accordingly, in step 704 of FIG. 10, if the registrar web site 2100 has not been previously supplied with an indication as to what type of information is required by the requesting third party web site, then a registrar application 2128 constructs such a request to be transmitted to the requesting third party web site and subsequently the application may wait for a response from this third party web site. Following step 704, in step 708 it is assumed that the registrar web site 2100 has been provided with an indication or specification as to what information the requesting third party web site desires. Thus, the registrar application 2128 performing step 704 may now determine what registration information is to be transmitted to this third party web site. Note that at least in one embodiment of step 708, the user registration information requested may require validation according to the following criteria:

(1.1) The type and amount of registration information for a user that the user has indicated is available to be transmitted to a requesting third party web site.

(1.2) The type and amount of information the requesting third party web site 2116 has contracted with the registrar web site 2100 for transmitting regarding a particular user or category of users.

(1.3) The registration information available in the user registration information database 2144.

Thus, as discussed with respect to step 604 of FIG. 9A, either basic, expanded, custom or proprietary registration information related to a user is transmitted to the requesting third party web site in step 736.

FIG. 11 presents a flowchart for storing, in the user registration information database 2144, a user's ID and/or password for a third party web site 2116 to which the user is registered using registrar. More precisely, the user ID and/or password for such a third party web site is stored via the steps of FIG. 11 if this information is different from the user's registrar user ID and/or password. That is, it is believed that for many third party web sites 2116, the registrar user ID and password for users registered at the registrar web site 2100 will be identical to the user's user ID and password at third party web sites. Note that there are significant advantages to third party web sites 2116 using, for each registered user, the user's registrar user ID and password (or, some other user ID and password in common with other third party web sites to which the user is registered). For instance, a user is required to remember fewer user IDs and passwords associated with web sites and the web sites providing this convenience may have a higher volume of users accessing the web site due to the greater ease of access.

Regarding the steps of FIG. 11, in step 800 a determination is made as to whether the user has been provided with a user ID (optionally password) for the third party web site 2116 (to which the user is attempting to register) that is different from the user's registrar user ID and/or password. If not, then there is nothing additional to store at the registrar web site 2100 and the flowchart ends. Alternatively, if the decision of step 800 results in a positive answer, then step 804 is performed wherein the user's specific user ID and optionally password for this third party web site is stored with other user registration information in the user registration information database 2144. Note the following advantages accrue by storing user registration information at the registrar web site: (a) each user has the convenience of off-site storage backup for each such third party web site to which the user is registered and (b) depending on the registration process at the third party web site, it may be expedient for such a web site (at least temporarily) to automatically contact the registrar web site 2100 for retrieving, for example, the user's third party web site specific user ID upon subsequent user accesses to the third party web site.

Following step 804, in step 808 a determination is made as to whether the third party web site has indicated that it will initiate requests as in (b) immediately above. If so, then no further processing needs to be accomplished here in that the user may enter his/her user registrar web site 2100 user ID (and optionally password) when accessing the third party web site. Alternatively, if step 808 yields a negative answer then step 812 is performed wherein the registrar web site 2100 sends a message to the user at the user's WWW client node 2108 providing the user with the ID (and optionally password) for the third party web site.

In an alternative embodiment of the present invention, a registrar registration module 2156 may be provided at the user's WWW client node 2108. This module (whether incorporated into the WWW browser 2120 or external to the browser and communicating with the browser through, for example, a browser 2120 port) may store locally at the client node 2108 registration information for accessing third party web sites 2116 to which the user has registered using the present invention. In FIGS. 12-16, flowcharts are provided for programs illustrating the processing of this alternative embodiment of the present invention.

Figure 12:
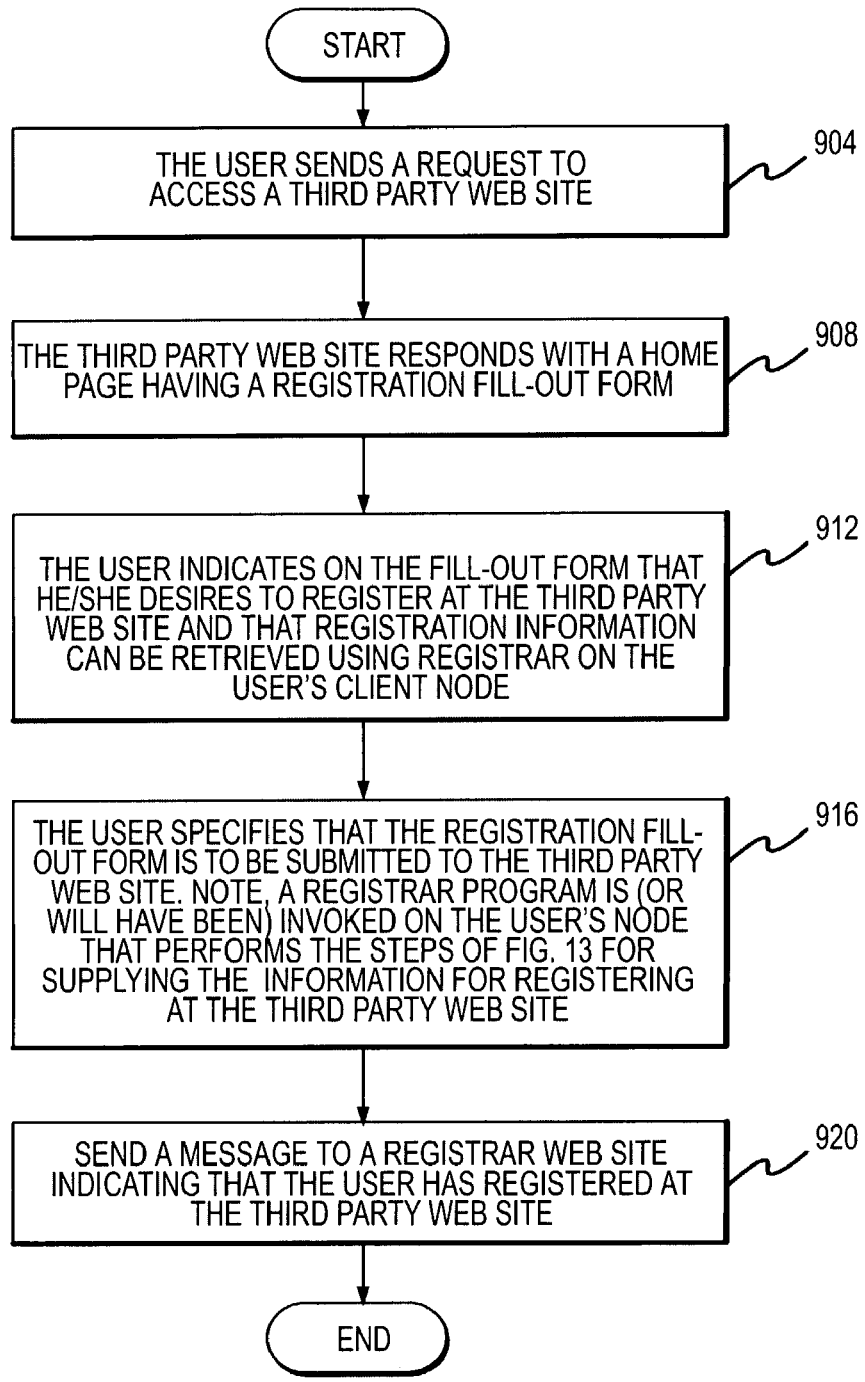
FIG. 12 is a flowchart of the steps performed when registering at a third party web site 2116 using the module 2156 of the present invention installed on the user's client node 2108.

In FIG. 12, a flowchart is presented of the program for registering at a third party web site 2116 when the module 2156 is installed on the user's client node 2108.

Describing now the steps of FIG. 12, in step 904 the user sends a request to access a third party web site 2116 via the user's WWW browser 2120. Subsequently, upon receiving the request, the accessed third party web site 2116 responds with a home page having a registration fill-out form (step 908). Assuming that the registration fill-out form allows the user to indicate that user registration information may be obtained locally at the client node 2108, in step 912 the user indicates on the fill-out form that he/she desires to register at the third party web site and that his/her registration information can be retrieved using the registrar registration module 2156 residing on the user's client node 2108. Further note that the user may be required to activate or alert the module 2156 so that this module can supply the appropriate user registration information to be communicated to the third party web site 2116. Also note that the home page from the third party web site 2116 may indicate the type of information required to register the user and this information may be used either manually or automatically for determining the user registration information stored on the user's client node 2108 that will be transmitted to the third party web site. Subsequently, in step 916 the user specifies that the registration fill-out form is to be submitted to the third party web site. Accordingly, the WWW browser 2120 communicates with the registrar registration module 2156 to supply the registration information to the third party web site. That is, the processing performed here includes the steps of FIG. 13 which are described herein below. Subsequently, in step 920 a message is sent from the registration module 2156 to the registrar web site 2100 indicating that the user has registered at the third party web site and additionally supplying the registrar web site 2100 with any user ID and password specific to the third party web site.

Note that by sending this information as well as, for example, a copy of substantially all of the user's registration information stored locally to the registrar web site 2100, the user is provided with an automatic off-site backup of his/her registration information. Additionally, the user may be provided with other advantages by providing his/her user registration information to the registrar web site 2100. In particular, the registrar web site 2100 may enrich the user's registration information with publicly available information on the user and alert the user to discrepancies between the user information and various publicly available records on the user.

Figure 13:
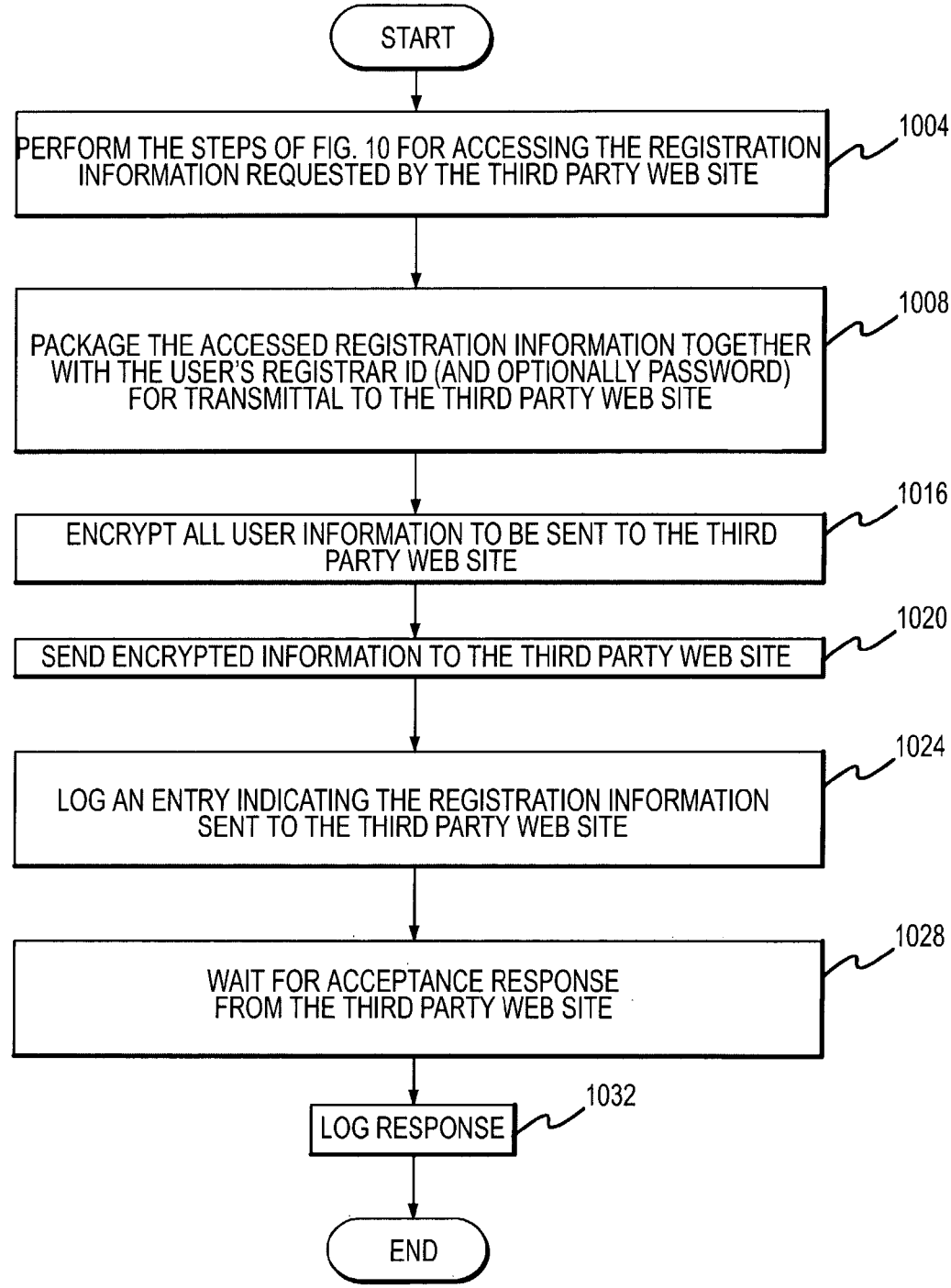
FIG. 13 is a flowchart of the steps performed when the registration module 2156 on the user's client node is utilized in supplying a third party web site 2116 with registration information.

Referring now to the flowchart of FIG. 13, this flowchart describes the steps performed when supplying a third party web site 2116 with registration information retained by the registrar registration module 2156 on the user's node. In step 1004, the steps of the flowchart of FIG. 10 are performed for retrieving the registration information requested by the third party web site. Subsequently, in step 1008 the registrar registration module 2156 packages the accessed registration information for the third party web site together with the user's registrar ID (and optionally password) for transmittal to the third party web site. Subsequently, in step 1016 the registration information packaged together in step 1008 is encrypted so that in step 1020 this encrypted information may be sent securely to the third party web site via the World Wide Web 2104. Following this, in step 1024 the module 2156 logs an entry into a local log on the client node 2108 indicating what registration information was sent to the third party web site. Subsequently, in step 1028 a process may be instantiated to wait for an acceptance response from the third party web site so that when such a response is obtained it may be logged locally at the client node 2108 in step 1032.

In one embodiment of the present invention the user may configure the registrar registration module 2156 to log all activities with third party web sites 2116 and provide the records of this log to the registrar web site 2100. This allows the registrar web site 2100 or personnel that maintain the registrar web site 2100 to analyze user activities on the World Wide Web 2104. Such analysis may be useful to both registrar users and third party web site personnel in that, given a user's World Wide Web 2104 activity, the registrar web site 2100 may suggest additional third party web sites 2116 of which the user may not be aware. Further, by analyzing the user access logs of registrar users, the registrar web site 2100 may provide statistics to the third party web sites 2116 as to the number and types of users accessing their respective web sites.

Figure 14A:
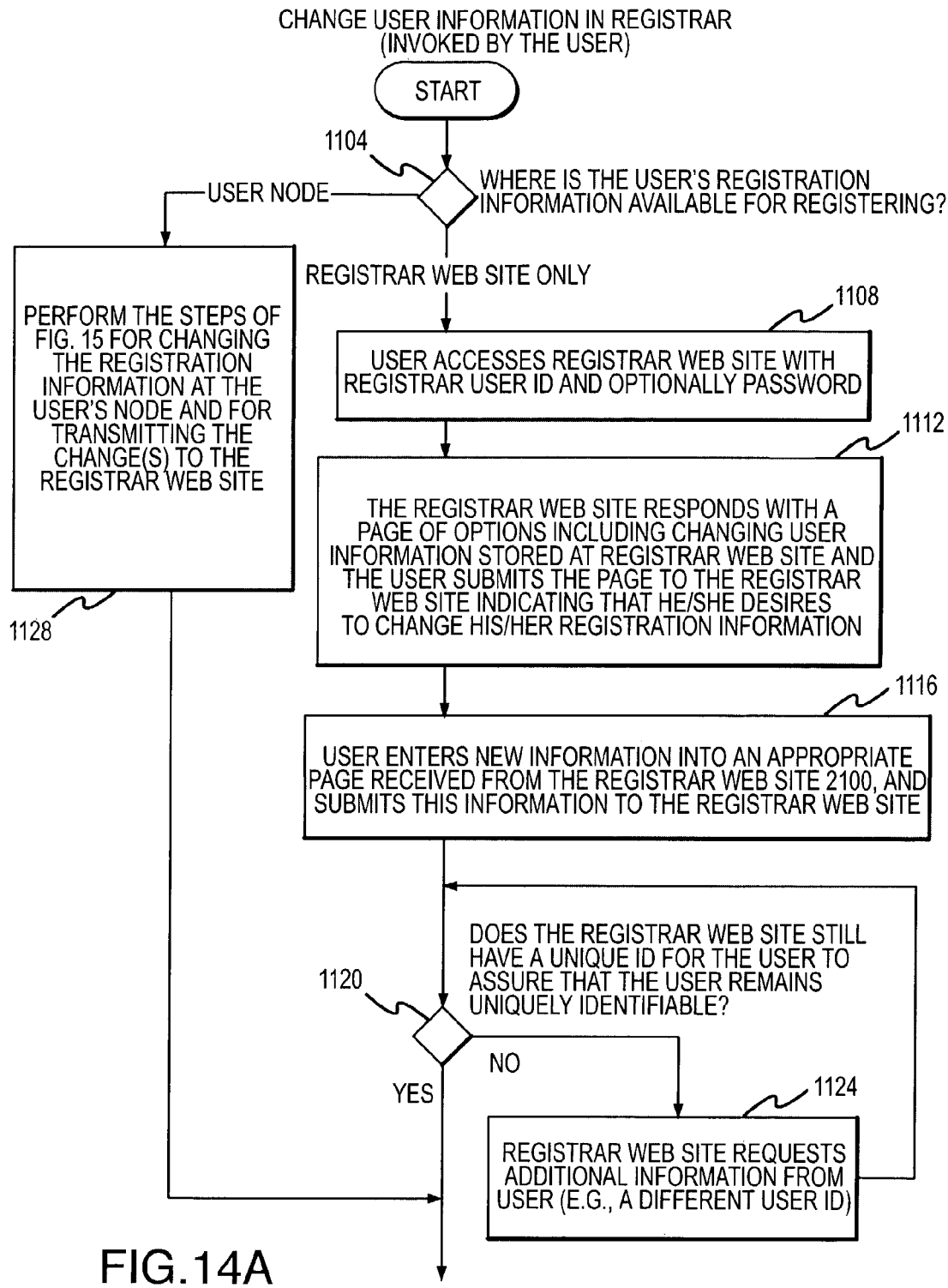
FIGS. 14A and 14B present a flowchart of the steps performed when a World Wide Web user of the present invention changes his/her registration information stored in the present invention.
Figure 14B:
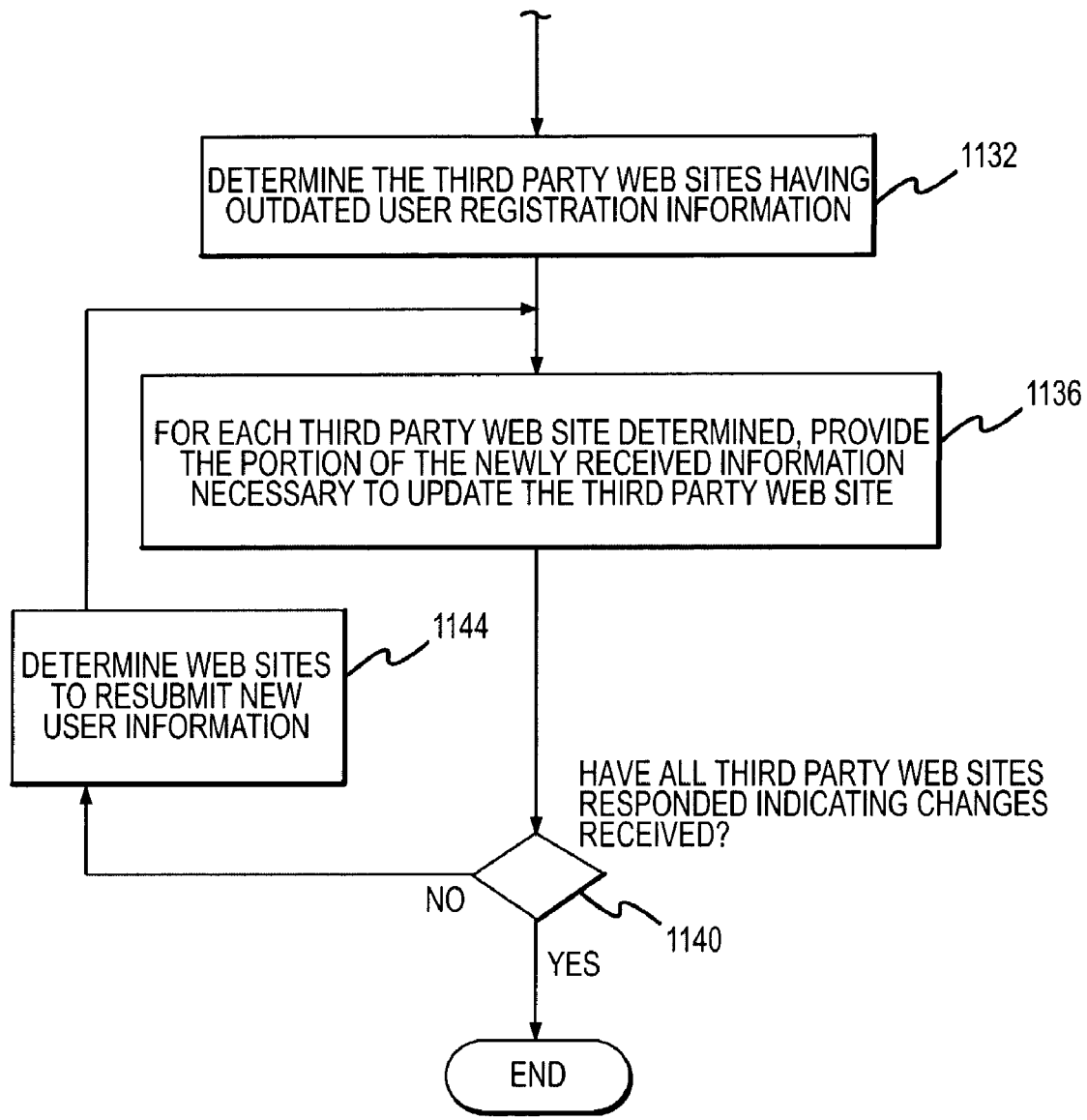

FIGS. 14A and 14B present a flowchart for the steps performed by the present invention when the user changes his/her registrar registration information. That is, the flowchart of FIG. 14 encompasses both the architecture or embodiment of the present invention wherein the user's registration information is stored substantially only at the registrar web site 2100, and also the architecture or embodiment wherein the user's registrar information is also stored at the user's client node 2108. Accordingly, in step 1104 a determination is made as to where the user's registration information is stored. Note that this step 1104 is unlikely to be explicitly performed by either the present invention or the user. Instead, the embodiment of the present invention determines which of the paths from this step to follow (i.e., if module 2156 exists, then the "USER NODE" branch is followed; otherwise, the "REGISTRAR WEB SITE ONLY" branch is followed). Accordingly, assuming that the present invention is embodied such that the user's registration information is stored at the web site 2100 only, then step 1108 is encountered wherein the user accesses the registrar web site 2100 from his/her WWW client node 2108 by entering his/her user ID and optionally password. Subsequently, in step 1112 the registrar web site 2100 responds with a web page having a number of options related to the user's registration information and registrar web site 2100 processing of this information. Note that such options include a request by the user to modify the user's registration information stored at the registrar web site. Additionally, other options may be also provided to the user including: (a) an option for requesting to be no longer affiliated with the registrar web site 2100 and have all the user's registration information deleted; (b) an option for requesting to examine all information regarding the user stored at the registrar web site 2100, including all information the registrar web site has obtained from publicly available sources; (c) a request for procedures and/or addresses to contact publicly available databases that registrar has accessed obtaining incorrect user information; and (d) third party web sites 2116 that are providing information for a limited period of time and for which the user may be interested. Following step 1112, in step 1116 the user enters new information into an appropriate fill-out form received at the user's WWW client node 2108 from the registrar web site 2100. Note that this form is likely to be in a page different from the page of options described in step 1112. That is, upon submission of the page of options, the registrar web site 2100 responds with a new page(s) having fill-out forms with the presently stored user registration information presented in the forms so that the user may change any of the fields on this page(s).

Note that in at least one embodiment of the present invention, the user is allowed to change his/her registrar user ID and/or password. However, it may be the case that when a user changes his/her registrar user ID, that the new requested user ID has already been assigned to another registrar user. Thus, the registrar web site 2100 may respond with a request for further information (such as a request for a different user ID from the user) wherein when the user submits the additional information, the registrar web site 2100 again checks to determine if the user is uniquely identifiable. Note that the loop of steps 1120 and 1124 are provided to represent the iterative process described here of changing the user's user ID. Further note that in some embodiments of the present invention, the registrar web site 2100 may respond with alternative variations for a new user ID so that the user is not left to guess at a registrar user ID that is acceptable for uniquely identifying the user.

Returning now to step 1104, if the user's registration information is stored locally at the user's client node 2108, then step 1128 is performed instead of the steps 1108-1124. However, for simplicity, a discussion of the processing performed in step 1128 is not described in detail here. Instead, a detailed discussion of this step is provided by FIG. 15 and the discussion of FIG. 15 hereinbelow for changing the registration information at the user's client node 2108 and for transmitting the changes to the registrar web site 2100.

Regardless of the branch of processing taken from step 1104, eventually step 1132 and the subsequent steps of FIG. 14B are encountered wherein the present invention updates or alerts third party web sites having previously received user registration information that this information may be outdated. Thus, the steps 1132-1140 are performed so that the registration information provided to such third party web sites via the present invention is consistent with the newly supplied user registration information. However, in at least one embodiment of the present invention, prior to providing any newly entered user registration information to the third party web sites, such information may be compared or correlated with publicly available information regarding the user that is, for example, accessible via certain third party web sites 2116. Further, the user may request his/her newly entered registration information by supplied to only selected web sites to which the user is registered, or alternatively, the user may request that the newly entered registration information be supplied to all web sites to which the user is registered.

Figure 15A:
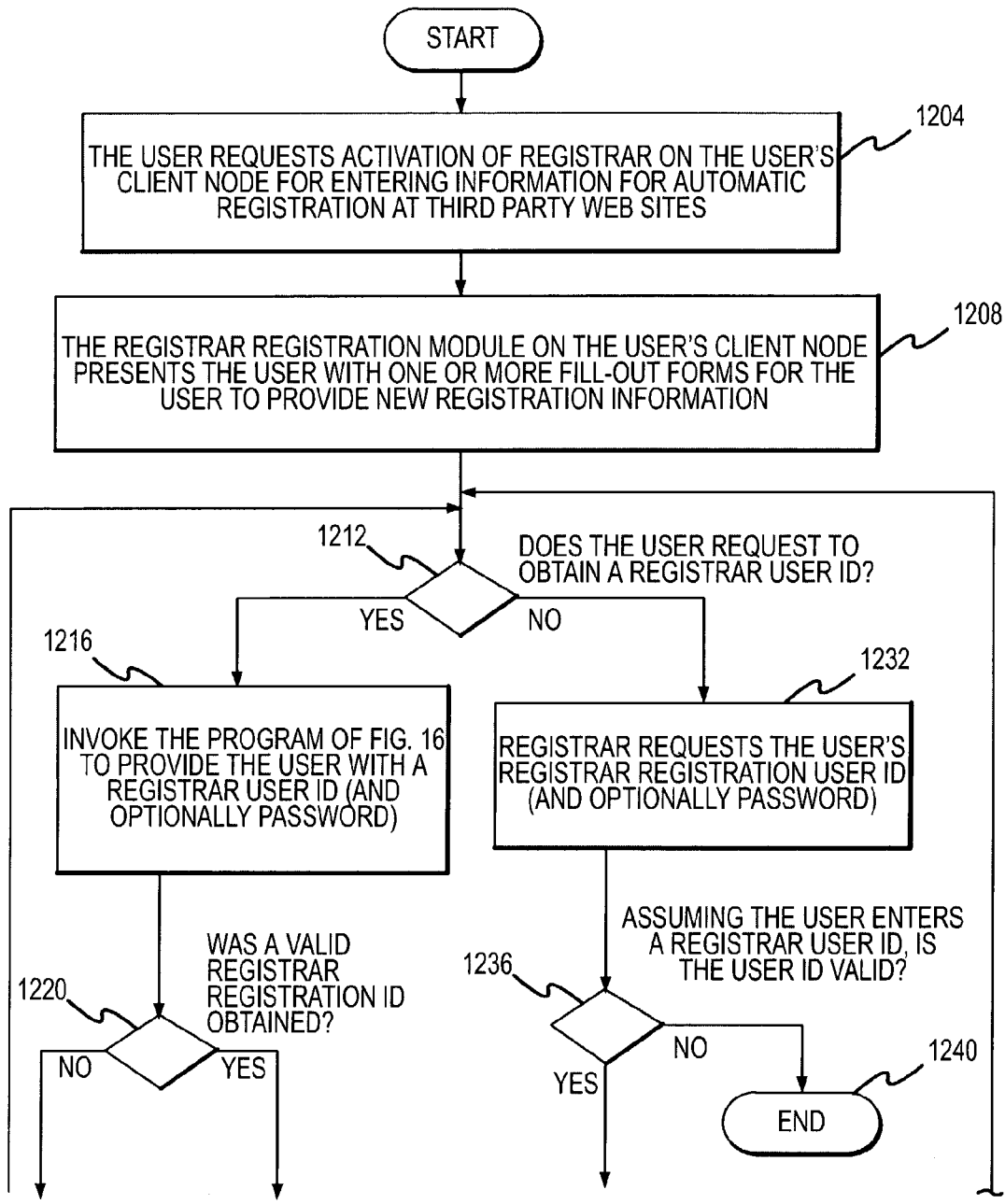
FIGS. 15A and 15B present a flowchart of the steps performed when the architecture of the present invention includes the registration module 2156 provided at the user's client node 2108 and the user requests to enter registration information into the present invention using this module.
Figure 15B:
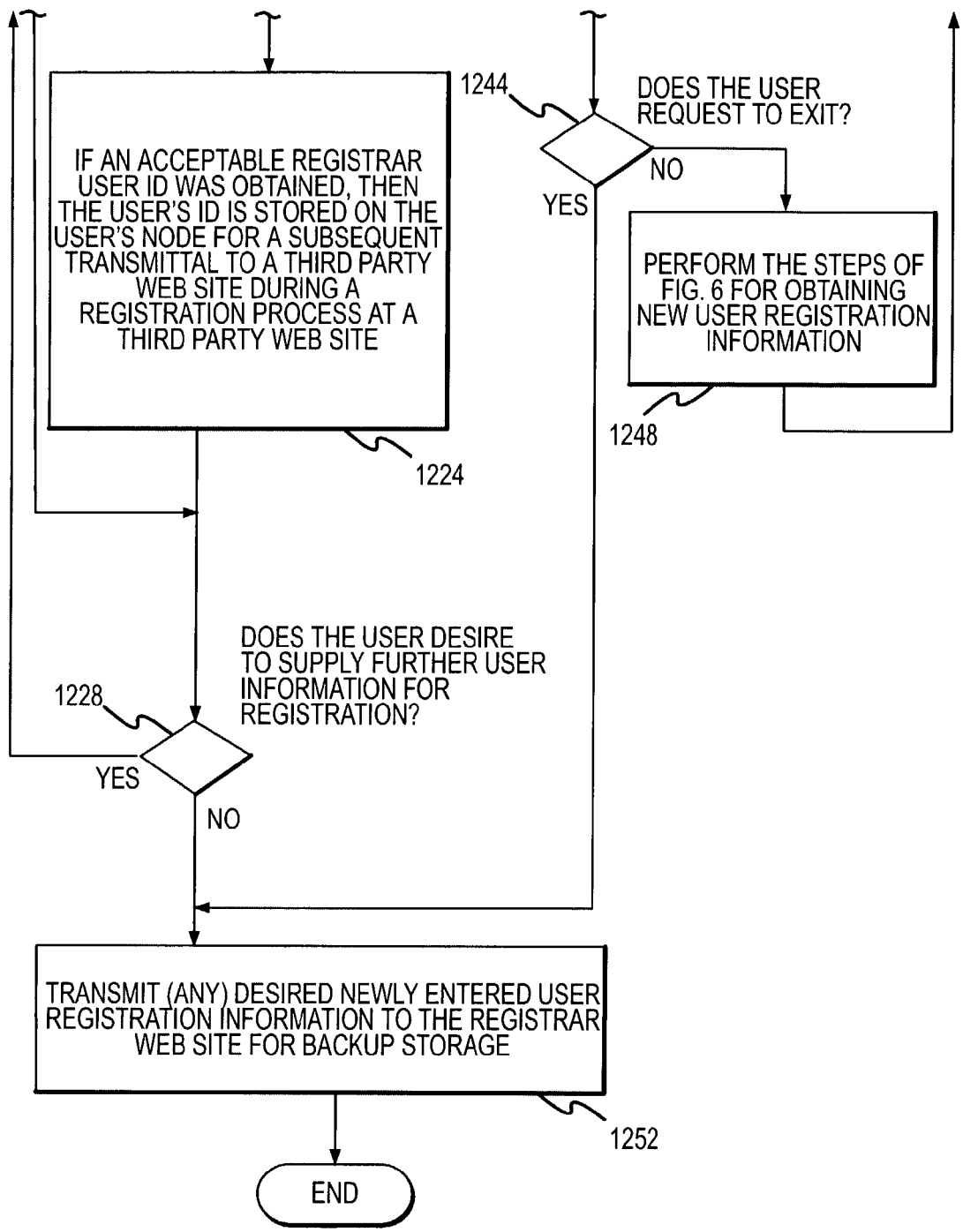
Figure 16A:
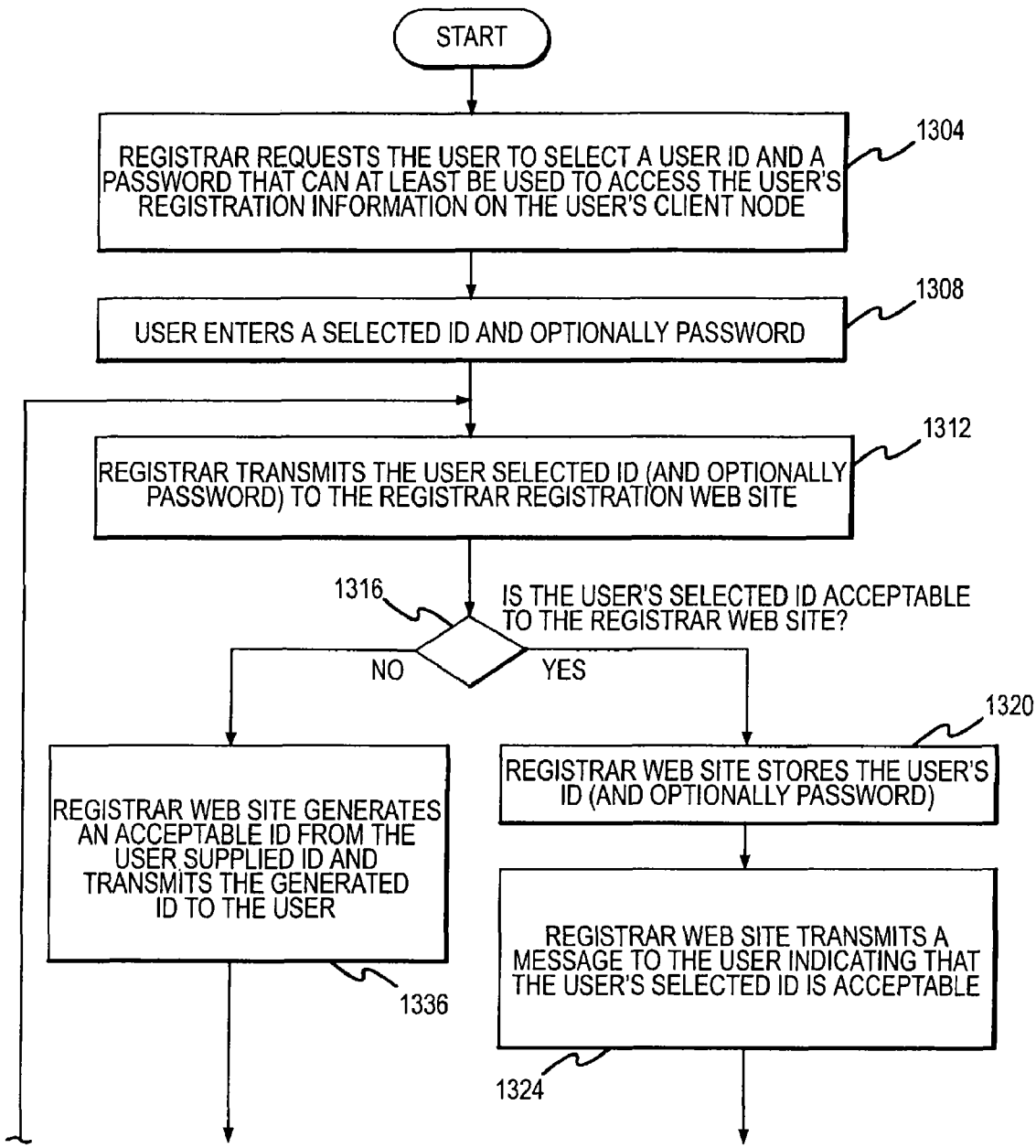
FIGS. 16A and 16B provide a flowchart of the steps performed when a World Wide Web user requests a user ID for the registration information processing system of the present invention and the present invention includes module 2156 on the user's client node 2108.
Figure 16B:
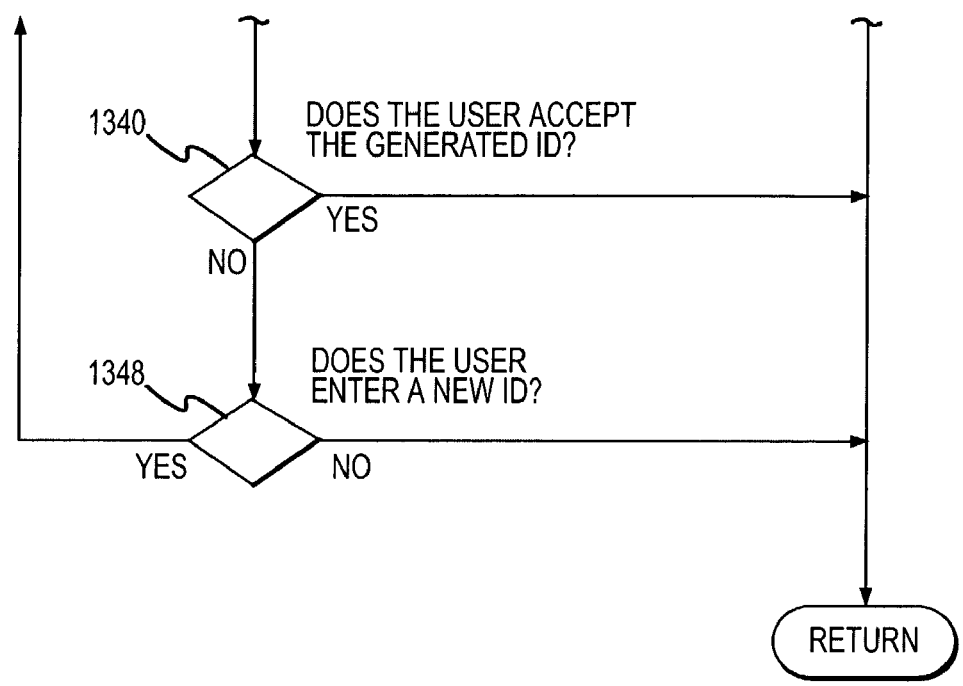

FIG. 15 presents a flowchart of the steps performed when the registrar registration module 2156 is provided at the client node 2108 and the user enters registration information into this module. Note that the steps of this flowchart may be performed when the user is entering registration information for registering the user with registrar, or when modifying registration information already supplied to registrar. Accordingly, in step 1204 the user requests activation of the registrar registration module 2156 on the user's client node 2108 for entering information that will subsequently be used for registering substantially automatically cooperating at third party web sites 2116 requested by the user. Subsequently, in step 1208 the registrar registration module 2156 on the user's client node 2108 presents the user with one or more fill-out forms for the user to provide new registration information. Following this, in step 1212 a determination is made as to whether the user requests to obtain a registrar user ID. If so, then in step 1216 the program corresponding to the flowchart of FIG. 16 is performed to provide the user with a valid registrar user ID and optionally password. Subsequently, in step 1220 a determination is made as to whether the program of FIG. 16 returns a valid registrar user ID. If so, then step 1224 is performed wherein the new user's registrar ID is stored on the user's node 2108 for a subsequent transmittal to a third party web site during a registration process at a third party web site that accepts the registrar user ID as the web site's ID. Subsequently, regardless of the path taken from step 1220, step 1228 is encountered wherein a determination is made as to whether the user desires to enter further user registration information.

If the user desires to enter further information, then step 1212 is again encountered and a determination is made once again as to whether the user requests to obtain a registrar user ID. However, it is important to note that the steps provided in this flowchart are only an indication of the processing provided by the registrar registration module 2156 and the user's browser. In particular, since the user interfaces typically used by World Wide Web browsers allow a user to select the fill-out form fields to modify, the positive branch from step 1212 is taken only when the user enters information in a fill-out form field indicating that a registrar user ID is requested. Similarly, the negative branch from step 1212 is taken whenever user information is entered into other fill-out form fields unrelated to obtaining a registrar user ID.

Accordingly, if the user desires to enter other information than that required to obtain a registrar user ID, then from step 1212, step 1232 is encountered wherein the registrar registration module 2156 explicitly requests the user's registrar registration user ID (and optionally password). Subsequently, in step 1236, assuming the user enters a registrar user ID, a determination is made as to whether the registrar user ID is valid. Note that this determination is initially made locally at the user's client node 2108 without contacting the registrar web site 2100. However, in one embodiment of the present invention, it is an option that if the registrar user ID entered is not found in the client node 2108, then the registrar registration module 2156 may inquire of the user as to whether he/she desires the registrar web site 2100 to be interrogated for the registrar user ID and password and, if found, download the user's registration information to the user's client node 2108. If no valid registrar user ID is determined in step 1236, then the program ends in step 1240. Alternatively, if a valid registrar user ID is obtained, then in step 1244 a determination is made as to whether the user requests to exit the present program and thereby stop supplying registration information. Note that this step is similar to step 1212 in that if the user continues to enter registration information in fill-out form fields, then the negative branch from this step is followed and, alternatively, if the user, for example, activates an exit button on the user interface, then the positive branch from step 1244 will be followed. Accordingly, if the negative branch is followed, then in step 1248 the program of FIG. 6 is performed for obtaining new user registration information and, subsequently, step 1212 is encountered (or, more precisely, the user interface is provided that allows the user to request a registrar user ID).

Alternatively, if the positive branch is taken from step 1244, then step 1252 is encountered wherein the registrar registration module 2156 transmits (or schedules the transmission of) any newly entered user registration information that the user desires to be transmitted to the registrar web site 2100 for backup storage. Thus, in one embodiment of the present invention, the step 1252 provides the user with the option to discard the registration information provided in step 1248 above instead of transmitting this information to the registrar web site 2100.

In FIG. 16, a flowchart is presented of the program for obtaining a registrar user ID and optionally password for the embodiment of the present invention wherein the registrar registration module 2156 retains the user's registrar user ID (and optionally password) for automatically providing to third party web sites at which the user requests registration using the present invention. Accordingly, in step 1308 the registrar registration module 2156 requests the user to select a registrar user ID and optionally a password that can be used to access the user's registration information at both the user's client node 2108 and at the registrar web site 2100. Assuming that the user enters a user ID and optionally password in step 1308, in step 1312 the registrar registration module 2156 transmits the user selected ID and optionally password to the registrar web site 2100. Subsequently, in step 1316 a determination is made by the registrar application 2128 as to whether the user's selected user ID and optionally password are acceptable to the registrar web site. That is, a registrar application 2128 accesses the user registration information database 2144 to determine if the selected user ID is sufficiently unique. Note that other steps may be performed between steps 1308 and 1312. For example, the syntax for user IDs and optionally passwords may be checked at the module 2156 prior to transmitting the user's selected registration information to the registrar web site 2100.

Continuing with step 1316, a determination is made at the registrar web site 2100 as to whether the user's selected user ID and optionally password are acceptable to registrar. If so, then in step 1320 a registration application 2128 stores the user's ID and optionally password in the user registration information database 2144. Note that since it is unlikely that any further information related to the present user is stored at the registrar web site, the process of storing the user's user ID and optionally password includes creating a new record in the database 2144 and marking all remaining fields related to registration information for this user to indicate that these fields are as yet not valid. Following this, in step 1324 a registrar application 2128 transmits a message to the user's WWW browser 2120 indicating that the user's selected user ID and optionally password is acceptable to registrar.

Alternatively, if the negative path is taken from step 1316, then step 1336 is encountered wherein a registrar application 2128 attempts to generate an acceptable user ID and optionally password as a substitute for the user's proposed user ID (and optionally password). Note that in generating alternative registration information, the registrar application 2128 may use the user supplied information as the basis or "seed" for generating an acceptable user ID (and optionally password) to be transmitted back to the user. Accordingly, in step 1340, once the user is presented with the newly generated registration information on the user's client node 2108, the registrar registration module 2156 provides the user with the option to accept or reject the generated information. If the user accepts the generated registration information, then the flowchart ends. Alternatively, if the user rejects this information, then in step 1348 a further determination is made by the module 2156 as to whether the user enters a new user ID (and optionally password) as an alternative to the generated registration information. If such new user registration information is provided, then step 1312 and steps thereafter are again performed in attempting to provide a registrar user ID (and optionally password) to the user. Alternatively, if the user indicates in step 1348 that no further proposed candidates for a user ID (and optionally password) will be forthcoming, then the flowchart ends without an acceptable registrar user ID being obtained.

The foregoing discussion of the invention has been presented for purposes of illustration and description. Further, the description is not intended to limit the invention to the form disclosed herein. Subsequently, variation and modification commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. An apparatus configured to provide information for use in identifying content of potential interest to one or more users, comprising:
 a computer readable medium operable for storing information, in a database, related to at least one user, the information operable in identifying content of potential interest to the at least one user, the computer readable medium further comprising:
  at least one file containing information related to the at least one user and further comprising:
   at least one first entry associating interest information with the user; wherein the interest information is based upon passively monitored Internet usage patterns for the user; and
   at least one second entry identifying a notification criteria comprising at least an indication of notification scheduling specified by the at least one user and obtained from a registration website that is separate from the apparatus and configured to maintain the notification criteria of the at least one user;
 a processor, facilitating access to the database; and
 a communications interface facilitating access to the database;
 wherein the notification criteria is obtained from the registration website by the operations of:
  the at least one user communicating the notification criteria to the registration website at a first time and a user identifier to the processor at a second time; and
  the processor communicating at least the user identifier to the registration website to obtain the notification criteria of the at least one user.

2. The apparatus of claim 1, wherein the apparatus hosts a registration site accessible via a network.

3. The apparatus of claim 2, wherein the communications interface facilitates access to the computer readable medium for the purpose of retransmitting information stored in the computer readable medium through the network.

4. The apparatus of claim 2, wherein at least one of the first entry and the second entry are adapted for communication to at least one other node or site on the network.

5. The apparatus of claim 2, wherein at least a portion of the information stored by the computer readable medium is communicated over the network to a second apparatus.

6. The apparatus of claim 5, wherein the second apparatus is a notification site accessible via the Internet.

7. The apparatus of claim 1, wherein the at least one first entry includes at least one of program, author, artist, content information, or combinations thereof of interest to the at least one user.

8. The apparatus of claim 1, further comprising at least one second file operable for identifying at least one content of potential interest to the user.

9. The apparatus of claim 8, wherein the at least one second file includes a reference to at least one second database.

10. The apparatus of claim 9, wherein the second database further comprises at least one third entry, wherein each third entry includes at least one identifier of content.

11. The apparatus of claim 10, wherein the at least one identifier of content further comprises an indication of at least one of a program title, series title, episode identifier, presentation time, subject matter, target demographics, advertisers, and derived information.

12. The apparatus of claim 9, wherein the computer readable medium and the second database are accessible via at least one user node.

13. The apparatus of claim 1, wherein the processor is adapted to receive a request from a third party web site to obtain the interest information, verify the request includes a user identifier and password associated with the file, upon verification of the user identifier and password obtain at least some of the interest information from the computer readable medium and provide the obtained interest information to the third party web site.

14. The apparatus of claim 1, wherein the passive monitoring of Internet usage patterns occurs without the voluntary participation of the user.

15. The apparatus of claim 1, wherein the passive monitoring of Internet usage patterns occurs absent an overt user expression of interest in particular subject matter.

16. The apparatus of claim 15, wherein the interest information is updated based upon an overt expression of interest by the user in particular subject matter.

17. The apparatus of claim 15, wherein the at least one second entry identifying the user is enriched with additional information.

18. The apparatus of claim 1, wherein, at least in between the at least one user's interactions with the apparatus, the information is used to identify content of potential interest to the at least one user.

19. A method for identifying content of potential interest to a user, comprising:
    obtaining, via a network, preference information for at least one user; wherein the preference information is based, at least in part, upon a currently ascertained Internet usage history for the user;
    obtaining, via a network, a notification criteria comprising at least an indication of notification scheduling from a registration website configured to maintain the notification criteria of the at least one user through the operations of
        receiving, from the at least one user via the network, a user identifier;
        communicating at least the user identifier, via the network, to the registration website; and
        receiving, from the registration website, the notification criteria of the at least one user based on the provided user identifier;
    obtaining information related to at least one content;
    identifying, whether any of the at least one content are of potential interest to the at least one user; and
    generating a notification to the at least one user after the at least one content is identified as being of potential interest to the at least one user.

20. The method of claim 19, wherein the action of identifying whether any of the content are of potential interest to the user is accomplished whenever new or revised information related to a content or a user is obtained.

21. The method of claim 20, wherein the action of identifying whether any of the content are of potential interest to the user is accomplished upon the occurrence of a trigger event.

22. The method of claim 21, wherein the trigger event comprises at least one of the announcement of a concert date, the announcement of a performance date, the release of a recording, a product release, a scheduled event, and an unscheduled event.

23. The method of claim 19, wherein the notification is generated as an electronic message and further comprises at least one of graphic, text, voice, audio information and combinations thereof.

24. The method of claim 23, wherein the notification is generated as a text message.

25. The method of claim 23, wherein the notification is generated as a voice message.

26. The method of claim 19, wherein the notification is transmitted to the user via regular mail.

27. The method of claim 19, wherein the action of obtaining preference information for the at least one user further comprises obtaining demographic information related to the at least one user.

28. The method of claim 27, wherein the action of obtaining preference information for the at least one user further comprises obtaining information associated with the at least one user and identifying at least one of a program, author, artist, hobby, periodical subscription, subject of interest, lifestyle, product interests, or psychographics.

29. The method of claim 19, wherein the currently ascertained Internet usage history for the user is based upon web sites accessed by the user, during an on-line session, without requiring an overt expression of user interest or disinterest in particular subject matter presented via web sites accessed during the on-line session.

30. The method of claim 19, wherein the currently ascertained Internet usage history for the user is based upon passively monitored user on-line behavior.

31. The method of claim 19, wherein the identifying operations occurs in between user interactions.

32. A method of providing information for use in identifying content of interest to a user, comprising:
    accessing, via a network, first information useful in identifying content of interest to the user; wherein the first information includes passively determined Internet usage patterns and express user indications of interest in particular subject matter;
    accessing second information useful in identifying demographics of the user; and
    accessing third information useful in identifying a notification criteria comprising at least an indication of notification scheduling from a registration website configured to maintain the notification criteria, wherein the notification criteria is obtained by the operations of:
        receiving, from the at least one user via the network, a user identifier;
        communicating at least the user identifier, via the network, to the registration website; and
        receiving, from the registration website, the notification criteria of the at least one user based on the provided user identifier;
    whereupon accessing the first and the second information, a notification program identifies content of interest to the user and notifies the user that content of interest is available.

33. The method of claim 32, wherein the content of interest is provided via a web page.

34. The method of claim 33, wherein the method is implemented using at least one site connectable to the Internet.

35. The method of claim 32, wherein the notification program identifies the content of interest to the user in between user interactions.

* * * * *